(12) United States Patent
Amarasinghe et al.

(10) Patent No.: US 6,355,166 B1
(45) Date of Patent: Mar. 12, 2002

(54) MAGNETICALLY ENHANCED COMPOSITE MATERIALS AND METHODS FOR MAKING AND USING THE SAME

(75) Inventors: Sudath Amarasinghe, Iowa City; Shelley Minteer, Burlington, both of IA (US); Lois Anne Zook, Richmond, OH (US); Drew C. Dunwoody, St. Paul; Catherine Spolar, Minnetonka, both of MN (US); Hachull Chung, Chonan (KR); Johna Leddy, Iowa City, IA (US)

(73) Assignee: The University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/429,931

(22) Filed: Oct. 29, 1999

Related U.S. Application Data

(63) Continuation-in-part of application No. 08/486,570, filed on Jun. 7, 1995, now Pat. No. 6,001,248, which is a continuation-in-part of application No. 08/294,797, filed on Aug. 25, 1994, now abandoned.
(60) Provisional application No. 60/159,374, filed on Oct. 14, 1999, and provisional application No. 60/139,318, filed on Jun. 15, 1999.

(51) Int. Cl.$^7$ .......................... H01M 4/90; B01D 35/06
(52) U.S. Cl. ........................ 210/223; 210/222; 210/243; 204/280; 204/283; 429/10; 429/12; 429/40; 429/127
(58) Field of Search .............................. 429/10, 12, 127, 429/40; 210/222, 223, 243; 204/280, 283

(56) References Cited

U.S. PATENT DOCUMENTS

| | | | |
|---|---|---|---|
| 2,895,851 A | 7/1959 | Johnson | 427/598 |
| 3,811,952 A * | 5/1974 | Siwersson et al. | 429/10 |
| 3,853,628 A * | 12/1974 | Fox | 429/10 |
| 3,945,910 A | 3/1976 | DeCeuster et al. | 204/296 |
| 4,037,022 A * | 7/1977 | Cheron | 429/10 |
| 4,132,619 A | 1/1979 | Klein et al. | 204/291 |
| 4,201,827 A | 5/1980 | Heitkamp | |
| 4,244,998 A | 1/1981 | Smith | 428/195 |
| 4,247,398 A | 1/1981 | Mohri | 210/222 |
| 4,293,371 A | 10/1981 | Kokta et al. | |
| 4,339,337 A | 7/1982 | Tricot et al. | 252/62.54 |
| 4,647,514 A | 3/1987 | LeCraw et al. | 428/692 |
| 4,725,490 A | 2/1988 | Goldenberg | |
| 4,865,925 A * | 9/1989 | Ludwig et al. | 429/12 |
| 4,876,115 A | 10/1989 | Raistrick | 429/42 |
| 4,965,007 A | 10/1990 | Yudelson | 252/62.53 |
| 4,973,391 A | 11/1990 | Madon et al. | |
| 5,051,157 A * | 9/1991 | O'Brien et al. | 429/10 |

(List continued on next page.)

OTHER PUBLICATIONS

A.L. Buchachenko, "Magnetic Effects in Chemical Reactions", *Russian Chemical Reviews*, vol. 45, May 1976, pp. 375–390.

N.J. Turro, et al., "Magnetic Field and Magnetic Isotope Effects in Organic Photochemical Reactions. A Novel Probe of Reaction Mechanisms and a Method for Enrichment of Magnetic Isotopes", *Accounts of Chemical Research*, vol. 13, 1980, pp. 369–377.

T.Z. Fahidy, "Magnetoelectrolysis", *Journal of Applied Electrochemistry*, vol. 13, 1983, pp. 553–563.

(List continued on next page.)

*Primary Examiner*—David A. Reifsnyder
(74) *Attorney, Agent, or Firm*—Fleshner & Kim, LLP

(57) ABSTRACT

Materials and methods for making and using magnetically enhanced composite materials are provided. Surfaces coated with such composites can be used to improve fuel cells, material separators, and other applications. A variety of devices can incorporate such composites, including fuel cells, separators, batteries, and electrodes that effect electrolysis of magnetic species.

25 Claims, 52 Drawing Sheets

U.S. PATENT DOCUMENTS

| | | | |
|---|---|---|---|
| 5,075,169 A | 12/1991 | Nagai et al. | 428/402 |
| 5,096,551 A | 3/1992 | Shoen et al. | |
| 5,102,745 A | 4/1992 | Tatarchuk et al. | |
| 5,172,751 A | 12/1992 | Croat | 148/101 |
| 5,186,854 A | 2/1993 | Eldelstein | 252/62.55 |
| 5,187,034 A | 2/1993 | Olagwa et al. | |
| 5,191,223 A | 3/1993 | Munekata | 257/421 |
| 5,241,447 A | 8/1993 | Barber et al. | 361/141 |
| 5,540,981 A | 7/1996 | Gallagher et al. | 428/220 |
| 5,587,943 A | 12/1996 | Torok et al. | 365/158 |
| 5,646,001 A | 7/1997 | Terstappen et al. | |
| 5,696,392 A | 12/1997 | Char et al. | 257/190 |
| 5,786,040 A | 7/1998 | Leddy et al. | |
| 5,817,221 A | 10/1998 | Leddy et al. | |
| 5,871,625 A | 2/1999 | Leddy et al. | |
| 5,928,804 A | 7/1999 | Leddy et al. | 429/10 |
| 6,036,838 A | 3/2000 | Wieser et al. | 205/339 |

OTHER PUBLICATIONS

S.R. Ragsdale, et al., "Electrochemically Generated Magnetic Forces, Enhanced Transport of a Paramagnetic Redox Species in Large, Nonuniform Magnetic Fields", *Journal of American Chemical Society*, vol. 120, 1998, pp. 13461–13468.

J. Leddy, et al. "Magnetic Ion Exchange Polymer Composites: Transport Enhancements Driven By Non–Uniform Magnetic Fields and Magnetic Moments of Transported Molecular and Ionic Species", *37th Power Sources Proceedings*, 1996, pp. 93–95.

H. Dahms, "Electronic Conduction in Aqueous Solution", *Journal of Physical Chemistry*, vol. 72, 1968, pp. 362–365.

I. Ruff, et al., "Transfer Diffusion. I. Theoretical",*Journal of Physical Chemistry*, vol. 75, No. 21, 1971, pp. 3297–3302.

I. Ruff, et al., "Transfer Diffusion, II. Kinetics of Electron Exchange Reaction Between Ferrocene and Ferricinium Ion in Alcohols",*Journal of Physical Chemistry*, vol. 75, No. 21, 1971, pp. 3303–3309.

I. Ruff, et al., "Application of Diffusion Constant Measurement to the Determination of the Rate Constant of Electron–Exchange Reactions", *Inorganic Chemistry*, vol. 9, 1970, pp. 186–188.

U. Steiner, et al., "Magnetic Field Effects in Chemical Kinetics an Related Phenomena", *Chemical Reviews*, vol. 89, No. 1, 1989, pp. 51147.

P.W. Atkins, et al., "The Effect of a Magnetic Field on Chemical Reactions", *Annual Report of Progress in Chemistry*, vol. 72A, 1975, pp. 67–88.

P. Atkins, "Magnetic Field Effects", *Chemistry in Britain*, vol. 12, 1976, pp. 214–228.

U. Khimii, "The Influence of the Magnetic Field on Processes Involving Radicals and Triplet Molecules in Solutions", *Russian Chemical Reviews*, 1977, pp. 569–601.

T. Klumpp, et al., "Spin Chemical Control of Photoinduced Electron–Transfer Processes in Ruthenium (II)–Trisbipyridine–Based Supramolecular Triads", *Journal of American Chemical Society*, vol. 121, 1999, pp. 1076–1087.

A. Carrington, et al., "Electron Nuclear Double Resonance", *Introduction to Magnetic Resonance with Applications to Chemistry and Chemical Physics*, Harper and Row, NY, 1967, pp. 229–236.

K.M. Salikov, et al., "Spin Polarization in Triplet Molecule Reactions", *Studies in Physical and Theoretical Chemistry*, vol. 22, 1984, pp. 241–242.

D. A. Buttry, et al., "Effects of Electron Exchange and Single–File Diffusion on Charge Propagation in Nafion Films Containing Redox Couples", *Journal of the American Chemical Society*, vol. 105, No. 4, 1983, pp. 685–689.

D.A. Buttry, et al. Electron Hopping Vs. Molecular Diffusion as Charge Transfer Mechanisms In Redox Polymer Films,*Journal of Electroanalysis Chemistry*, vol. 130, 1981, pp. 333–338.

H.S. White, et al., "Polymer Films on Electrodes, 8. Investigation of Charge–Transport Mechanisms in Nafion Polymer Modified Electrodes", *Journal of American Chemical Society*, vol. 104, 1982, pp. 4811–4817.

P.J. Hore, et al., "CIDEP in Radicals Undergoing Electron Transfer, A Time–Resolved Flash Photolysis ESR Study", *Chemical Physics Letters*, vol. 75, No. 3, 1980, pp. 582–586.

L.A. Zook, et al., "Experimental Studies of Diffusion on Fractal Surfaces", *Journal of Physical Chemistry B®*, vol. 102, No. 49, 1998, pp. 10013–10019.

K.A. Mauritz, et al., Theoretical Model for the Structures of Ionomers: Application to Nafion® Materials, *Am. Chem. Society Div. Polm. Chem.*, vol. 19, (1978) pp. 324–334.

F.H. Burstall et al., "Studies on Co–ordination Chemistry., Part XIII", *Journal of Chemical Society*, 1952, p. 3578.

R.S. Nicholson, et al., "Single Scan and Cyclic Methods Applied to Reversible, Irreversible, and Kinetic Systems", *Analytical Chemistry*, vol. 36, No. 4, 1964, pp. 706–723.

L. A. Zook, et al., "Nafion–Cold Cast, Thermally Processed, and Commercial Films: Comparison of Density, Water, Content, and Equivalent Weight", *New Directions in Electroanalytical Chemistry II*, vol. 99–5, 1999, pp. 217–225.

L.A. Zook, et al., "Density and Solubility of Nafion: Recast, Annealed, and Commercial Films", *Analytical Chemistry*, vol. 68, No. 21, 1996, pp. 3793–3796.

M.N. Szentirmay, et al., "Ion–Exchange Selectivity of Nafion Films on Electrode Surfaces", *American Chemical Society*, vol. 56, 1984, pp. 1898–1902.

Chemical Abstracts, Accession No. 117:49820, C. 1998.

L.A. Zook, "Electrical Studies of Ion Exchange Polymer Films and Composite Materials", Ph.D. Thesis, University of Iowa, 1996.

Y. Fang, et al., "Surface Diffusion in Microstructured, Ion-Exchange Matrices: Nafion/Neutron Track–Etched Polycarbonate Membrane Composites", *American Chemical Society*, vol. 99, 1995, pp. 6064–6073.

N. Sutin, et al., "Nuclear Reorganization Barriers to Electron Transfer", *Pure and Applied Chemistry*, vol. 60, No. 12, 1988, pp. 1817–1830.

Chemical Abstracts, Accession No. 110:65612, c. 1998; P. He, "Concentration dependence of the electron diffusion of tris (2,2'–bypyridine)ruthenium(III/II) and tris (2,2'–bipyridine)osmium(III/II) in Nafion film", *J. Electroanalysis Chemistry*, 256, 1988, pp. 353–360.

R. Berkoff, et al., "Measurement of The Rates For The Electron–Transfer . . . Photolysis Techniques", *Inorganic Chemistry*, vol. 19, No. 1, 1980, pp. 1–7.

Burstall, F.H. and Nyholm, R.S., Studies in Co–ordination Chemistry, Part XIII, Magnetic Moments and Bond Types of Transition–metal Complexes, J. Chem. Soc. pp. 3570–3579 (1952).

Cotton, F.A. and Wilkinson, G., *Advanced Inorganic Chemistry*, Third Edition, Interscience Publisher, New York, 1972, pp. 329,369.

Figgis, B.N. and Lewis J., The Magnetic Properties of Transition Metal Complexes, in Progress in Inorganic Chemistry, vol. 6, Cotton, F.A., ed., Interscience Publishers, New York, 1964, pp. 37–239.

\* cited by examiner

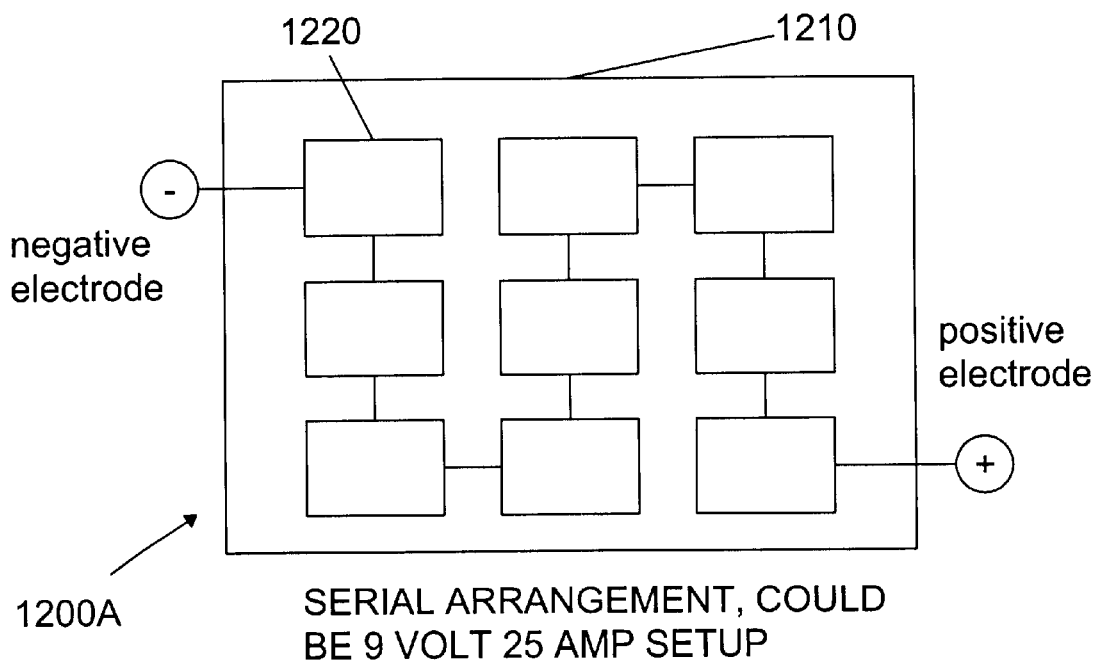
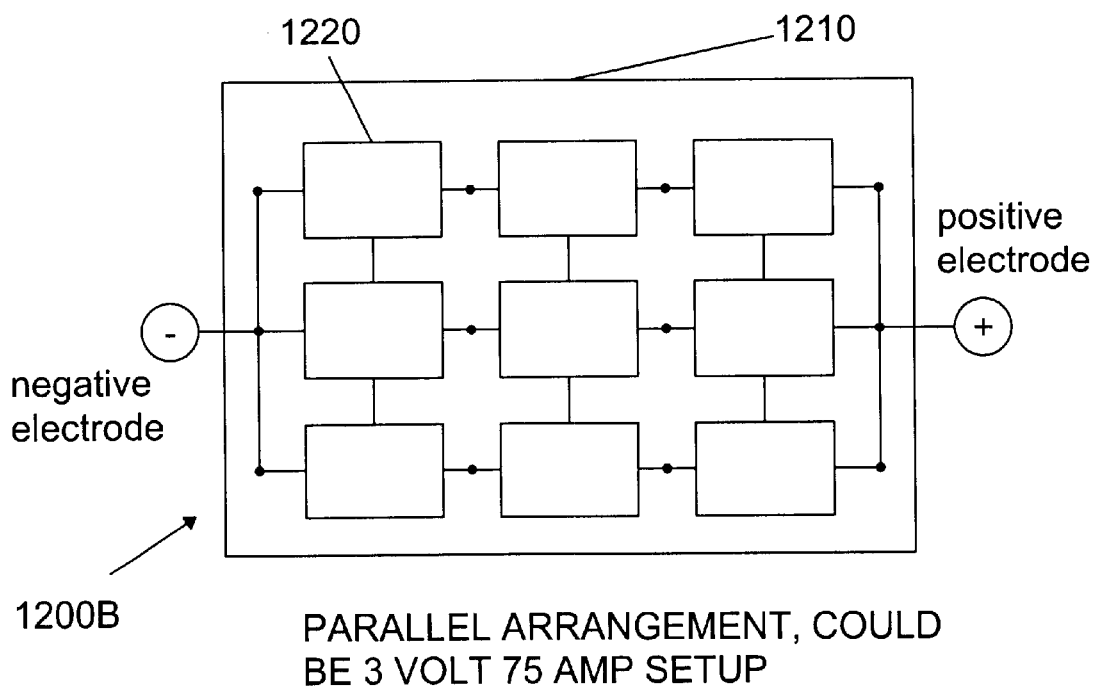
FIG. 19A

ALTERNATIVE ARRANGEMENT, COULD BE 1 VOLT, 225 AMP SETUP

Pressure dependency of initial output (anode: 50° C, 250SCCM $H_2$, cathode: 50°C, 400SCCM $O_2$, Cell: 70°C).

Pressure dependency after a day from start (anode: 30 psi, 250SCCM $H_2$, cathode: 50 psi, 400SCCM $O_2$, Cell: 70 degrees C).

Pressure dependency after 2 days from start (anode: 50 degrees C, 250SCCM H₂, cathode: 50 degrees C, 400SCCM O₂, Cell: 70 degrees C).

Current density at constant voltage

| Cell temperature(°C) | Current density(A/cm$^2$) at 0.4V |
|---|---|
| 20 | 0.355 |
| 25 | 0.400 |
| 30 | 0.440 |
| 35 | 0.476 |
| 40 | 0.508 |
| 45 | 0.573 |
| 50 | 0.613 |
| 55 | 0.632 |
| 60 | 0.418 |
| 65 | 0.384 |
| 70 | 0.328 |

FIG. 43

Results 1/0 Experiment

| | V@ 0.4 A/cm$^2$ | A/cm$^2$ @ 0.4 V | P/cm$^2$ (W/cm$^2$) | % P rel. non-mag best |
|---|---|---|---|---|
| Non-magnetic | | | | |
| Best @ 70 C(initial) * | 0.36 | 0.34 | 0.144/0.136 | 100 |
| match lit results | | | | |
| degrades 2 days | | | | |
| 20 C (will not run) | - | - | - | - |
| @ 70 C(initial) 20:20 | 0.55 | 0.53 | 0.22/0.21 | 154 |
| @ 70 C(initial) 30:30 | 0.56 | 0.68 | 0.22/0.27 | 175 |
| Uncoated Magnetic | | | | |
| initial - (degrades) | 0.18 | 0.22 | 0.07/0.09 | 57 |
| Coated Magnetic | | | | |
| Best @55 C(2 days) | 0.56 | 0.63 | 0.24/0.25 | 175 |
| @ 20 C * | 0.35 | 0.36 | 0.14/0.144 | 100 |
| @ 35 C | 0.43 | 0.48 | 0.172/0.192 | 130 |

FIG. 44

MAGNETICALLY ENHANCED COMPOSITE MATERIALS AND METHODS FOR MAKING AND USING THE SAME

RELATED APPLICATIONS

This application is a continuation-in-part of U.S. application Ser. No. 08/486,570, filed Jun. 7, 1995, which has Issued as U.S. Pat. No. 6,001,248, which is a continuation-in-part of U.S. application Ser. No. 08/294,797, filed Aug. 25, 1994, now abandoned, each of which incorporated by reference. This application claims benefit of U.S. Provisional Application No. 60/139,318, filed on Jun. 15, 1999 and also claims benefit of U.S. Provisional Application No. 60/159,374, filed on Oct. 14, 1999.

BACKGROUND OF THE INVENTION

1. Field of the Invention

This invention relates generally to a method for forming and exploiting fields, e.g., magnetic fields; at the interfaces between components of a composite material, the composite material itself and devices which incorporate the material such as electrochemical systems and separators, including fuel cells, batteries, and separations resulting in enhanced and modified flux and performance. The invention also relates to apparatus, methods of making and methods of using interfacial fields for the separation of transition metals, electrolytic applications such as fuel cells, electrolysis involving free radical products and intermediates, and biological systems.

2. Background of the Related Art

The following discussion provides a brief overview of the current understanding of magnetic properties in composites.

Magnetic Concepts

Magnetic field effects on chemical systems can be divided into several types, including electron transfer (kinetic), mass transport, and thermodynamic. Magnetic effects on homogeneous solutions for electron transfer have been discussed in the background literature, and substantial background research has been conducted on the magnetic effects on mass transport in solutions. Kinetically, reaction rates, reaction pathways, and product distributions can be altered. Macroscopic thermodynamic effects are generally negligible.

(A) Electron Transfer

In electron transfer reactions, an electron is transferred between a molecule or an ion. Electron transfer reactions are ubiquitous throughout natural and technological systems, including biological energy production, ozone depletion, and technologies from photography through batteries, solar cells, fuel cells, and corrosion. Understanding the speed or rates of electron transfer reactions is fundamentally important, since controlling rates can decrease energy consumption, lead to more efficient technologies, and reduce environmental load. For example, approximately 6% of domestic electrical power is used in the chloralkali industry for production of basic chemical stocks, such as hydrochloric acid, sulfuric acid, chlorine gas and sodium hydroxide. Electrochemical refining of aluminum uses a similar amount of power. Any improvement in electron transfer rates for various industrial reactions would significantly reduce energy consumption. Another example involves a fuel cell, which generates power electrically from a fuel (e.g., hydrogen or alcohol) while producing significantly less pollution than an internal combustion engine.

Electron transfer reactions can be characterized as either homogenous or heterogeneous. If the reaction occurs in a single phase (i.e., solid, liquid or gas) between two ions or molecules, the reaction can be characterized as a homogenous electron transfer. Consider two chemically distinct ions, $A^z$ and $B^y$, where z and y are the charges of the species. $A^z$ and $B^y$ undergo a homogeneous electron transfer reaction as:

$$A^z + B^y \rightleftharpoons A^{z\pm1} + B^{y\mp1}. \tag{1}$$

FIG. 1 shows a homogeneous electron transfer where an electron e transferred from one ion $A^z$ to another ion $B^y$ forms the products $A^{z+1}$, $B^{y-1}$. All ions are in solution.

When two different charge states of the same ion undergo homogeneous electron transfer, a self exchange reaction occurs as follows:

$$A^{z+1} + A^z \rightleftharpoons A^z + A^{z+1}. \tag{2}$$

While the effects of magnetic fields on homogeneous electron transfer reactions are well-known, little is known about magnetic field effects on heterogeneous reactions due to a lack of sound experimental data and theory.

Electron transfer reaction theory has developed since the 1950s. A model for homogeneous reactions was developed and later modified to describe heterogeneous reactions. Marcus received the Nobel prize in 1991 for theoretical description of those processes based on transition state theory. While the mathematics of Marcus' original theory were done with pencil and paper, the theory has evolved to include quantum mechanical descriptions resolved using sophisticated computer programs.

(B) Mass Transport

Magnetically driven mass transport effects have been studied in electrochemical cells positioned between the poles of large magnets. Effects vary depending on the orientation of the electrode, the relative orientation of the magnetic field and the electrode, forced or natural convection, and the relative concentrations of the redox species and electrolyte.

Paramagnetic molecules have unpaired electrons and are attracted into a magnetic field, while diamagnetic species of molecules possess paired electrons and are slightly repelled by the field. While radicals and oxygen are paramagnetic, most organic molecules are diamagnetic, and metal ions and transition metal complexes can be either para- or diamagnetic. The magnitude of the response of a molecule or species in a solution or fluid to a magnetic field can be parameterized by the molar magnetic susceptibility, $\chi_m$ (cm$^3$/mole). For diamagnetic species, $\chi_m$ is between about $(-1 \text{ to } -500) \times 10^{-6}$ cm$^3$/mole, and temperature-independent. For paramagnetic species, $\chi_m$ ranges from 0 to +0.01 cm$^3$/mole and, once corrected for its usually small diamagnetic component, varies inversely with temperature in accordance with Curie's Law. Because electrochemistry tends to involve single electron transfer events, the majority of electrochemical reactions should result in a net change in the magnetic susceptibility of species near the electrode.

While ions are monopoles that move either with or against an electric field, depending on the charge of the ion, paramagnetic species are dipoles and will always be aligned in a magnetic field, independent of the direction of the magnetic vector. Those dipoles will experience a net magnetic force if a field gradient exists.

(C) Thermodynamics

A uniformly applied magnetic field created by placing a solution between the poles of a magnet will have a negligible effect on the free energy of reaction. The change in the free energy of the reaction, $\Delta G_m$, is shown as $\Delta G_m = -0.5 \Delta \chi_m B^2$ J/mole, where $\Delta\chi_m$ is the difference in magnetic susceptibility of the products and reactants and B is the magnetic induction in Gauss. For the conversion of a diamagnetic species into a paramagnetic species, $\Delta\chi_m \leq 0.01$ cm$^3$/mole. In an applied magnetic field of 1 Tesla (T), where 1 Telsa=10 k Gauss, $|\Delta G_m| \leq 0.05$ J/mole. Even in the strongest laboratory fields of 10 T, the effect is negligible compared to typical free energies of reaction.

However, while the macroscopic effects are negligible when the magnet is placed external to the cell and a uniform field is applied to the solution, substantial microscopic effects may exist. The above-discussed effects are most significant in local fields of composites, and in molecules in composites within a short distance of the source of the magnetic field. For example, for a magnetic wire or cylinder, the magnetic field decreases over a distance, x, as $x^{-3}$. Thus the field experienced by a molecule 1 nm from the magnet may be roughly $10^{21}$ times greater than the field experienced at 1 cm.

Fuel Cells

The basic objective of a fuel cell is to allow a reaction between a fuel (e.g., hydrogen) and an oxidant (e.g., oxygen) which normally react spontaneously (and often violently) to discharge in a controlled manner. By containing the fuel and oxidant at separate electrodes, the discharge of the reaction is electrical rather than thermal. A wire coupling the electrodes captures the current and voltage of the discharging system, thus providing power to drive an external device, such as an electric motor.

Fuel cells combine the best characteristics of a battery and a combustion engine. Similar to the combustion engine, they are not recharged electrically and output power as long as fuel is provided. Similar to the battery, fuel cells are electrical devices capable of providing power and are theoretically not subject to a combustion engine's Carnot limitations. The expansion and contraction of pistons limits heat engines to about 40% theoretical power efficiency and about 25% practical efficiency under optimal conditions. In contrast, fuel cells approach 100% efficiency in theory, and have been demonstrated to operate at better than 90% efficiency.

Fuel cells are most commonly characterized by their operating temperature and by the fuel and oxidant which power them. High temperature fuel cells, such as molten carbonate and solid oxide fuel cells, operate at several hundred degrees centigrade, and are practical for large-scale power generation. For smaller, more portable power demands, such as automobiles, low temperature fuel cells operate at or below about 100° C.

Proton exchange membrane (PEM) fuel cells are the most common example of low temperature fuel cells. In PEM fuel cells, oxygen or atmospheric air serves as the oxidant and hydrogen typically serves as the fuel. A cell based on hydrogen and oxygen is denoted as $H_2/O_2$, where the convention is fuel/oxidant.

FIG. 2 illustrates a PEM fuel cell. The PEM fuel cell employs hydrogen ($H_2$) as a feed for an anode (10) and oxygen ($O_2$) in air as a feed for a cathode (12). Those fuels decompose electrolytically to yield water at the cathode. Both anode and cathode are typically modified with a noble metal catalyst, for example, platinum (Pt). The hydrogen and oxygen are separated by a proton exchange membrane 14 (such as Nafion) to prevent thermal decomposition of the fuels at the noble metal catalyst. The reactions at the cathode 12 and anode 10 can be summarized as follows:

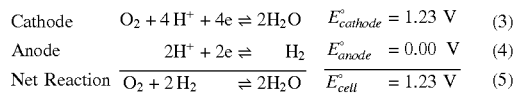

(3)
(4)
(5)

However, a fuel cell typically runs under non-equilibrium conditions and is thus subject to kinetic limitations. Usually, the majority of the kinetic limitations are at the cathode 12:

$$O_2 + 4H^+ + 4e^- \rightleftharpoons 2H_2O \quad E°_{cathode}=1.23V \quad (6)$$

As the cathode reaction becomes increasingly kinetically limited, the cell voltage drops and a second reaction path, the two electron/two proton reduction of oxygen to peroxide, becomes increasingly favored. The second reaction path consumes oxygen in two electron steps with lower thermodynamic potential as follows:

$$O_2 + 2H^+ + 2e^- \rightleftharpoons H_2O_2 \quad E°_{H_2O_2}=0.68V \quad (7)$$

The standard free energy of the reaction in equation (7) is 30% of the free energy available from the four electron reduction of oxygen to water shown in Equation (6). The decrease in current associated with the decreased number of electrons transferred, combined with the decreased cell potential, yields a substantially lower fuel cell power output.

The cathode reaction efficiency can be enhanced by increasing the concentration or pressure and flow rate of the feeds to the cathode 12 (i.e., protons and oxygen) to enhance the flux (i.e., the reaction rate at the cathode 12 in moles/cm$^2$s$^{-1}$). The proton flux is readily maintained at a sufficiently high value by the proton exchange membrane 14 (e.g., Nafion) to meet the demand set by the cathode reaction. Normally, the flux is enhanced and the reaction is biased to favor the formation of water by pressurizing the air feed to the cathode 12. Typically, pressures of at least 5 to 10 atmospheres are required.

At least three major impediments prevent large-scale commercialization of PEM fuel cell technology. First, the kinetics for hydrogen oxidation in an $H_2/O_2$ fuel cell are very rapid compared to the kinetics of oxygen reduction. To overcome the kinetic limitations of oxygen, the cathode 12 is pressurized to roughly five times the anode pressure. The resulting change in the oxygen concentration at the cathode 12 shifts the reaction toward the desired electrolysis product, which is water. In a fuel cell that substitutes air for oxygen, pressurization sweeps out the inert nitrogen, which can build up in the cathode 12, and reduces the local partial pressure of oxygen. Unfortunately, the pumps required to pressurize the cathode 12 cause a parasitic power loss of approximately 15% and significantly increase the weight and noise of the fuel cell. The moving parts of the pumps also increase the complexity and the number of failure mechanisms of the system. As a result, pumps are particularly disadvantageous for portable applications.

A second impediment is that hydrogen is not the most convenient fuel, given its exothermic (flammable and explosive) reactivity with oxygen. Indirect reformation of organic fuels over, for example, a hot, copper and zinc catalyst to yield hydrogen to feed the fuel cell, is an alternative fuel source. Direct reformation, where the fuel is fed directly to the anode 10, is the optimal method for using organic fuels. However, the problem of electrode passivation with by-products such as carbon monoxide remains.

A third impediment is that feeding an organic fuel directly into the anode 10 creates a secondary complexity. The separator 14 tends to imbibe organic fuels, which cross the membrane to the cathode 12 and react directly with the oxidant in the presence of the catalyst. The direct reaction short circuits the electron flow through the external circuit and reduces the fuel cell power output. Even with hydrogen fuel cells, significant power losses occur when the proton carries too much water from the anode 10 to the cathode 12, because the anode 10 dries and the cathode 12 floods. This is commonly known as crossover.

The above references are incorporated by reference herein where appropriate for appropriate teachings of additional or alternative details, features and/or technical background.

SUMMARY OF THE INVENTION

It is therefore an object of the invention to provide an improved electrode.

Another object of the invention is to provide a coating on an electrode to enhance the flux of magnetizable species to and from the electrode.

Another object of the invention is to provide a separator to separate magnetic species from each other dependent upon magnetic susceptibility.

Another object of the invention is to provide a method for making a coating for an electrode to improve the flux of magnetizable species to and from the electrode.

Another object of the invention is to provide a method for coating a surface of a device with a magnetic composite material responsive to an external magnetic field.

Another object of the invention is to provide an improved fuel cell.

Another object of the invention is to provide an improved cathode in a fuel cell.

Another object of the invention is to provide an improved anode in a fuel cell.

Another object of the invention is to provide an improved battery.

Another object of the invention is to provide an improved flux switch.

Another object of the invention is to provide an improved electrolytic cell.

Another object of the invention is to provide an improved electrolytic cell for an electrolyzable gas.

Another object of the invention is to provide an improved electrode for direct reformation of liquid or gaseous fuels.

Another object of the invention is to provide an electrochemical cell having improved power generation and/or synthetic capability.

Another object of the invention is to provide a method for coating the surface of an electrode, wherein the electrode allows direct reformation of a liquid or gaseous fuel.

Another object of the present invention is to develop experimental systems to simplify investigation of and to facilitate heterogeneous and homogeneous electron transfer in a magnetic field.

Another object of the present invention is to extend the models and broaden the application of simple heterogeneous and homogeneous electron transfer in a magnetic field to include the adsorption and solution phase chemical steps often important in real systems.

One advantage of the invention is that it can enhance the flux of paramagnetic species to an electrode.

Another advantage of the invention is that it can enhance the flux of oxygen to the cathode in a fuel cell, equivalent to passive pressurization.

Another advantage of the invention is that it can separate paramagnetic, diamagnetic, and nonmagnetic chemical species from a mixture.

Another advantage of the invention is that it can separate chemical species according to chemical, viscosity, and magnetic properties.

Another advantage of the invention is that it can take advantage of magnetic field gradients in magnetic composites.

Another advantage of the invention is that it can be designed to work with internal or external magnetic fields, or both.

Another advantage of the invention is that it establishes magnetic fields at the surface of an electrode.

Another advantage of the invention is that it stabilizes free radicals generated during the electrolysis process.

Another advantage of the invention is that it allows the choice of alteration of the product distribution.

Another advantage of the invention is that, unlike thermal energy sources such as engines and generators, electrical devices such as batteries and fuel cells are not saddled with thermodynamic constraints (Carnot limitations) including thermal efficiencies of about 40% theoretical maximum and about 25% practical efficiency, and therefore, electrical devices such as fuel cells can exhibit 100% maximum and 90% practical efficiency.

Another advantage of the invention is that PEM fuel cells run at temperatures below about 100° C.

Another advantage of the invention is that PEM fuel cells give higher power per area and can reduce weight, thus reducing size and heat transfer problems.

Another advantage of the invention is that fuel cells can be designed with constant power and scalable current-voltage characteristics, because the fuel cell can be built as a set of patch cells on a single membrane and those cells can be interconnected in series or parallel such that a single fuel cell device could serve as a power source to a variety of devices, and higher current is provided by connecting more cells in parallel, and higher voltage is provided by connecting more cells in series.

Another advantage of the invention is that fuel cells are inherently simple devices with no moving parts, and the need for replacement parts and the likelihood of mechanical failure of a fuel cell are much lower than that of mechanical devices, such as engines and generators.

Another advantage of the invention is that PEM fuel cells are conformable and can be designed as flexible thin packages. For example, a package resembling an overhead transparency in plastic bag would provide sufficient power to run a laptop.

Another advantage of the invention is that PEM fuel cells without pumps weigh less than batteries, and are significantly lighter than engines and generators.

Another advantage of the invention is that PEM fuel cells occupy less volume than an engine or generator for approximately the same power output, and the volume is conformable.

Another advantage of the invention is that PEM fuel cells without pumps make no noise.

Another advantage of the invention is that PEM fuel cells are based on polymeric materials and platinized carbon and thus produce little or no toxicity or environmental risk as compared to batteries.

Another advantage of the invention is that because the PEM fuel cell is a device to convert fuel to energy and, as a battery is a container to hold energy, a less extensive supply line is needed to provide fuel alone instead of disposable battery packages.

Another advantage of the invention is that because fuels such as hydrogen, methanol or gasoline have high energy densities (energy per weight), fuel cells provide a higher power density (power per weight) than batteries and, with current technologies providing energy densities of 50 W/kg, hydrogen/air fuel cells provide a power density of about 400 W/kg.

Another advantage of the invention is a three-fold improvement in power with magnetic modification.

Another advantage of the invention is that fuel cells can run constantly as long as fuel and oxygen are provided. They can also be turned on and off for intermittent use.

One feature of the invention is that it includes a magnetically modified electrode.

Another feature of the invention is that it includes an electrochemical cell having at least one electrode with a magnetic composite material disposed on the surface thereof, wherein the electrochemical cell provides enhanced power generation and/or synthetic capability.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements wherein:

FIGS. 19A and 19B show fuel cells in alternative arrangements.

FIG. 43 is a table with cell temperature values and corresponding current density values at a constant voltage of 0.4 volts.

FIG. 44 is a table displaying the results of a fuel cell experiment.

DETAILED DESCRIPTION OF PREFERRED EMBODIMENTS

Figure 1:
FIG. 1 is a schematic illustrating a homogeneous electron transfer prior art representation between one ion $A^z$ and another ion $B^y$.
Figure 2:
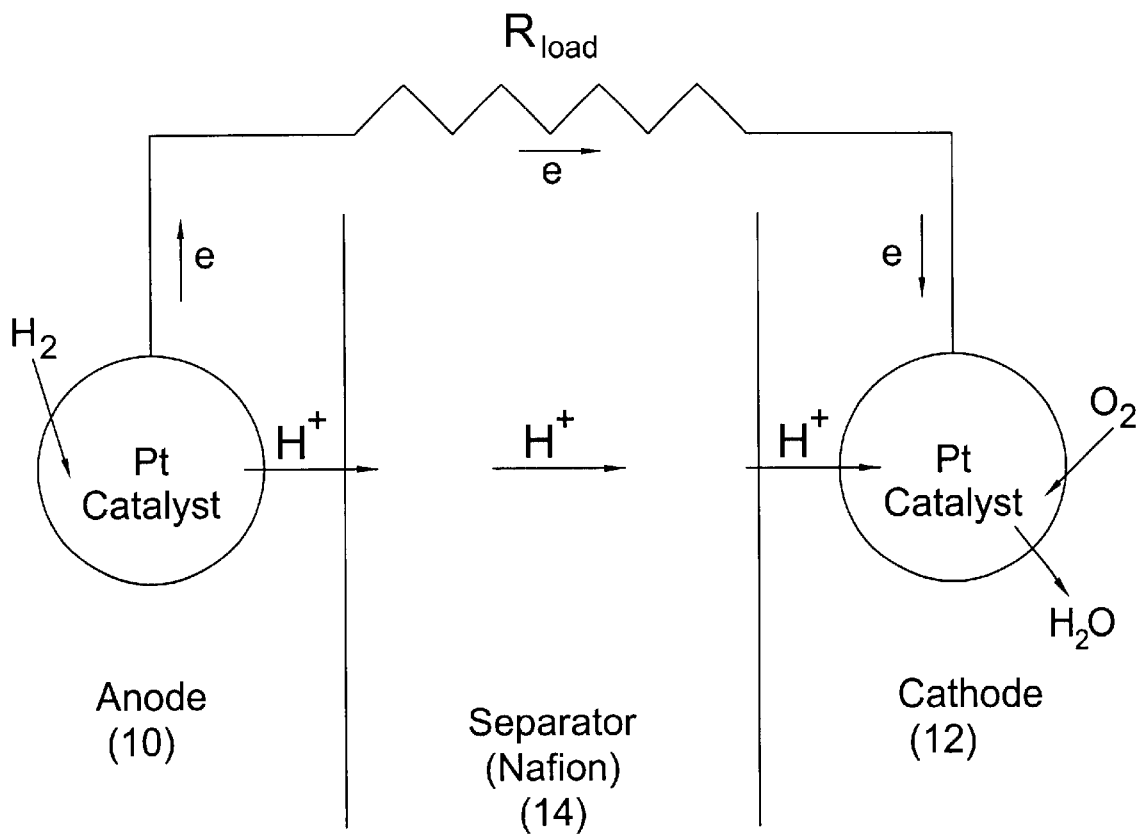
FIG. 2 is a schematic illustrating a prior art $H_2/O_2$ PEM fuel cell, with a platinum catalyst at the anode and cathode as well as a Nafion® separator.

In the discussion that follows, it will be shown that electron transfer reactions and interfacial fields in properly prepared composite materials can be exploited to enhance flux in electrochemical systems such as fuel cells, batteries, membrane sensors, filters and flux switches. Such fields may also be exploited in separations of light and heavy transition metals and complexes thereof. The heavy transition metals include the lanthanides and the actinides which have atomic numbers 58–71 and 90–103, respectively.

As used herein, the term "fuel" includes mixtures of one or more fuels, either solid, liquid or gaseous, with other fuel or non-fuel components, including fuel mixtures of one or more fuels with air. As used herein, the term "fuel mixture" refers to a mixture of a fuel with one or more different fuel or non-fuel components.

Experimental results explore and map the response of various systems under magnetic perturbation to assist modeling efforts, and provide new methods and protocols for magnetic modification of reaction rates. The magnetic effects on heterogeneous electron transfer may impact not only electrochemical electron transfer events, but also may provide design paradigms for optimizing heterogeneous catalytic processes. Such processes often proceed through free radical intermediates, which are highly susceptible to magnetic fields, such as polymerization processes at solid catalytic sites.

Electrochemical reactions involving an electrode can be driven in two ways. First, if the kinetics permit the reaction to proceed spontaneously, the reactants must be separated in compartments or phases. Once the circuit is closed and the anode and cathode are connected through an external load or electronic device, electrons will flow through the circuit. Examples include discharging batteries and fuel cells.

Second, if the reaction will not proceed spontaneously, an external electronic device (power source) can apply a potential to the electrodes and drive the reaction by providing the necessary energy. Examples include charging batteries and electrochemical syntheses.

Electrochemical Reactions

Electrochemical cells can be viewed as circuits consisting of a cathode electrode, an anode electrode, a phase between the electrodes and an electronic load or source to complete the circuit between the cathode and anode electrodes. In an electrochemical cell, current is carried by electrons and ions. In the electrodes and in electronic equipment, the current is carried by electronic conduction. Under basic electrochemical conditions, the phase between the electrodes consists of a solution containing an electrolyte and a substantially lower concentration of electroactive material, where this phase serves as the ion conductor.

Current in the solution is carried by ionic conduction. The ionic and electronic conduction are interconverted at the interface of the electrodes and solution. At the cathode, electrons pass from the electron conductor of the cathode to a redox species which diffuses from the solution to the electrode surface and receives the electron. The reduced product then diffuses back into the solution. Simultaneously, an electroactive species diffuses from the solution to the anode surface and surrenders an electron to the anode, and the oxidized product diffuses back into the solution. Ion motion in the solution balances the charges.

Charge is typically carried in the phase between the electrodes by ionic conduction rather than electronic conduction, based on the concentration and the rate of electron hopping, or exchange. Consider two halves of a redox couple A and B, where A is the oxidized form of the species and B is the reduced form (for example, $Fe^{+3}$ and $Fe^{+2}$, respectively). In a solution containing both A and B, A can move toward the cathode by physical diffusion, also known as mass transport or ion transport. Alternatively, proximal moieties of A and B may exchange electrons. Consider the following string of moieties:

A new order can be achieved as follows:

either by $A_3$ and B physically exchanging places physical diffusion) or, if conditions are appropriate, by $A_3$ and B exchanging an electron, which is equivalent to interchanging $A_3$ and B:

$$A_3 + B \rightleftharpoons B + A_3 \qquad (8)$$

This phenomena, known as electron hopping or exchange, has the same effect as mass transport but occurs by exchanging an electron rather than physical motion of the nuclei of the species. Mass transport and electron exchange may occur concurrently in a solution. The phrase "self exchange" refers to electron exchange between the oxidized and reduced form of the same species, while the word "exchange" refers to electron exchange between any oxidized and reduced species. The success of electron transfer depends on at least the concentration and the electron hopping rate, as will be discussed in more detail below.

Flux provides a measure of the amount of material passing through a cross-sectional area per unit time, and can be used to characterize the motion of electrons, ions, or a combination thereof. FluxJ(x,t) is related to the current i(t), the cross-sectional area A, and the number n of electrons transferred in a reaction, for $A+ne \rightleftharpoons B$ as follows:

$$J(x, t) = \frac{i(t)}{nFA}, \qquad (9)$$

where F is Faraday's constant, or 96,485C/mole of electrons, which interconverts charge and moles of electrons,. Often, flux through a phase is characterized as current, whether carried by electrons or ions. Flux or current carried by electrons is electronic, and flux or current carried by ions is ionic.

Electrons can hop between moieties, but the distance over which they can hop successfully decreases exponentially with distance, x. The rate of electron hopping with distance is:

$$\text{Rate } k \exp[-\beta x] \qquad (10)$$

where β, which has been measured in various systems, is on the order of about 1 $Å^{-1}$, and k is the basic rate of electron hopping. When x=0, k is the rate. For simple electron transfer to occur, the molecules should typically be no further than about 20 Å apart, although disagreement exists in the art about the distance requirements in extremely large, biologically significant molecules. Distance d between the molecules is related to concentration c* (moles/liter) as

Once the concentration exceeds about 0.2 M, the distance between molecules becomes about 20 Å or less, and electron exchange becomes possible.

A possible factor impacting k is the presence of a magnetic field. Turro et al., *J. Am. Chem. Soc.*, Vol. 105, pages 1309–1316, 1861 and 6347–6349 (1983), and Turro et al., *J.Am. Chem. Soc.*, Vol. 106, page 5023 (1984), which are herein incorporated by reference in their entirety, discuss the use of magnetic fields in micellar environments to impact electron exchange in radical pairs. An approximately ninefold rate enhancement was observed, as predicted by theory. For transition metal complexes, higher enhancements may be possible through other magnetically susceptible phenomena.

The present experimental calculations show that a magnetic field enhances the first electron transfer step in the 4 electron/4 proton reduction of oxygen to water by about $10^4$. The reaction is as follows:

$$\begin{array}{cccccc}
 & H^+, e & & H^+, e & H_2O_{(sol)} \uparrow\downarrow & 2H^+, 2e & & (12)\\
O_{2\,(ads)} & \leftrightarrows & HO_2\cdot_{(ads)} & \leftrightarrows & H_2O_{2\,(ads)} \leftrightarrows 2HO_{(ads)} & \leftrightarrows & 2H_2O_{(ads)} & \leftrightarrows 2H_2O_{(sol)}\\
\text{2 unpaired e} & & \text{1 unpaired e} & & \text{2x(1 unpaired e)} & & & \\
\text{paramag.} & & \text{paramag.} & & \text{diamag.} \quad \text{paramag.} & & \text{diamag.} & \text{diamag.}
\end{array}$$

Enhancement factors may also exist for other systems. Lanthanide and actinides show bigger effects than transition metals and organics, as will be discussed below.

Homogeneous electron transfer is a one-phase reaction which usually occurs in a solution, but can also occur in a solid or a gas. A self exchange reaction occurs between two different oxidation states of the same species, e.g., $Fe^{2+}$ and $Fe^{3+}$:

$$A^z + A^{z-1} \rightleftharpoons A^{z-1} + A^z. \tag{13}$$

Figure 3:
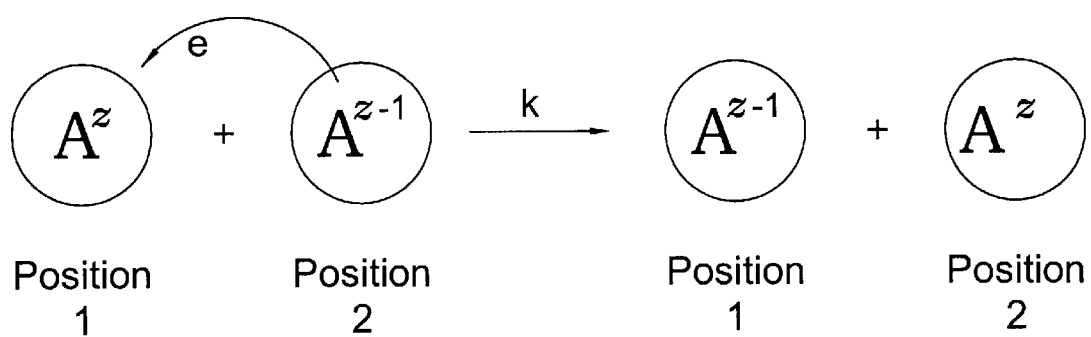
FIG. 3 is a schematic illustrating a self exchange reaction as an example of homogeneous electron transfer.

FIG. 3 illustrates a homogeneous self exchange reaction, where two ions of the same species $A^z$, $A^{z-1}$ maintain their respective positions 1,2, and electrons hop from the more negatively charged species $A^{z-1}$ to the less negatively charged species $A^z$. A self-exchange toward completion.

The self exchange electron transfer is functionally equivalent to aphysical diffusion process known as mass transport, where the species at positions 1 and 2 exchange positions by physically moving around each other, as discussed above. If the self exchange reaction rate k is fast enough, it can exceed the physical diffusion rate due to the lower energy cost of passing an electron, as opposed to the physical movement of the two species. Thus, for appropriate conditions, self exchange can enhance flux.

The Dahms-Ruff model describes the relative importance of the self exchange mechanism with respect to physical diffusion. Although computer modeling of mass transport effects due to magnetic field gradients in the interfacial region does not show a change in the rate of physical diffusion in the magnetic microsphere/Nafion composites, the apparent diffusion coefficient in the magnetic composites is greater than the apparent diffusion coefficient in the nonmagnetic microsphere due to the effects of induced magnetic fields on the self exchange rate in the interfacial region. The Dahms-Ruff equation relates the self exchange rate kexto the apparent (measured) diffusion coefficient, $D_{ap}$ (cm²/sec), that can be obtained from electrochemical techniques as follows:

$$D_{ap} = D_{mt} + \frac{\delta^2 k_{ex} C^*}{6}, \tag{14}$$

where $D_{ap}$ is the apparent diffusion coefficient, $D_{mt}$ is the physical diffusion coefficient (cm²/s), δ is the distance of closest approach of two redox couple molecules (cm), $k_e$ is the self exchange rate (m⁻¹s⁻¹), and C* is the concentration of redox couple in the composite film.

Electrochemical perturbation allows control of self-exchange reactions and a determination of $D_{ap}$. The impact of the magnetic field of $k_{ex}$ will be reflected in $D_{ap}$ to the extent that $D_{mt}$ is small and C* is large.

The present experimental data relate the magnetic microsphere composites to the Nafion composites by calculating the ratio of the magnetic composites flux to the Nafion film flux. This ratio is $$\sqrt{\frac{D_{magneticcomposite}}{D_{nafion}}},$$

where $D_{magneticcomposite}$ is the apparent diffusion coefficient ($D_{ap}$) of the redox species through the magnetic composites and $D_{nafion}$ is the apparent diffusion coefficient ($D_{ap}$) of the redox species through the Nafion film. That ratio can be modeled if the physical diffusion coefficient ($D_{mt}$) of the redox species in Nafion is known.

Previous modeling has shown that the diffusion coefficient in the presence of a magnetic field is within 10% of the diffusion coefficient in Nafion, so the same $D_{mt}$ applies to both the Nafion system and the magnetic composite system. Thus, the self exchange rate in Nafion is known, the self exchange rate in the magnetic composite is calculated, the distance of closest approach δ is known, and the concentration in the film, and in the composite, is assumed to be fully loaded. Known values for all information, except the self exchange rate in the magnetic composites, were used.

The self exchange rate of the magnetic microsphere composite was calculated as $$k_{ex} K = K k_{ex}(s^{-1}), \tag{15}$$

where K is the stability constant, which is known in the art and $k_{ex}$ is the first-order self exchange rate. The first-order self exchange rate was approximated for several outer sphere reactions as:

$$k_{ex} = \frac{\Delta g \beta H}{\hbar \pi} \simeq 3 \times 10^6 \Delta g H, \tag{16}$$

where Δg is the difference in g-factor of the two states of the redox species, β is the Bohr magneton, and H is the magnetic field in Gauss. The magnetic field is assumed to be 2000 Gauss by previous calculation on the beads. The g-factor difference Δg was calculated from the g-factors of the two states of the redox species. For paramagnetic states, the g-factor was determined from EPR measurement. The redox couple in the desired state was dissolved in water and mixed with Nafion solution in a mixture that resulted in films with about 0.3M concentration of redox couple. The redox couple/Nafion solution was then pipetted into an EPR tube and dried. The dried films were then washed several times with deionized water and the excess water was drained off. An EPR spectra of the dried redox couple/Nafion films was taken to determine the g-factor.

Not only is self exchange enhanced by increased rate $k_{ex}$ and concentration as discussed above, but it is also favored by slow physical diffusion.

Magnetic field effects on homogeneous self exchange reactions have been described theoretically in the literature, and modeling the impact of a magnetic field on homogeneous self exchange rates requires quantum mechanical models. FIGS. 4a and 4b show the present experimental data can be modeled in that manner. FIG. 4a illustrates a regression line for the Dahms Ruff model fit to the experimental flux enhancement, and FIG. 4b illustrates the regression line for the Dahms Ruff model fit to the experimental electron transfer rate. The magnetic effect on the self exchange rate was coupled to the Dahms Ruff model for self exchange, and the model was developed with no adjustable parameters. The regression fit of the experimental data and the model is highly accurate ($r^2$=0.9985).

Turro et al., *Accounts of Chemical Research*, Vol. 13, pages 369–377 (1980), which is herein incorporated by reference in its entirety, studied a class of homogeneous exchange reactions. Unlike the effects observed by Turro et al. on organic radicals in micellar (soap bubble) environments in uniform magnetic fields, where the reactions are driven photochemically as discused above, the effects observed in the composites include:

(i) higher flux/rate enhancements, because the transition metal complexes exchange rate $k_{ex}$ studied for the present experiment can be enhanced significantly above the corresponding rates for organic species;

(ii) for the transition metal complexes, the magnetic fields open new reaction channels by enabling otherwise difficult radical interactions, including spin-forbidden reactions, thus explaining the almost thirty-fold enhancement achieved for $Co(bpy)_3^{2+}$ and $Co(bpy)_3^{3+}$; and (iii) reactions include at least some heterogeneous electron transfer process where the magnetic field impacts the rate.

The experimental results for the transition metal complexes are described by the homogeneous self exchange reaction, which occurs beyond the plane of the electrode, in the composite and in the solution volume. More specifically, that reaction occurs at the interface between the Nafion and the magnetic particles. Heterogeneous electron transfer must also occur at that electrode surface, as will be discussed in further detail below.

Figure 5:
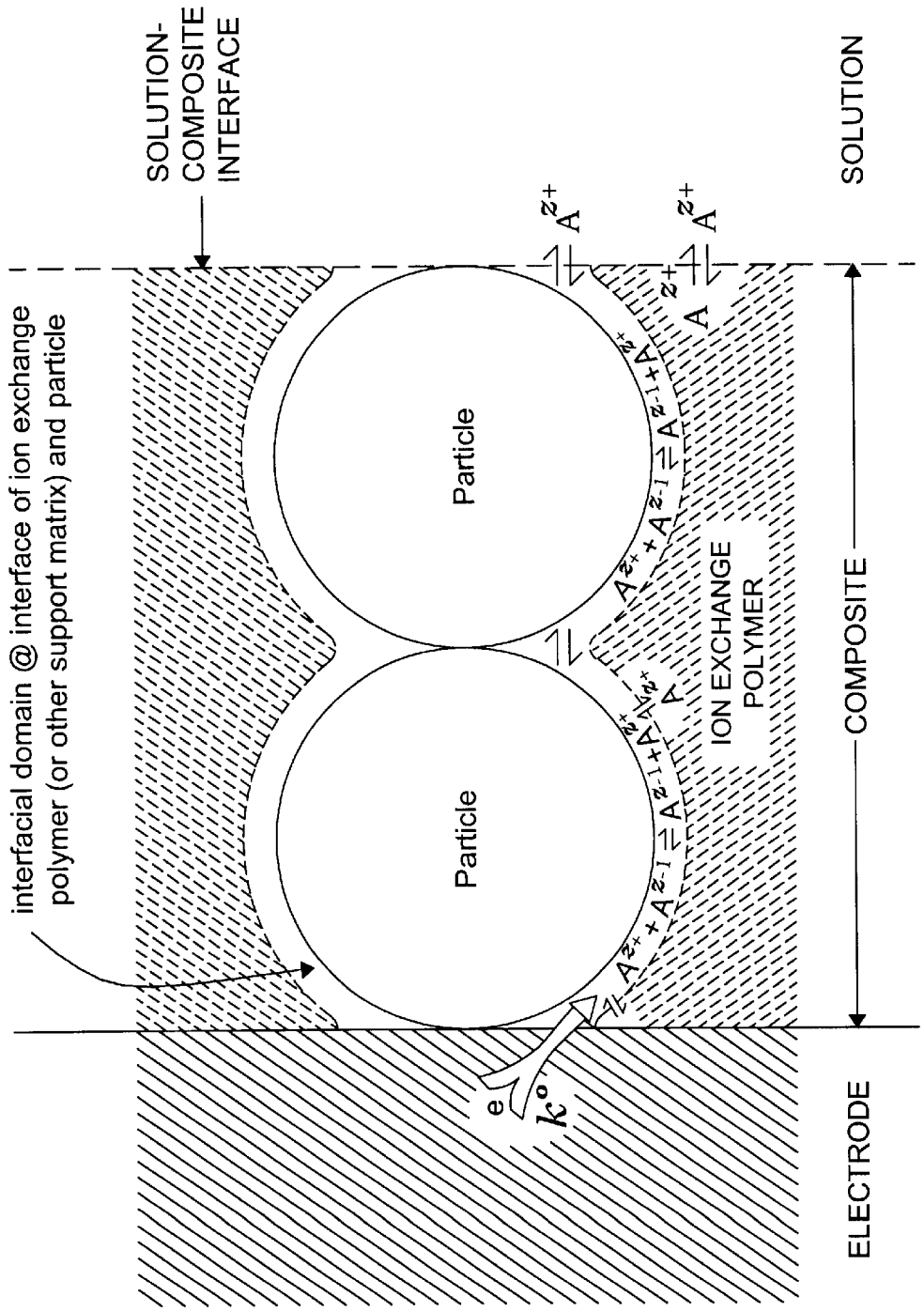
FIG. 5 is a schematic illustrating an electron transfer reaction in the presence of an ion exchange polymer or other support matrix as a composite.

FIG. 5 illustrates the electron transfer reaction and the effects of a magnetic field placed at the electrode. Dark arrows indicate processes where the magnetic field can have an effect on electron transfer. Particles are non-magnetic in non-magnetic composites (e.g. polystyrene bead with non-magnetic core), and magnetic in magnetic composites. IEP represents the Ion Exchange Polymer or other support matrix. FIG. 5 also shows an illustration of electron transfer at the electrode surface converting $A^{z+}$ to a product involving oxidation to $A^{+(z+1)}$ or reduction to $A^{z-1}$, where reduction is based on the following reaction:

$$A^z + e^- \rightleftharpoons A^{z-1}. \tag{20}$$

An interfacial domain provides proximity to the particle and, for magnetic particles, to the strongest part of the magnetic field. The interfacial domain also provides a high concentration and restricts orientation to facilitate electron transfer between species $A^{z-1}$, $A^z$, $A^{z+}$ in the interface.

FIG. 5 shows the interface where conditions for self exchange are favorable. For appropriate species in the interface, the self exchange reaction augments physical diffusion and enhances the net flux at the interface. That enhancement increases the concentration of $A^{z+}$ at the electrode surface, such that more $A^{z+}$ is electrolyzed than would be possible without self exchange, and generates a higher current. Thus, the normal self exchange rate is increased by the self exchange reaction.

In addition to occurring at the interface, self exchange can also occur in a solution. However, the interfacial domain may provide a higher rate of self exchange by restricting the degrees of freedom of motion for species in the interface, which enhances the self exchange rate.

An interface always exists between two different structures. By establishing that interface, the energies of the interface will necessarily differ from those of the solution. A composite always contains such an interfacial zone, even if the zone only has a different energetic domain and not a unique structural domain. If there were no energetic difference at the interface, the component of composite would tend to be miscible and form a solution. Two components dissolving very slowly into each other would form a structurally distinct interface for at least some time interval.

If the particle does not touch the electrode surface, no significant flux enhancement occurs on a reasonable time scale. Thus, the interfacial channel between the electrode, the particles and the solution is important to the observed flux enhancements. Effectively, particles should contact the electrode surface to enhance the flux.

While FIG. 5 shows facilitated self exchange only for molecules in the interface, it is also possible that the interfacial species may be exchanging electrons with molecules in the IEP solution adjacent to the interfacial zone. In that case, the interface along the particle may act as an extension of the electrode surface by providing a nearly two-dimensional surface for exchange of electrons with species in the solution. The electron exchange to the solution from the interface has heterogeneous electron transfer characteristics, as will be discussed in more detail below.

The magnetic field created by the particles in the present example influences self exchange in the interface, self exchange from the interface to molecules in the solution adjacent to the interface, heterogeneous electron transfer at the electrode surface, self exchange across the composite solution interface, and self exchange from the interface to the bulk ion exchange polymer. In the present example, the magnetic field enhances the rate of the process. However, in more complex environments and reaction schemes, it may also be possible to slow a process or divert the energetics into a more desirable path.

Because magnetic fields affect electron transfer rates, magnetic fields can also enhance the rate of various electron transfer processes. Further, magnetic fields can enhance an otherwise negligible rate such that the magnetic field can enable a different reaction channel. As discussed above, magnetic fields can change product distributions by enabling alternative reaction pathways. Further, the present experiments have yielded observations of spin-forbidden electron transfer enhanced by the magnetic field. The largest of those enhancements is for the self exchange reaction for $Co(bpy)_3^{2+}$ and $Co(bpy)_3^{3+}$, where a current up to 30 times higher results for magnetic composites over non-magnetic composites.

The following self exchange reaction is discussed by Salikhov et al,. "Spin Polarization and Magnetic Effects in Radical Reactions", *Studies in Physical and Theoretical Chemistry*, Elsevier: New York, N.Y., Vol. 22, pg. 419 (1984), which is incorporated herein by reference in its entirety:

$$M^n + M^{n\pm1} \rightleftharpoons M^{n\pm1} + M^n \tag{17}$$

Under appropriate conditions of high concentration and slow physical diffusion, such reactions enhance apparent diffusion by electron exchange between $M^n$ and $M^{n\pm1}$ when the exchange in space of $M^n$ and $M^{n\pm1}$ is accomplished slowly by physical diffusion, but efficiently by electron exchange.

Enhancements are commonly observed for transition metal redox systems (e.g., $Co(bpy)_3^{+2/+3}$, $Ru(bpy)_3^{+2/+3}$, and $Os(bpy)_3^{+2/+3}$, where bpy=bipyridyl) concentrated in thin films of ion exchange polymers, such as Nafion, as discussed by Buttry et al., *J. Electroanal. Chem.*, No. 130, pages 333–338, (1981) and White, H. S.; Leddy, J; Bard, A. J., *J. American Chem. Soc.*, No. 104, pages 4811–4817 (1982), which are herein incorporated by reference in their entirety.

The self exchange reaction:

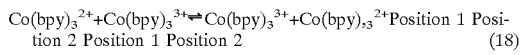

$$Co(bpy)_3^{2+} + Co(bpy)_3^{3+} \rightleftharpoons Co(bpy)_3^{3+} + Co(bpy)_{,3}^{2+} \text{Position 1 Position 2 Position 1 Position 2} \quad (18)$$

is otherwise highly spin-forbidden, but the magnetic field allows the reaction and facilitates self exchange through electron-nuclear spin polarization. Thus, magnetic fields can change the reaction channels and be used to change the products generated by a reaction.

It is likely that the 15-fold enhanced $O_2$ reduction currents and the suppression of electrode passivation for ethanol and its oxidation products (i.e., acetaldehyde and acetic acid) at magnetically modified electrodes are largely directed at the electrode surface of heterogeneous electron transfer and adsorption. The present experimental observations show evidence of magnetic field effects on heterogeneous electron transfer. There may also be effects on adsorption processes, especially if the process of adsorbed species involves full or partial transfer of electron density to the electrode or catalyst surface. The reaction pathway can be impacted magnetically by heterogeneous electron transfer, and possibly through effects on full and partial transfer of electron density to the electrode or catalyst surface. Magnetic fields may also impact proton transfer reactions, which can be important both in the presence and absence of electron transfer processes.

Heterogeneous electron transfer transpires across two phases, such as between a solid surface (such as an electrode or catalyst particle) and a molecule or ion in solution, where the net effect is the transfer of an electron e across the boundary as:

$$A^z + e \rightleftharpoons A^{z-1}. \quad (19)$$

Figure 6:
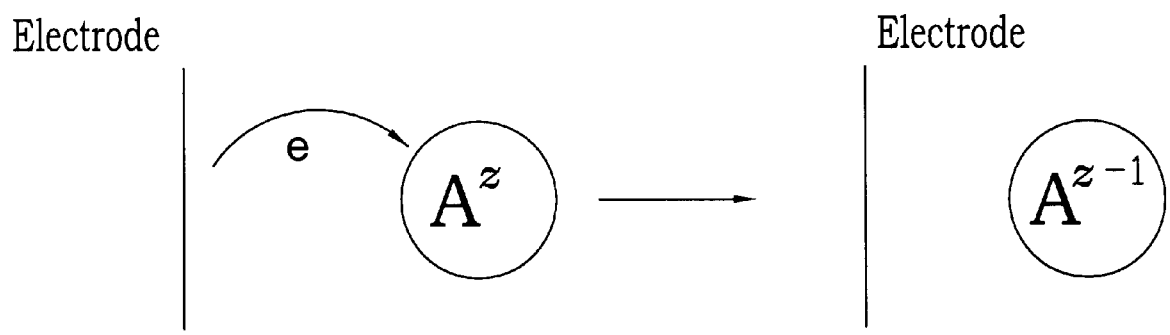
FIG. 6 is a schematic illustrating a heterogeneous electron transfer of an electron across a solid solution interface from an electrode to an ion $A^z$ in solution to form a product $A^{z-1}$.

FIG. 6 shows a heterogeneous electron transfer, where an electron e is transferred across the solid solution interface from the electrode to an ion $A^z$ in solution to form a product $A^{z-1}$.

Electron transfer reaction rates, k, are parameterized by a pre-exponential factor, A, and a free energy of activation $\Delta G^{\ddagger}$, where $k = A \exp[-\Delta G^{\ddagger}/RT]$. An externally applied, homogeneous magnetic field will have little effect on $\Delta G^{\ddagger}$, but can alter A. Nonadiabatic systems are susceptible to field effects. Magnetic fields alter the rate of free radical singlet-triplet interconversions by lifting the degeneracy of triplet states (affecting $\Delta G^{\ddagger}$), thus altering reaction rates in simple solvents by a factor of about three. Photochemical and electrochemical luminescent rates can also be altered by applied fields. Because magnetic coupling occurs through both electronic nuclear hyperfine interactions and spin-orbit interactions, rates can be nonmonotonic functions of the applied field strength, although the hyperfine interactions can be negligible. For singlet-triplet interconversions, the magnetic fields alter product distributions by causing the rate of interconversion to approach the rate at which free radicals escape from solvent cages.

Magnetic field effects on heterogeneous electron transfer reactions have not been modeled theoretically or reported in the literature to date. However, evidence for such effects exists in peak potential shifts and peak splitting in cyclic voltammetry. Based on the correlation between heterogeneous and homogeneous electron transfer, the experimental results of the present invention suggest that the theoretical models and experimental data on magnetic field effects on homogeneous electron transfer should correspond to analogous effects and theories for heterogeneous electron transfer.

Generally, magnetic field effects on chemical reactions arise through electron and nuclear spin polarizations include, and electron, nuclear, and electron nuclear. Electron spin polarization occurs when an external magnetic field causes an electron cloud of one molecule to precess around the vector of the applied magnetic field. Through interactions with an unpaired electron on a second molecule, the electron cloud subsequently causes spin relaxations between high spin and low spin states. A common example of spin relaxation occurs in intersystem crossing, where a species with two unpaired electrons (e.g., a triplet) is converted to a species with no unpaired electrons (e.g., a singlet).

Nuclear spin polarization occurs between two nuclei in a magnetic field when the polarized nucleus on the first center polarizes the nucleus of the second. No radicals are required, but one nucleus must be pre-polarized. Proton transfer reactions are a postulated example. Compared to electron and electron-nuclear spin polarization, nuclear spin polarization effects are small and slow.

Further, electron nuclear spin polarization occurs when electron spin polarization on one molecule causes electronic currents, that arise due to the precessing electron clouds, to introduce a secondary magnetic field at the nucleus of a second molecule.

Magnetic field effects on electron transfer rates, where rate enhancements occur through electron spin polarization, have been documented by Buchachenko, A. L. *Russian Chemical Review*, Vol. 45, pages 375–390 (1976); Turro et al., *Accounts of Chemical Research*, Vol. 13, pages 369–377, (1980); Steiner et al. *Chemical Review*, Vol. 89, pages 51–147 (1989), Atkins et al. T.P. *Annual Report of Progress in Chemistry*, Vol. 72A, pages 67–88 (1975); Atkins, *Chemistry in Britain*, Vol. 12, pages 214–228 (1976), and Sagdeev et al., *Russian Chemical Review*, Vol. 46, pages 297–315 (1977), all of which are herein incorporated by reference in their entirety. Electron spin polarization or intersystem crossing requires formation of a radical pair and thus only occurs between two radical species. Conventional theory restricts rate enhancement for singlet/triplet conversions to approximately ninefold. Enhancements of less than 50% for magnetic fields of 1 to 8T are typical for photoinduced electron transfer reactions for organic radicals in solution. Singlet S, doublet D, triplet T, and quartet Q species have zero, one, two, and three unpaired electrons, respectively.

An example of intersystem crossing is the doublet/triplet electron transfer reaction. A doublet/quartet intersystem crossover is shown below in equation (21), as the activated complexes involved are a doublet and a quartet.

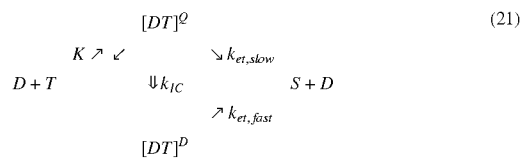

$$(21)$$

Steps susceptible to an applied magnetic field are indicated by a double arrow. The quartet-activated complex of D and T either slowly forms S and D or, if converted to a doublet activated complex $[DT]^D$ through electron spin polarization, rapidly dissociates to form the singlet S and doublet D products. Because the same amount of time is required to rephase two spins by $\pi$, the doublet/quartet and singlet/triplet intersystem crossing rates $k_{IC}$ are the same. When the net spin of the products does not exceed that of the reactants, the magnetic field increases the exchange reaction rate by augmenting the channel to the doublet complex. For the present system, the magnetic field increases the self exchange rate through electron nuclear polarization. Enhancements of up to approximately 2800% are observed.

Three electron nuclear polarization mechanisms for self exchange are considered in Equations (22), (26), and (27) below.

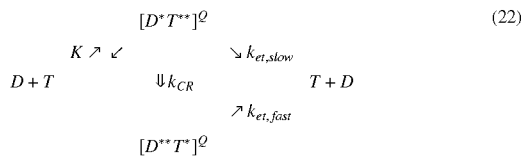

The first mechanism is similar to the intersystem crossing mechanism shown in Equation (21), except that the products retain the same net spin since, as a self exchange reaction, the products and reactants are the same. For example, a cross relaxation between a doublet and a triplet to form the triplet and the doublet shown in Equation (22) is typified by a self exchange reaction between $Co(bpy)_3^{+3}$, which is a triplet, and $Cr(bpy)_3^{+2}$, which is a doublet. Similar to the intersystem crossover above, a doublet/triplet radical pair is formed as a quartet in Equation (22). This complex, $[D^*T^{}]^Q$, can either slowly react to form T+D, or an electron nuclear polarization between T and D forms a new quartet complex $[D^{}T^*]^Q$ that reacts rapidly to form products.

The difference between the electron nuclear cross relaxation or dynamic polarization mechanism shown in Equation (22) and the intersystem crossing mechanism shown in Equation (21) is that cross relaxation is driven by electron nuclear polarization, while intersystem crossing involves only electron spin polarization. In electron nuclear cross-relaxation, an unpaired electron of the first reactant polarizes the nucleus of the second reactant, and facilitates the electron exchange. Unlike electron spin polarization, electron nuclear polarization allows polarization of singlet states.

The electron nuclear cross relaxation rate $k_{CR}$(s$^{-1}$) is as follows:

$$k_{CR} = \frac{\Delta g \beta H}{\hbar \pi} + \frac{\Delta g_N \beta_N H}{\hbar \pi} + \frac{A\beta}{2\hbar} \quad (23)$$

The constants $\beta$, $\beta_N$, and $\hbar$ are the Bohr magneton, Bohr nuclear magneton, and Planck's constant, respectively. H is the external magnetic field strength (Gauss), A is the hyperfine coupling constant, $\Delta g$ is the absolute value of the difference in the g-factors of the two reactants, and $\Delta g_N$ is the absolute value of the difference in the nuclear $g_N$-factors. Because $\beta \simeq 2000\beta_N$, and $\Delta g$ and $\Delta g_N$ are comparable, the nuclear spin polarization term is negligible. $A\beta/2\hbar$ describes hyperfine coupling. For negligible nuclear spin and hyperfine coupling effects, the expression for $k_{CR}$ and the intersystem crossing rate $k_{IC}$ are analogous.

The net self exchange rate under an externally applied magnetic field for electron nuclear cross relaxation is related to the electron nuclear cross relaxation rate $k_{CR}$ as follows:

$$k_{ex,1} = \frac{Kk_{CR}k_{et,fast}}{k_{CR} + k_{et,fast}} \quad (24)$$

$$\simeq \frac{K\Delta g \beta H}{\pi} + K\left[\frac{\Delta g_N \beta_N H}{\hbar \pi} + \frac{A\beta}{2\hbar}\right] \quad (25)$$

where $k_{et,fast}$ represents the fast electron transfer process rate from the second complex to the products. The stability constant for intermolecular electron transfer, K, describes the reversible formation of the first complex from the reactants. Equation (25) arises when $k_{CR} \gg k_{et,fast}$.

The second mechanism is a traditional self exchange reaction between paramagnetic (radical) and diamagnetic states common in metal complexes such as $Ru(NH_3)_6^{+2/+3}$, $Ru(bpy)_3^{+2/+3}$, and $Fe(H_2O)_6^{+2/+3}$. The mechanism is a spin-allowed, cross relaxation with electron nuclear cross relaxation as the only possible polarization process. With only one paramagnetic species, no radical pair can form and electron spin polarization is not possible. Self exchange studies of those redox systems provide the only experimental accessibility to a mechanism that proceeds strictly by electron nuclear polarization. In those systems, magnetic effects can only occur through electron nuclear cross relaxation. This mechanism yields an expression for the self exchange rate $k_{ex,2}$ which is similar to that for dynamic polarization $k_{ex,1}$ as shown below:

$$k_{ex,2} = \frac{Kk_{et,fast}\left[g_1\beta + g_N\beta_N + \frac{A\beta}{2\hbar}\right]\frac{H}{\hbar \pi}}{k_{et,fast} + \frac{\left[g_1\beta + g_N\beta_N + \frac{A\beta}{2\hbar}\right]H}{\hbar \pi}} \quad (26)$$

$$\simeq \frac{Kg_1\beta H}{\pi} + K\left[\frac{g_N\beta_N H}{\hbar \pi} + \frac{A\beta}{2\hbar}\right],$$

where $g_1$ is the g-factor of the paramagnetic species. Equation (26) arises when $$k_{et,fast} \gg \left|g_1\beta + g_N\beta_N + \frac{A\beta}{2}\right|H/\hbar\pi.$$

The third mechanism is similar to the second mechanism in that there is one paramagnetic and one diamagnetic state, but different in that the electron transfer is spin-forbidden. Self exchange between $Co(bpy)_3^{+2}$ (quartet) and $Co(bpy)_3^{+3}$ (singlet) provides an example. Because the reaction is spin-forbidden, it can proceed only though spin-orbit coupling or a preequilibrium spin change, as shown below:

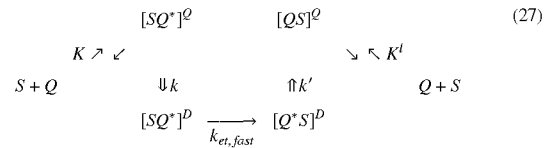

In the third mechanism, self exchange is disallowed between the quartet complexes, but allowed for the doublets. The quartet and doublet complexes are converted through a preequilibrium spin change that is the rate-limiting step in the self exchange reaction. Magnetic fields enhance preequilibrium spin changes. For fast electron transfer, Equation (26) also describes this process.

Equations (24) and (26), which describe all three mechanisms, are similar. The self exchange rate for all three mechanisms can be summarized in a rate constant expression, $k_{ex}$. For the present experimental conditions, the nuclear polarization and hyperfine coupling terms are small, and those equations simplify to $$k_{ex} = 3 \times 10^6 (sG)^{-1} K \tilde{g} H \tag{28}$$

where $\tilde{g}$ is $\Delta g$ if both reactants are paramagnetic and $g_1$ if only one reactant is paramagnetic.

A preferred embodiment of the present invention shows a larger field effect because the system undergoes electron transfer in a highly ordered micellar structure rather than a solution system. Further, an electron boundary provides a driving force for the electron transfer reaction to occur in the desired direction. The systems are also affected by magnetic fields to much higher degrees. Homogeneous electron transfer or self exchange reactions are bimolecular reactions that depend on the formation of a precursor complex, similar to the radical pair formation of electron spin polarization reactions.

Most electron transfer reactions are not affected by electron-nuclear cross-relaxation because it requires long-lived paramagnetic species, and because the diamagnetic state must have a polarized nuclei. Electron transfer reactions driven by external polarization provide the only experimental access to nuclear spin-dependent electron relaxations as discussed by Hore et al., *Chemical Physics Let.*, Vol. 75, pages 582–586 (1980), which is herein incorporated by reference in its entirety. However, whether by electron or electron nuclear spin polarization, all electron transfer reactions are susceptible to alteration in a magnetic field.

Magnetism

Links between electrical and magnetic phenomena have been known for over a hundred years, but the impact of magnetic fields on electron transfer reactions is not throughly characterized. As discussed above, theoretical models only cover homogeneous electron transfer reactions, as developed by Buchancheko, A. L. *Russian Chemical Reviews,* Vol. 45, pages 375–390 (1976), which is herein incorporated by reference in is entirety. Models predict that magnetic fields can enhance electron transfer rates for organic molecules up to an order of magnitude. For transition metal complexes, larger enhancements are possible.

The impact of magnetic fields on electron transfer phenomena has received little systematic and careful experimental investigation. The best characterized systems were studied in the existing literature by Atkins et al., *Annual Report of Progress in Chemistry,* Vol. 72A, pages 67–88 (1975); Atkins, *Chemistry in Britain,* Vol. 12, pages 214–228 (1976); Sagdeev et al., *Russian Chemical Review,* Vol. 46 pages 297–315 (1977); and Zuckerman, Ed., *Inorganic Reactions and Methods;* Vol. 15, VCH: Deerfield Beach, Florida (1986), all of which are herein incorporated by reference in their entirety, where electron transfer (singlet/triplet) reactions of organic molecules trapped inside aggregates of soap molecules (micelles) were investigated.

Figure 7:
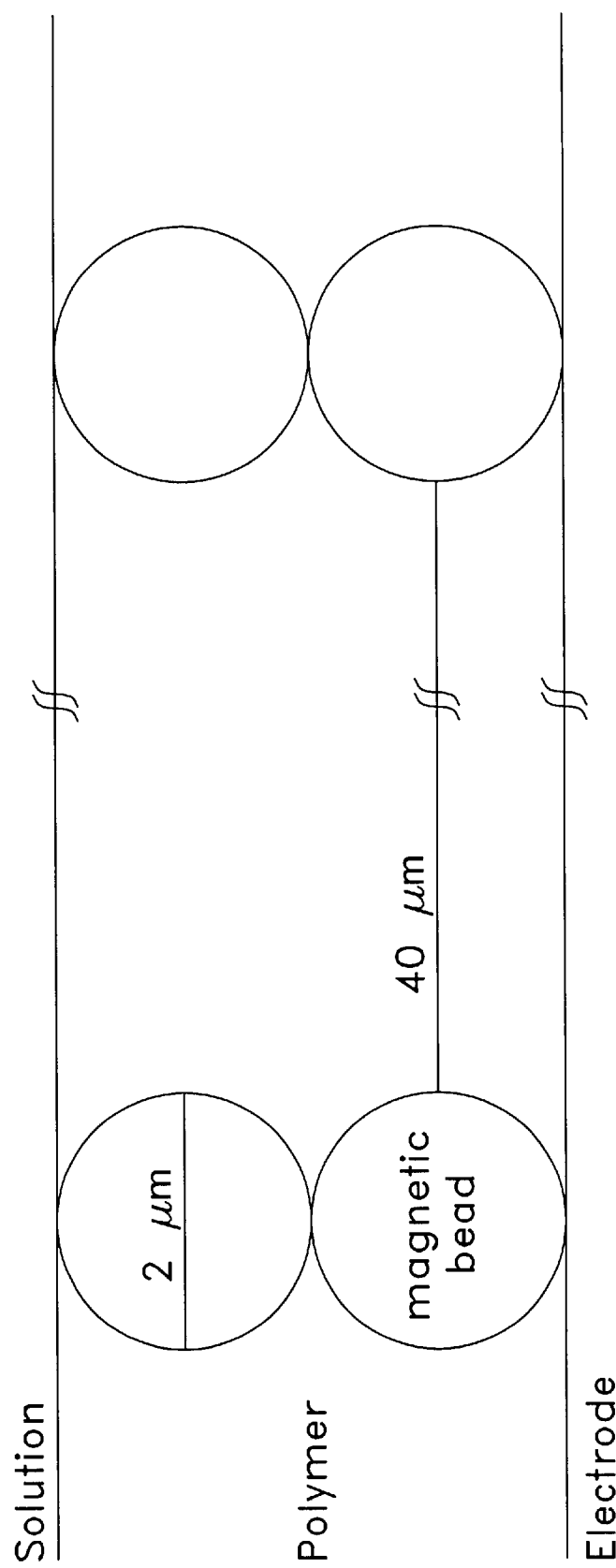
FIG. 7 illustrates a magnetic composite of small spherical magnetic particles imbedded in a polymer and connected with an electrode in a solution of ions.

The experimental results, which are part of the present invention, show that incorporation of magnetic micro-particles into a polymer matrix on an electrode surface can enhance electron transfer rates for transition metal complexes by approximately twenty-nine fold. Those examples demonstrate that magnetic fields can enhance reaction rates and improve reaction efficiencies in homogeneous electron transfer reactions, in the self exchange class. FIG. 7 illustrates a magnetic composite of small spherical magnetic particles embedded in polymer and supported on an electrode placed in an ion solution. The magnetic field enhances the ion electrolysis rate many-fold.

Theories for magnetic effects on heterogeneous electron transfer do not exist, in part due to the difficulty of obtaining good data, even for general electron transfer. Even for the most simple heterogeneous electron transfer in a magnetic field, no theory to describe the electron transfer rate exists in the art. The present invention implements a magnetic effect on heterogeneous electron transfer.

Two reactions in the present/experiments involving slow heterogeneous electron transfers and complications from adsorption are oxygen reduction and ethanol oxidation. At an electrode modified with magnetic micro-particles, the oxygen reduction rate is approximately fifteen times higher than at a similar electrode without magnetic modification. The significant increase in oxygen reduction efficiency may eliminate the need for oxygen pressurization and thus fuel pumps in fuel cells, substantially reducing the weight and parasitic power losses. Such an improvement would make fuel cells commercially and environmentally more attractive as a power source for vehicles and portable electronics, as will be discussed in greater detail below.

Ethanol oxidation also exhibits enhanced rates at magnetically modified electrodes. The reaction mechanisms for oxygen and ethanol are more complex than the homogeneous self exchange reactions, because the mechanisms are multi-step reactions involving electron transfers, absorption, and chemical steps.

Based on the present experimental results, and by analogy to homogeneous electron transfer theory, the impact of magnetic fields on heterogeneous electron transfer rates are substantial. The present invention provides a fundamental model of magnetic field effects on heterogeneous electron transfer that provides design paradigms for tailoring magnetic fields to enhance reaction rates, thus making electron transfer processes more efficient and less environmentally taxing. The model of the present invention applies to electrochemical systems as well as heterogeneous catalysis, and provides insights into the role of magnetic metal centers in enzymes and proteins.

Mass Transport

Magnetically driven mass transport has been studied in electrochemical cells placed between the poles of large magnets. Effects vary depending on the electrode orientation, forced or natural connection, and relative redox species and electrolyte concentrations. FIGS. 6, 7, 8, 9, and 10 illustrate three cases of mass transport.

Figure 8:
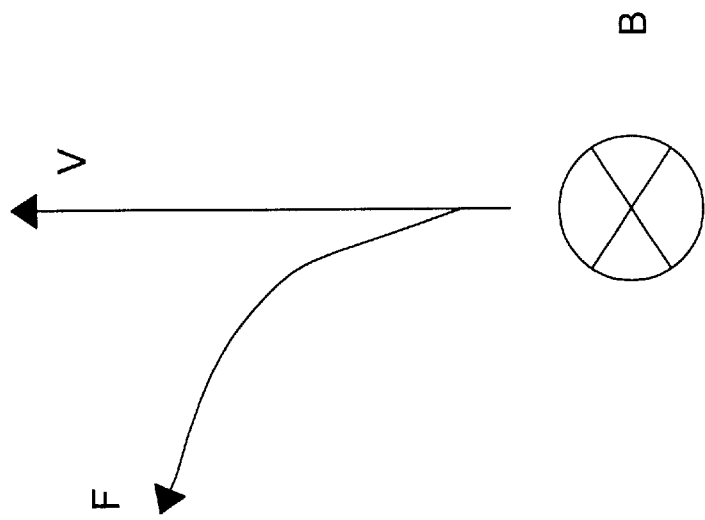
FIG. 8 shows the influence of electrode orientation and solvent motion on magnetohydrodynamic fluid motion for one geometry.

FIG. 8 shows the generation of a Lorenz Force F, which moves the charged particle toward the electrode for a charged species moving by natural or forced connection, parallel to an electrode and perpendicular to a magnetic field which is also parallel to an electrode. The magnetohydrodynamic effect is characterized by $$F = q(E + v \times B) \tag{29}$$

where F, E, v and B are vectors representing the Lorenz Force on a charged species.

Figure 9:
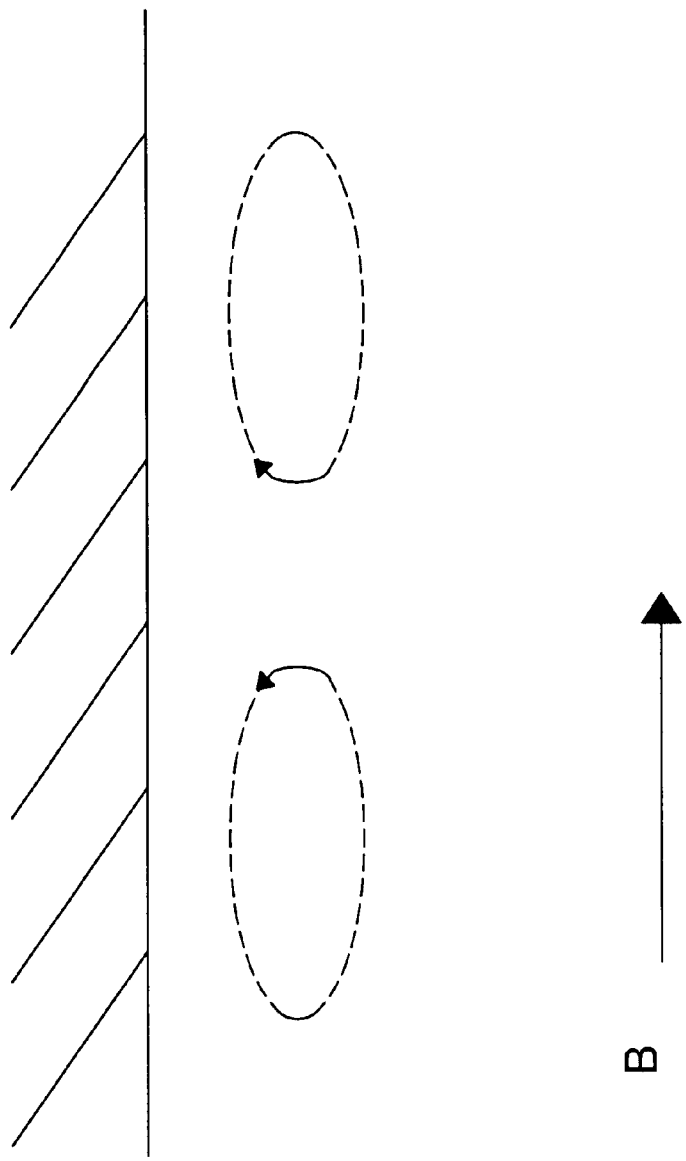
FIG. 9 shows the influence of electrode orientation and solvent motion on magnetohydrodynamic fluid motion for a second geometry.

FIG. 9 shows the electrode and magnetic field parallel to the earth. Thermal motion results in vertical motion at the electrode surface unless the field B and current density j are spatially invariant and mutually perpendicular, as represented below:

$$F_v = c^{-1}(j \times B), \tag{30}$$

where $F_v$ is the magnetic force vector per volume and c is the speed of light. Those forces are smaller than the Lorenz Forces.

Figure 10:
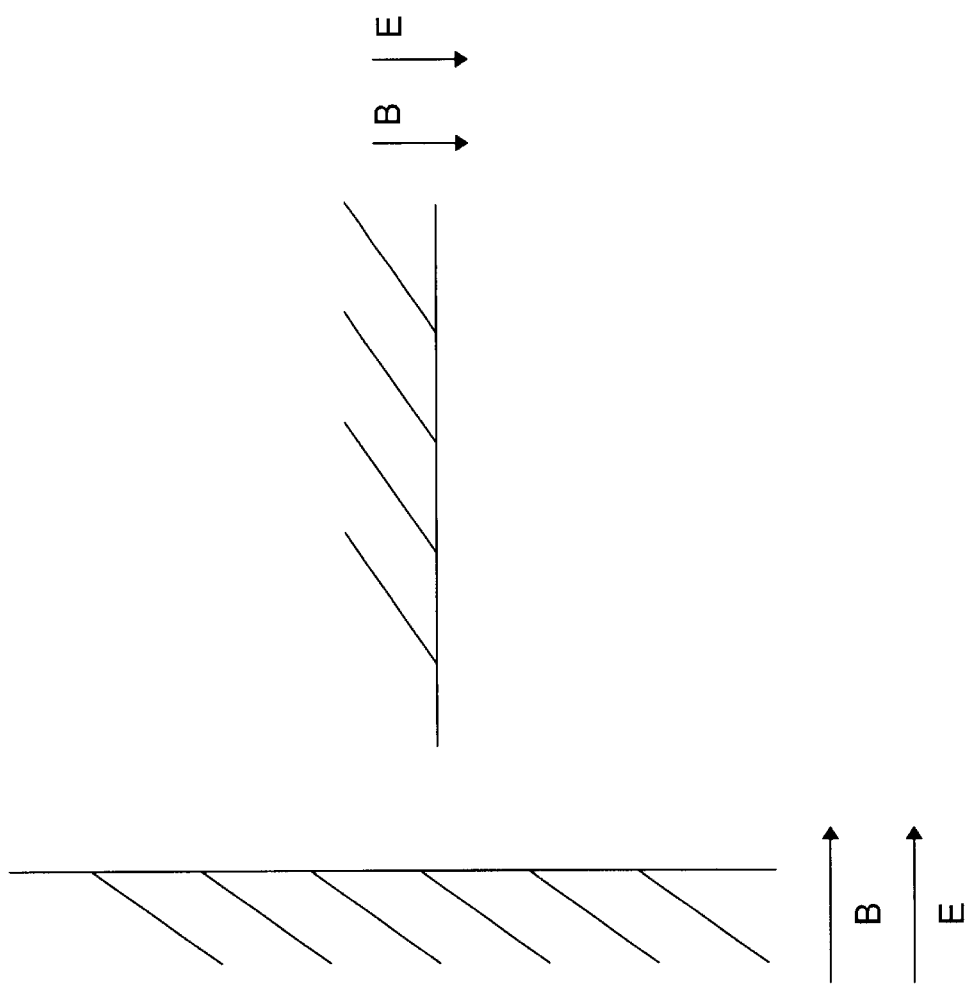
FIG. 10 shows the influence of electrode orientation and solvent motion on magnetohydrodynamic fluid motion for a third geometry.

FIG. 10 shows a magnetic field perpendicular to the electrode surface and thus parallel to the electrical field. Various results are reported for several configurations of FIG. 10, including: flux enhancements greater than 1000% for vertical electrodes in quiescent solution and flux retardations of 10% for electrodes parallel to the each other with forced connection.

Interfacial Gradients

Interfacial gradients of concentration, charge, dielectric constant, and electrical potential establish strong, interfacial forces which decay over a microstructural distance (about 1 nm to 100 nm). For example, for an applied potential of about 10 mV to 100 mV past the potential of zero charge at an electrode in 0.1 M aqueous electrolyte, the interfacial potential gradient (|electric field|) is $10^5$ V/cm to $10^6$ V/cm, but decays over a distance of about 1 nm. In a homogeneous matrix with few interfaces, interfacial gradients have a negligible effect on bulk material properties. However, in a microstructured matrix where the surface area to volume ratio is high, interfacial gradients can have a large effect on the properties of a composite. Models appropriate to the description of bulk materials have not been satisfactory when applied to these composites. Moreover, such composites provide an opportunity to design matrices to perform functions and exhibit properties not found in homogeneous materials, as will be discussed below.

The effects of gradients associated with the interfaces between the ion exchanger and its support matrix to enhance the transport of ions and molecules have been studied in ion exchange polymer (IEP) composites. The composites were formed by sorbing IEP's into high surface area substrates with well-established geometries. The flux of solutes through the composites was determined voltammetrically. When the solute flux through the ion exchange portion of the composites and the flux through simple films of the ion exchanger were compared, flux enhancements of greater than an order of magnitude were often observed for the composites.

Consistently, the ratio of surface area of the substrate to the volume of sorbed ion exchanger (SA/Vol) has been the critical factor in quantifying the flux enhancements. The flux enhancement characteristics were found to be dominated by the interface between the ion exchanger and the support. Several interfacial gradients have been identified as important, including concentration gradients, that lead to surface diffusion electric potential gradients that lead to migration, and magnetic field gradients, that lead to flux enhancements and electrode potential shifts.

Composites

Composites were made by intimately mixing two or more components to form a heterogeneous matrix. While composites retain some characteristics of their components, composites also exhibit properties distinct from those of the starting materials, which make composites of special interest.

The impact of microstructure on transport and selectivity in ion exchange polymers and their composites is significant. Novel characteristics arise from gradients and fields established at the interfaces between the components of the composites. Ion exchange polymers with an inherent microstructure, such as Nafion, exhibit superior transport, selectivity, and stability characteristics, compared to polymers with no inherent microstructure, such as poly(styrene sulfonate). When ion exchange polymers were supported on inert substrates with microstructural (about 5 nm to 100 nm) features similar in length to the microstructural features of the ion exchanger (e.g., about 5 nm micelles in Nafion), the structure of the ion exchanger was disrupted in an ordered manner. The relationship between the flux characteristics of the composites and the microstructure imposed by the substrates has yielded information about how microstructure contributes to the properties of ion exchangers. That relationship allows for the specification of design paradigms for tailoring composites with specific transport and selectivity characteristics.

Polystyrene-coated, approximately 1 $\mu$m to 2 $\mu$m Fe/Fe oxide (nonpermanent magnetic material) or organo-Fe (superparamagnetic or ferrofluid or permanent magnetic) microbeads are available (Bangs Labs, Polyscience, or Delco-Remy) as a 1–5% suspension in water, and Nafion (C.G. Processing) is available as a 5% suspension in alcohol/water. Other inert or active polymer coatings, as well as non-polymeric materials may also be used as encapsulating materials for the microbeads or magnetic particles. Examples of such encapsulating materials may include, for example: various polymers, silanes, thiols, silica, glass, etc. However, in some situations a polymeric or other coating material on the microbeads or magnetic particles may be completely eliminated, as will be described below. A similar result holds for superparamagnetic, ferrofluid, permanent magnetic, nonpermanent magnetic, ferromagnetic, ferrimagnetic material microbeads in general. Further, a similar result holds for other magnets and magnetic materials including, but not limited to, superconductors, and magnetic materials based on rare earth metals, e.g., cobalt, copper, iron, samarium, cerium, aluminum and nickel, and other assorted metal oxides, and magnetic materials based on neodymium, e.g., magnequench, which contains iron and boron in addition to neodymium. The samariam cobalt and neodynium magnets have a composite thickness of about 0.05 to 100 microns, and a microbead diameter of about 0.1 to 50 microns.

Under certain circumstances, some microbeads or magnetic particles in the present invention may require coating with, for example, a polymeric material. For example, a coating of an inert material may inhibit or prevent oxidation of the microbead material in aqueous environments. In other circumstances, e.g., iron oxide microbead compositions, the application of a coating to the microbead material is not required.

Magnetic composites incorporating organo-Fe material microbeads are formed by casting appropriate volumes of each suspension onto an electrode centered inside a cylindrical magnet (preferably 5 cm inside diameter, 6.4 cm outside diameter, 3.2 cm height; 8 lb pull). Once the solvents evaporate and the magnet is removed, the oriented beads are trapped in the Nafion and stacked in pillars normal to the electrode surface. To minimize interbead repulsion, pillars are formed by stacking the north end of one bead to the south end of another. To minimize interpillar repulsion, the pillars are arranged in a roughly hexagonal array. The aligned composites were formed with microbead fractions of no more than 15% and were compared to: (1) unaligned composites that are formed as described above, but with Fe/Fe oxide microbeads and without the magnet; (2) nonmagnetic composites that are formed with 1.5 $\mu$m nonmagnetic polystyrene beads; (3) simple Nafion films; and (4) demagnetized composites that are formed from aligned composites that are demagnetized. While demagnetized composites had a pillared structure, it is not clear if they were fully demagnetized. Further, nonmagnetic composites had a coral-like structure (i.e., they do not form pillars). Composites may be formed where at least one component is reversibly changeable between a paramagnetic form and a diamagnetic form with, for example, a temperature variation, and with or without an externally applied magnetic field.

Magnetic composites comprising particles of various materials such as, for example, iron oxides encapsulated or coated with a polymeric or other inert material, may be used to modify the interface of electrode surfaces to provide systems or devices with new and improved characteristics. Such systems and devices lend themselves to a broad range of useful and commercially valuable applications including, but not limited to, the separation of transition metal species from other species, and improved fuel cells and batteries.

Magnetic microbeads, available in water suspension (2.5% wt/vol) from Polyscience and Bangs Laboratories (hereinafter "Bangs"), include a central core of magnetic material shrouded with a layer of either polystyrene or poly(styrene-divinyl benzene). The core is magnetite, $Fe_3O_4$ black ferrimagnetic (with a density of 5.18 g/cm3), but the red orange tint of the beads is consistent with at least partial oxidation to $Fe_2O_3$, which is a ferromagnet (with a density of 5.240 g/cm$^3$). Oxidation or "aging" of $Fe_3O_4$ to $Fe_2O_3$ is reported in similarly prepared y-$Fe_2O_3$ polymer composite nanocrystals. To characterize the relative magnetic properties of the microbeads, specific or gram susceptibilities, $\chi_{bead}$(cm$^3$/g), were determined with a Cahn Model 7500 magnetic susceptibility apparatus, and $\chi_{bead}$ was found to vary linearly with the magnetic content reported by Bangs Laboratories. Magnetic content is not reported by Polyscience.

Bangs' beads range in diameter from about 0.5 $\mu$m to 2 $\mu$m, as verified by scanning electron micrographs. Polyscience beads are somewhat larger and more dispersed than the reported approximate 1 $\mu$m to 2 $\mu$m diameters. The larger Polyscience beads are magnetic and, once magnetized, sustain a magnetic field in the absence of an externally applied field. The smaller Bangs beads are superparamagnetic, such that they are magnetized in an external field, but sustain no net field once the external field is removed. Based on data reported for Bangs beads, if the particle is assumed to be a dense magnetite core with an external polymer sheath, the upper limit of the polymer coating thickness is 0.1 $\mu$m to 0.3 $\mu$m. Because the core is formed from an emulsion of magnetic material and polymer, the coating is likely significantly thinner.

Composites were also formed with 15% by volume iron (III) oxide ($Fe_2O_3$) (Aldrich Chemical Co.) and Nafion, casting the Nafion and the magnetic material (uncoated iron oxide particles with diameters of a few microns) onto the electrode surface. An external magnetic field, such as an external cylindrical magnet, may be positioned around the electrode at this stage. When an external magnet is used, the casting mixture dries as a film which includes pillared magnetic structures on the surface of the electrode, as will be described in more detail herein. The external magnet, if any, is then removed.

Figure 11:
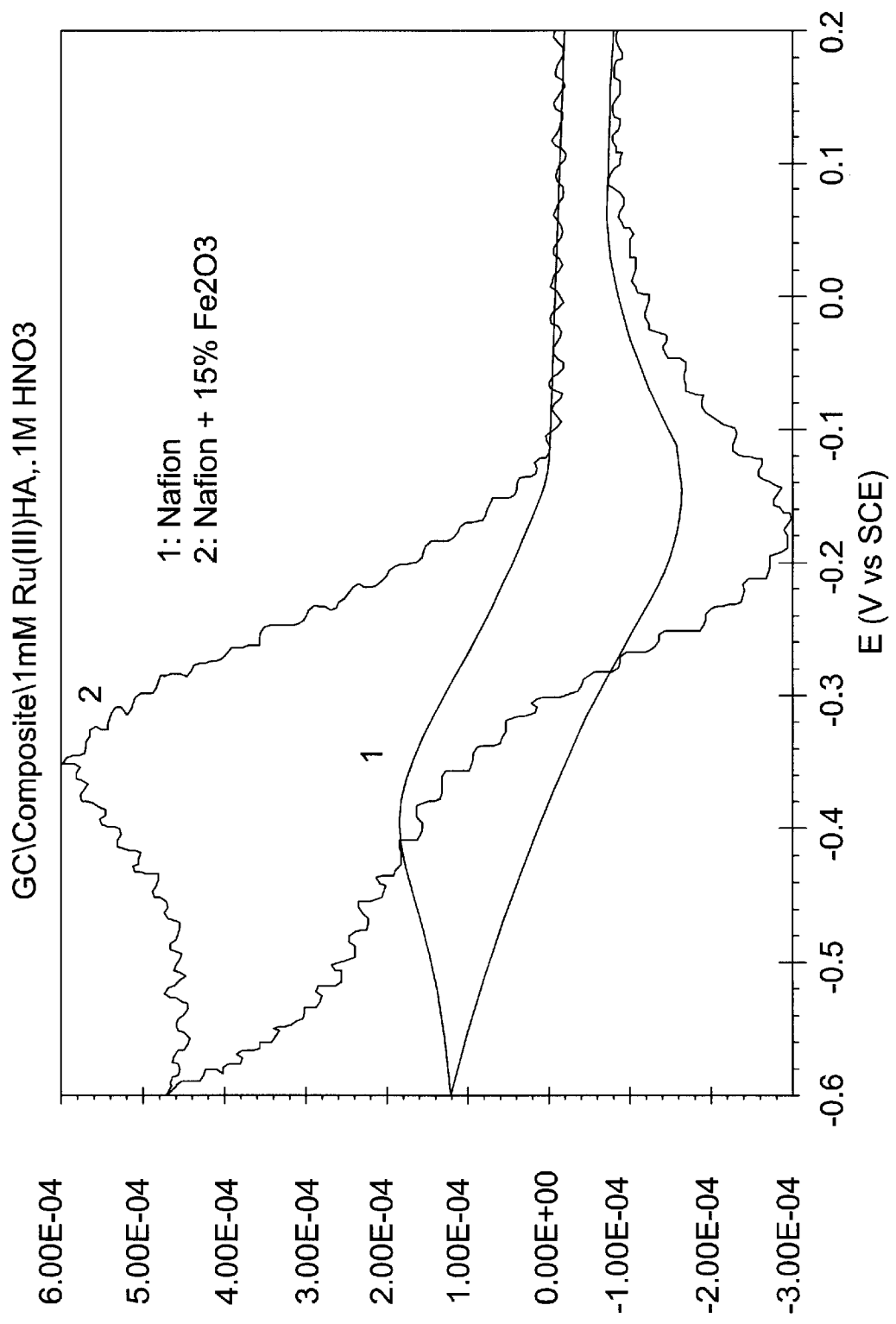
FIG. 11 shows flux measurements by cyclic voltammetry for magnetic composite and Nafion film modified electrodes for electrolyte solutions containing $Ru(NH_3)_6^{3+}$, $RU(bpy)_3^{2+}$, $Co(bpy)_3^{2+}$ and $Co(bpy)_3^{3+}$ in voltammograms A–D, respectively.

An electrode with surface modifications, including a composite comprising 15% by volume of non-coated iron (III) oxide, and prepared as described above, was placed in a solution of ruthenium (III) hexamine (a paramagnetic species with one unpaired electron) as a redox probe, and the flux was measured by cyclic voltammetry. An electrode bearing a film of Nafion only was used for comparative purposes. The results are presented in FIG. 11, which shows four voltammograms. Voltammogram A shows the electrodes in a $Ru(NH_3)_6^{3+}$ electrolyte solution, voltammogram B shows the electrodes in a $Ru(bpy)_3^{2+}$ solution, voltammogram C shows the electrodes in a $Co(bpy)_3^{2+}$ solution, and voltammogram D shows the electrons in a $Co(bpy)_3^{3+}$ solution. It can be seen from FIG. 11 that higher currents are generated at magnetically modified electrodes. Composites comprising the type of magnetic materials described above may prove useful in facilitating or catalyzing a broad range of surface chemical reactions, both electrochemical and otherwise.

The flux of redox species through magnetic composites is enhanced in proportion to the absolute value of the difference in the magnetic susceptibilities of the products and reactants of the electrolysis. From cyclic voltammetry, the $\Delta E_p$ observed for reversible species, whether paramagnetic or diamagnetic, exhibited little change, but $E_{0.5}$ was shifted, where $E_{0.5}$ is the average of the anodic and cathodic peak potentials, and provides a rough measure of the free energy of the electron transfer reaction. For a quasireversible, diamagnetic species which passed through a radical intermediate, dramatic changes in $\Delta E_p$ were found. The shifts and peak splittings were consistent with the stabilization and the concentration of the paramagnetic species. The results for several species are summarized in FIG. 12.

Several design paradigms aid in tailoring composites for specific transport and selectivity characteristics. For example, forces, fields and gradients associated with interfaces, which are of no consequence in bulk materials, can contribute to and even dominate the transport processes in composites.

Additionally, increasing the microstructure of composites can enhance the influence of interfacial gradients. Fields in a microstructural environment can be nonuniform, but locally strong. Also, strong but short range electrostatic and magnetic fields are better exploited in microstructured environments than in systems with externally applied, homogeneous fields. Where vectorial transport is plumbed into microstructured matrices by coupling at least two field or concentration interfacial gradients (the result being advantageous compared to homogeneous matrices), the largest effects will occur when the gradients are either perpendicular or parallel to each other. Finally, control of surface dimensionality (fractality) is critical in optimizing surface transport in composites.

Several advantages are inherent in ion exchange composites over simple films. First, composites offer properties not available in simple films. Second, composites are readily formed by spontaneous sorption of the ion exchanger on the substrate. Third, while surfaces dominate many characteristics of monolayers and composites, three-dimensional composites are more robust than two-dimensional monolayers. Fourth, interfaces influence a large fraction of the material in the composite because of the high ratio of surface area to volume. Fifth, composites offer a passive means of enhancing flux because external inputs of energy, such as stirring and applied electric and magnetic fields, are not required. Sixth, local field gradients can be exploited in composites because the fields and molecular species are concentrated in a micro-environment where both the decay length for the field and the microstructural feature length are comparable. In some of the composites, the field may be exploited more effectively than by applying a homogeneous field to a cell with an external source.

Cyclic Voltammetric Peak Splittings for Quasireversible Species

Figure 13:
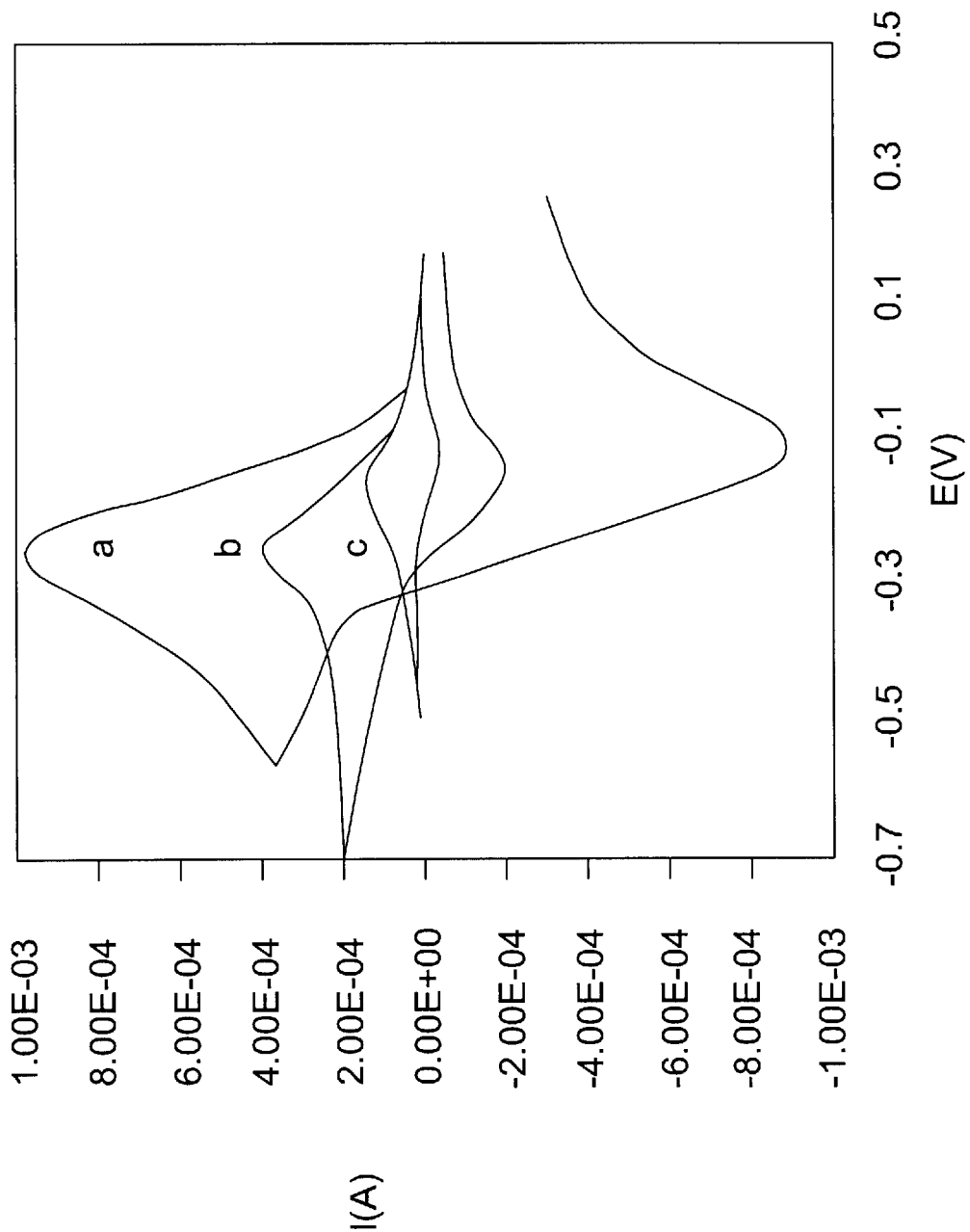
FIGS. 13, 14, and 15 show cyclic voltammetric results for the reversible species $Ru(NH_3)_6^{3+}$ and $Ru(bpy)_3^{2+}$ and for the quasireversible species hydroquinone, respectively.
Figure 14:
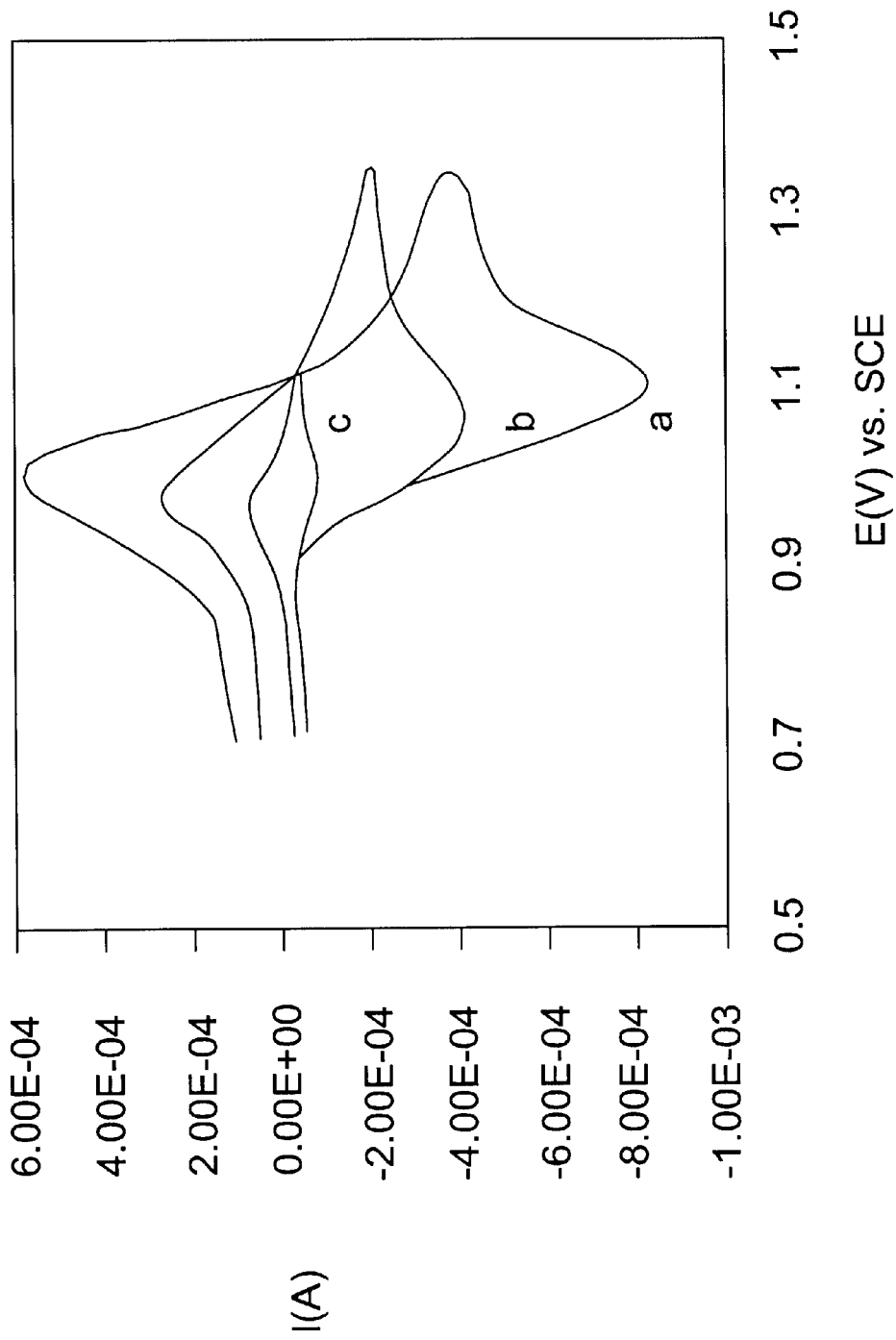

Peak splittings in cyclic voltammetry can be used to determine heterogeneous electron transfer rates. FIGS. 13 and 14 show cyclic voltammetric results for the reversible species $Ru(NH_3)_6^{3+}$ and $Ru(bpy)_3^{2+}$, respectively. Cyclic voltammograms at 100 mV/s are shown for $Ru(NH_3)_6^{3+}$ in FIG. 13, and for $Ru(bpy)_3^{2+}$ in FIG. 14 for magnetic composites (Plot "a"), Nafion films (Plot "b"), and the bare electrode (Plot "c").

Cyclic voltammetric results are shown for the reduction of paramagnetic $Ru(NH_3)_6^{3+}$ in FIG. 13. The concentration of the redox species is 1 mM, the electrolyte is 0.1 M $HNO_3$, the reference is an SCE, and the films are 3.6 $\mu$m thick. For both species, when $E_{0.5}$ is compared for the magnetic composite and the Nafion films, the shift in $E_{0.5}$ is towards positive potentials. The electron transfer kinetics for $Ru(NH_3)_6^{3+}$ are fairly strong with $k^0>0.2$ cm/s. The peak splittings for the magnetic composites and Nafion film are similar, which is consistent with the resistance of the two layers being similar. Similar peak splittings observed for $Ru(bpy)_3^{2+}$ are shown in FIG. 14. When compared to the Nafion films, the magnetic composites have little effect on the rate of electron transfer of reversible species as measured under these conditions.

Figure 15:
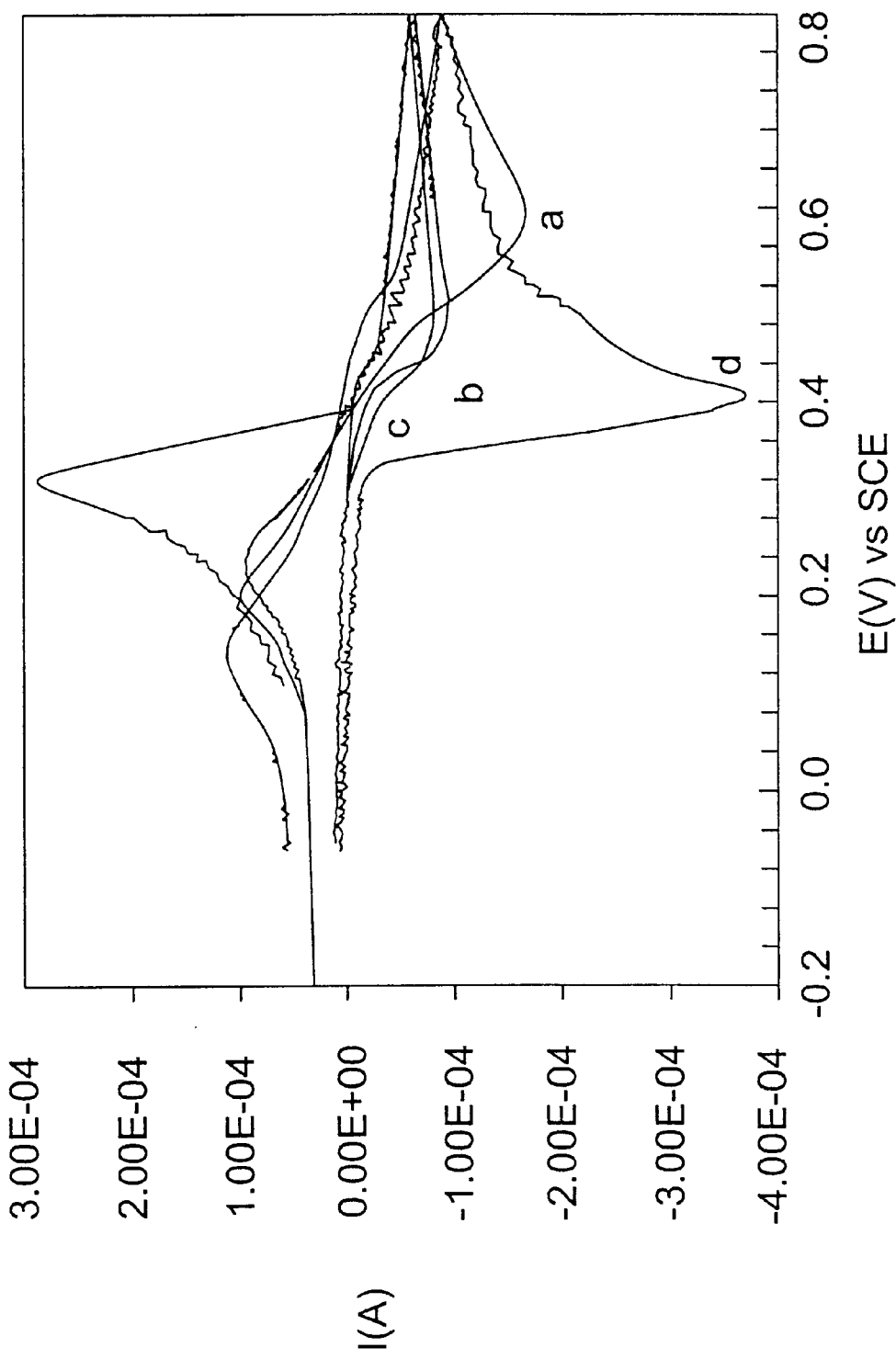

FIG. 15 shows cyclic voltammograms at 100 mV/s for 1 mM hydroquinone in 0.1 M $HNO_3$ for magnetic composites (Plot "a"), nonmagnetic composites (Plot "b"), Nafion films (Plot "c"), and the bare electrode (Plot "d"). The films are 3.6 $\mu$m thick. It is observed in the voltammogram of FIG. 15 that the peak splitting is almost doubled for the magnetic composite (a) compared to the Nafion film (c). The question arises as to whether the enhanced peak splitting is consistent with the stabilization of the paramagnetic semiquinone intermediate in the two electron/two proton oxidation.

In FIG. 15, voltammograms are shown at 0.1 V/s for hydroquinone, a diamagnetic species that undergoes quasireversible, two electron/two proton oxidation to diamagnetic benzoquinone while passing through a radical, semiquinone intermediate. The voltammograms for the Nafion film (c) and the nonmagnetic composites (b) are fairly similar, with $\Delta E_p$ values of 218 and 282 mV, respectively. For the magnetic composite (a), $\Delta E_p=432$ mV, or twice that of the Nafion film. The results for the reversible couples above show that this result is not due to a higher resistance in the magnetic composites. The asymmetry in the peak shifts compared to the other three systems shown in FIG. 15 also argues against a resistance effect.

The effect with quasireversible rates is not clear. Many quasireversible electron transfer species uncomplicated by homogeneous kinetics and disproportionation reactions can be used to determine this effect. The influence of magnetic fields upon the kinetics of quasireversible processes can result in numerous technological system improvements. Oxygen reduction by two and four electrons are examples of a system where the quasireversible kinetics may be altered by an applied magnetic field gradient.

Cyclic Voltammetric Peak Shifts

In comparing magnetic composites with Nafion films, voltammograms taken at 0.1 V/s for the reversible species exhibited a small decrease in $\Delta E_p$. However, the peak potential for reduction $E_p^{red}$, for $Ru(NH_3)_6^{3+}$ shifted +14 mV and the oxidation potential peak $E_p^{ox}$, for $Ru(bpy)_3^{2+}$ shifted +64 mV. In general, a shift in potential of approximately 35 millivolts closer to the initial sweep potential is observed for all reversible redox species, where one form of the species is diamagnetic and the other is para-magnetic with one unpaired electron, whether the electron transfer process converts the redox species from diamagnetic to paramagnetic, or paramagnetic to diamagnetic. Larger potential shifts are observed with less reversible electron transfer processes, up to about 100 mV.

The above discussion further shows that interfacial gradients and fields other than concentration and electric potential (e.g., magnetic gradients and fields) can be exploited effectively in microstructured matrices. In composites formed with magnetic materials, locally strong, nonuniform magnetic fields may alter transport and kinetics. The influence of the magnetic field on species in composites may be substantial, because the species are concentrated in a microenvironment where the distance between the field source and chemical species is not large with respect to the field decay length.

Preliminary voltammetric studies comparing the magnetic composites to simple Nafion films (i.e., containing 0% magnetic microbeads) yielded several results. First, flux of redox species through magnetic microbead composites is enhanced, compared to flux through both simple Nafion films (i.e., Nafion alone) and composites formed with non-magnetic microbeads. Second, for species which underwent reversible electron transfer (i.e., $Ru(NH_3)_6^{3+}$ and $Ru(bpy)_3^{2+}$), the cyclic voltammetric peak potential difference ($\Delta E_p$) was unaffected, but the average shift of the peak potentials ($E_{0.5}$) was consistent with a lower required energetic driving force for the reaction. Third, hydroquinone oxidation was quasireversible and proceeded through paramagnetic semiquinone. For hydroquinone at 0.1 V/s, voltammograms for the magnetic composites exhibited a 40 mV positive shift of $E_{0.5}$, and a $\Delta E_p$ twice that of Nafion.

Electrochemical flux of ions and molecules through magnetic composites formed of Nafion ion exchange and polystyrene coated Fe/Fe oxide particles has been observed as twenty-fold higher than the flux through simple Nafion films. Flux enhancements have been observed with increasing difference in the magnetic susceptibility of the species and the redox reaction.

A passive, magnetic composite may be used to enhance the flux of oxygen at the cathode in a fuel cell. Oxygen has two unpaired electrons, and is therefore susceptible to this magnetic field, as described above. If oxygen exhibits characteristics consistent with the observations made thus far for other ions and molecules, the electrochemical flux of oxygen to a magnetically modified cathode can be enhanced by approximately 500% compared to the nonmagnetically modified cathode shown in FIG. 4. Such an enhancement would be comparable to that achieved by pressurization to about 5 atmospheres at the cathode. Therefore, it is possible to predict a roughly five-fold flux enhancement of oxygen through a 15% magnetic/Nafion composite over Nafion.

Figure 4:
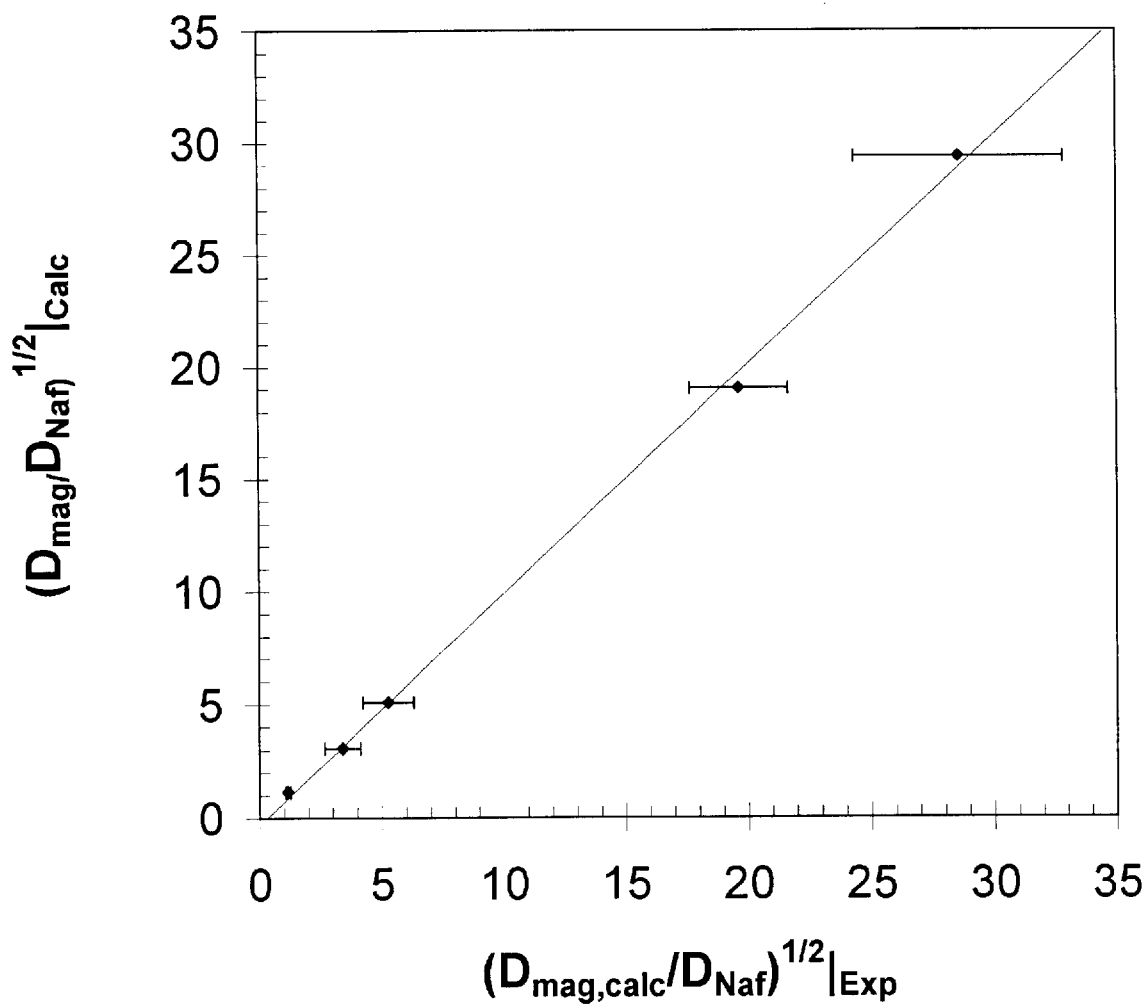
FIG. 4 is a regression line for a fit of the Dahms-Ruff model to the experimental flux enhancement.
Figure 12:
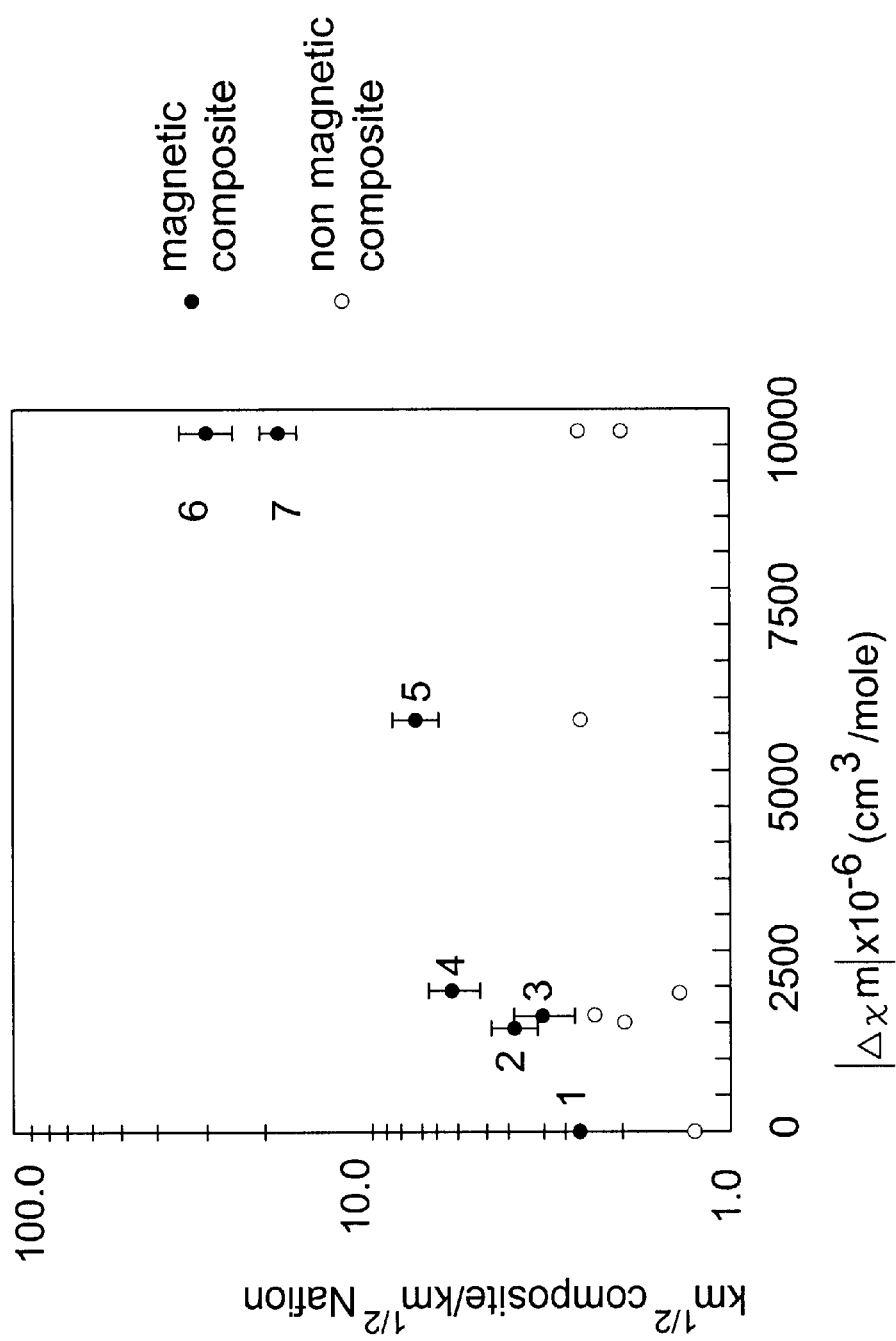
FIG. 12 shows the relative flux of redox species, where the maximum cyclic voltammetric current for a composite with magnetic microbeads is normalized based on the maximum cyclic voltammetric current for a Nafion film containing no magnetic material, with the ratio giving the flux enhancement.

FIG. 4 illustrates the flux through magnetic/Nafion composites and Nafion films of the seven redox species in listed FIG. 12. Those fluxes were determined by cyclic voltammetry. The flux ratio for magnetic composites to Nafion films is the y-axis, and the absolute value of the difference in the molar magnetic susceptibilities ($|\Delta\chi_m|$) of products and reactants of the electrolysis reaction is the x-axis of FIG. 4. A larger value of $\Delta\chi_m$ corresponds to a greater susceptibility of a species to interaction with a magnetic field. The flux increases exponentially as $|\Delta\chi_m|$ increases, up to about twenty-fold. For the reduction of oxygen to water, $|\Delta\chi_m|\approx3500\times10^{-6}$ cm$^3$/mole. That point on the x-axis is extrapolated to suggest that the flux enhancement for oxygen in the magnetic composite may approach five-fold. Experimental studies, where the composite was optimized for oxygen reduction, have enhanced flux for oxygen reduction by 1500%.

Figure 16:
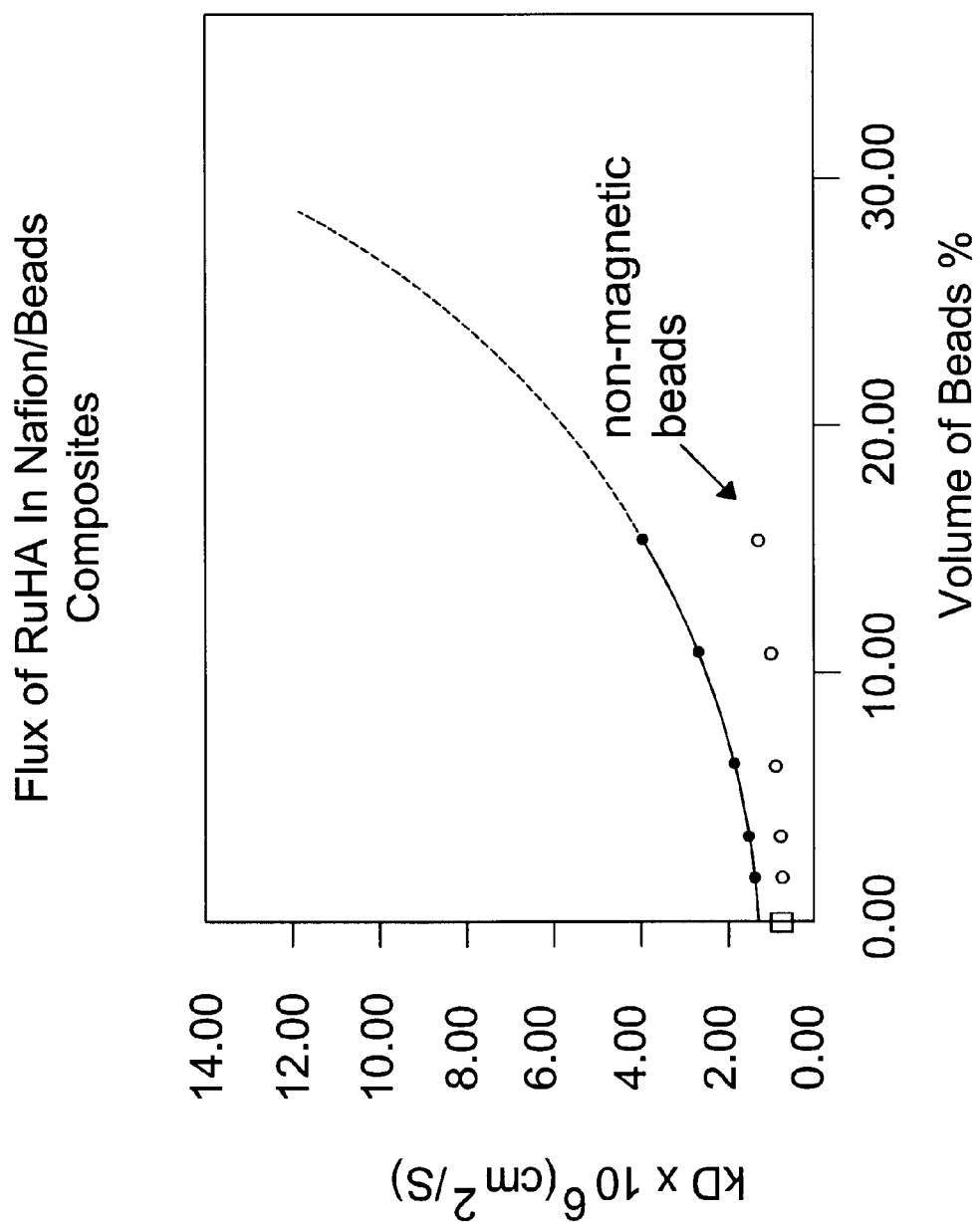
FIG. 16 shows a plot of the flux of $Ru(NH_3)_6^{3+}$ in magnetic bead/Nafion composites increasing as the fraction of magnetic beads increases.

Experiments have been conducted with Nafion composites of up to 15% Fe/Fe oxide particles or beads. FIG. 16 shows a curve of the increase in flux based on the percentage of magnetic beads.

For paramagnetic species, the flux through the magnetic composites increases as the fraction of magnetic beads increases. In FIG. 16, the flux of $Ru(NH_3)_6^{3+}$ through magnetic bead/Nafion composites (●) increases as the fraction of magnetic beads in the composite is increased to 15%. Larger enhancements may be possible with higher bead fraction composites or composites formed with magnetic beads containing more magnetic material. Compared to a simple Nafion film, the flux is 4.4 times larger. $Ru(NH_3)_6^{3+}$ is less paramagnetic than oxygen. For comparison, composites formed with nonmagnetic polystyrene beads (○) were examined. Those composites exhibited no flux enhancement as the bead fraction increased. Recent results for composites formed with cobalt samarium magnets yielded flux enhancement for $Ru(bpy)_3^{2+}$ which are approximately eight fold compared to a Nafion film. For iron oxide magnetic composites, the enhancement is approximately four-fold. As oxygen is more paramagnetic than $Ru(bpy)^{2+}$, even larger enhancements are expected (>1500%) for oxygen in properly tailored composites.

Applications of the Invention

General Applications

Specific examples of electrochemical systems where magnets might improve an electrochemical cell or process include: chloralkali processing, electrofluoridation, corrosion inhibition, solar cells and photocells of various types, and acceleration of electrochemical reactions at the electrode and in the composite matrix. Potential shifts of $E_{0.5}$ are always observed, and suggest that an energy difference is generated by the magnetic fields and gradients in the composites. Such an effect could improve performance of all electrochemical energy devices, including fuel cells, batteries, solar and photocells. Other applications include: (1) sensors, including dual sensors for paramagnetic species; optical sensors; (2) flux switching; and (3) controlled release of materials by control of a magnetic field, including release of drugs and biomaterials, or medical dosing. Additional applications may exist in imaging and resonance imaging technologies, as well as other fields.

Figure 17:
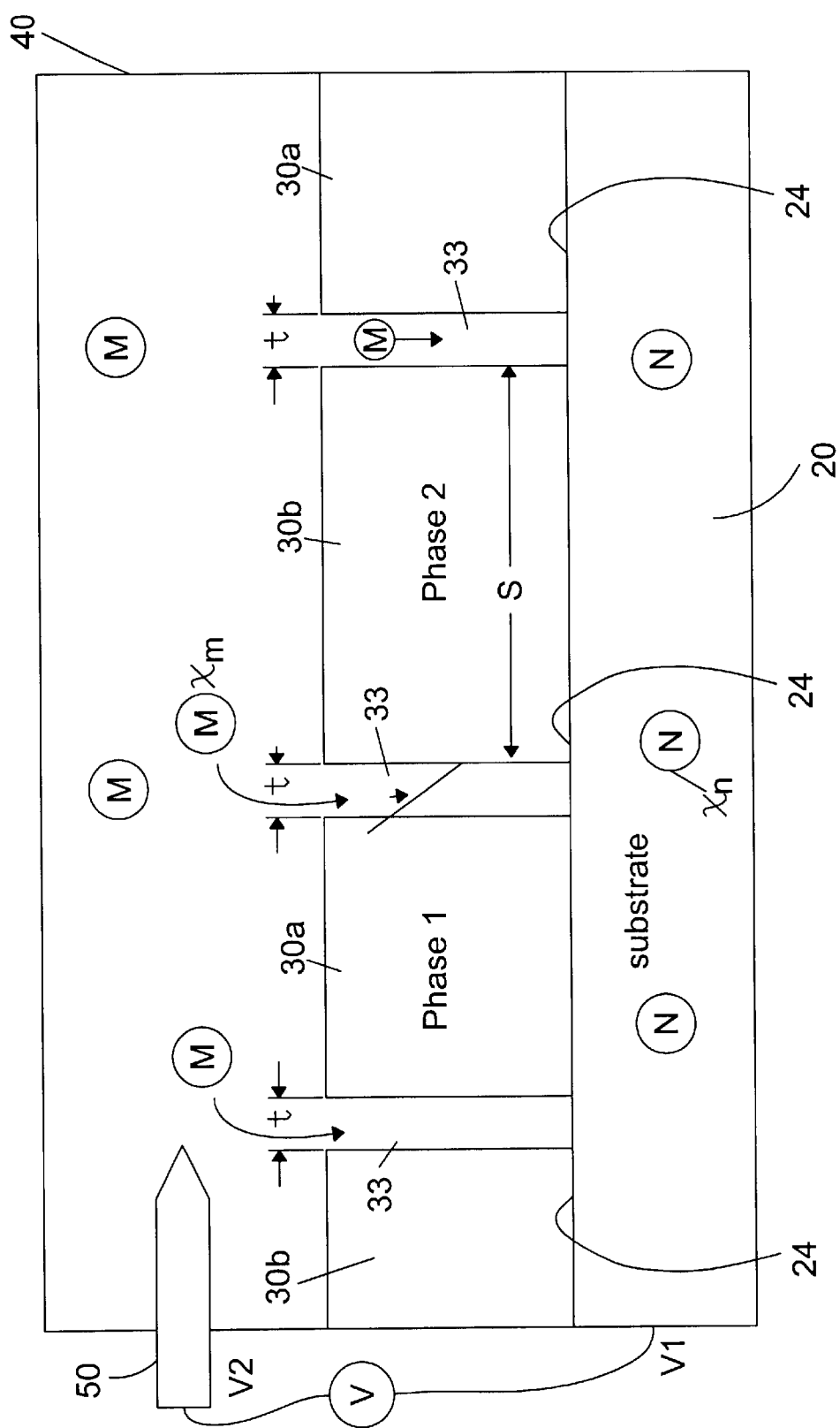
FIG. 17 shows a simplified representation of how magnetic microboundaries influence a standard electrochemical process.

FIG. 17 illustrates how magnetic microboundaries may influence a standard electrochemical process. A substrate 20 with a surface 24 serves as a conductor that can electrically conduct as a metal, a semiconductor or a superconductor. The substrate 20 is maintained at a first electrical potential V1. Two different phases of materials 30a, 30b have two different magnetic fields, i.e., are in different magnetic phases 1 and 2, and are applied to the surface 24 of the substrate 20. Since the materials 30a, 30b have different magnetic fields, boundary regions 33 have magnetic fields and gradients. The boundary regions 33 are not necessarily sharp or straight, but the magnetic field of the material 30a smoothly transitions into the magnetic field of the material 30b according to electromagnetic boundary conditions. Therefore, a width t represents an average width of the boundaries 33. The width t should be approximately between a few nanometers to a few micrometers, and preferably between approximately 1.0 nm and 0.5 μm. The boundary regions 33 are separated from each other by varying distances, and S represents the average of those distances.

The boundaries 33 need not be equally spaced or have equal widths or thicknesses t. Materials 30a, 30b can be in a liquid, solid, gas or plasma phase. The only restriction is that a boundary 33 must exist, i.e., materials 30a and 30b must have two different magnetic fields to create the magnetic fields and gradients within the width t. The magnetic fields and gradients of the boundary region 33 can be increased by (1) increasing the magnetic content of the microbeads; (2) increasing the magnetic microbead fraction in the composite; (3) increasing the magnetic strength of the beads by improving the magnetic material in the beads; or (4) enhancing the field in the magnetic microbeads by means of an external magnet. The above phenomena can be used to improve the performance of fuel cells and batteries, for example.

Figure 18:
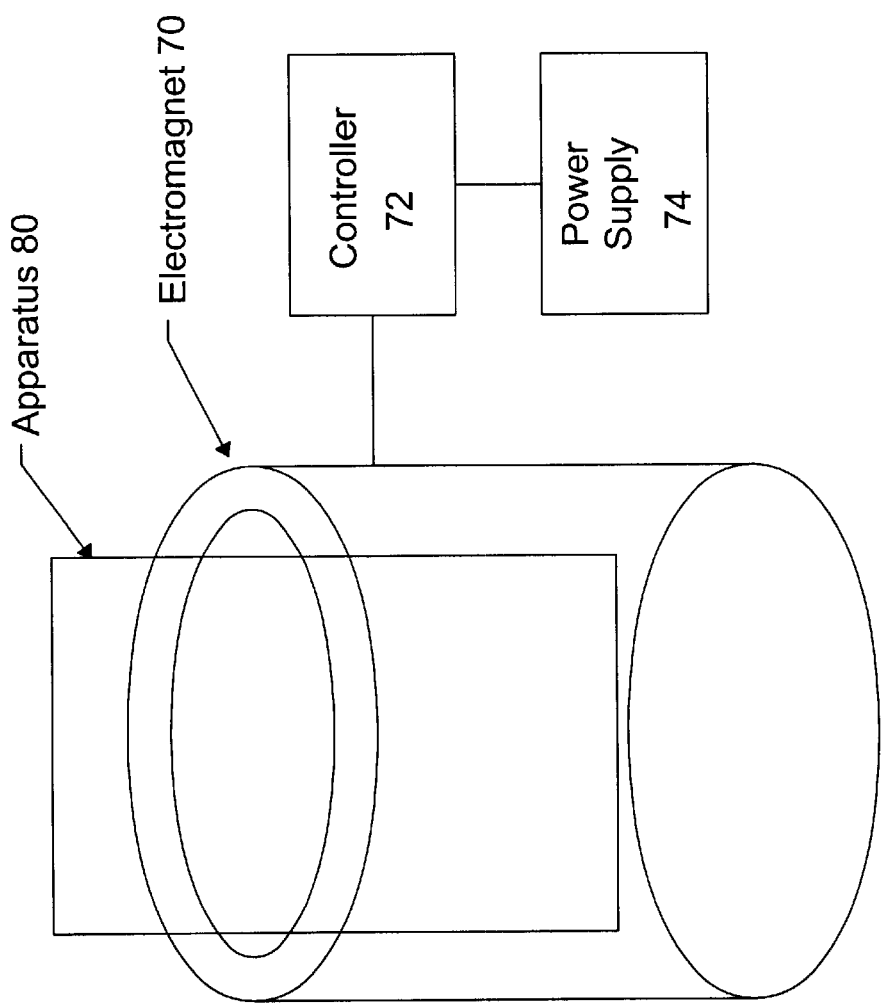
FIG. 18 shows a simplified representation of a preferred embodiment of the present invention placed in an externally applied magnetic field provided by an electromagnet to alter the magnetic properties of that preferred embodiment, where the field may be transited to the 'ON' or 'OFF' level, or oscillated.

FIG. 18 shows an apparatus 80 which corresponds to a preferred embodiment of the present invention. The apparatus 80 may correspond to, for example, embodiments of a magnetically modified electrode, a fuel cell, a battery, a membrane sensor, a dual sensor, or a flux switch. An electromagnet 70 provides a source of a magnetic field. The electromagnet 70 can also be used in the above discussed methods of forming the magnetic composite materials that require the presence of an externally applied magnetic field. The electromagnet 70 can be controlled by a controller 72 to produce a constant or oscillating magnetic field with power supplied by a power supply 74.

The external magnetic field applied by the electromagnet 70 may be useful in various embodiments of the present invention. Switches and further enhancements might be possible when the external field is concentrated in the magnetic microbeads or particles. For example, flux switches might be useful, especially as actuated by an external magnet or the electromagnet 70 in such applications as: (1) release of materials in medical applications; (2) recollection of hot isotopes e.g., in medical imaging applications; (3) microreactors and separators as a means of mixing, perhaps to control a micronuclear reactor or a heat source driven by hot materials; and (4) make a re-usable system for cleaning and collecting heavier transition metals in hot storage tanks, or other applications, as will be discussed below.

SPECIFIC EXAMPLES

Fuel Cells

As discussed above, several major disadvantages and problems currently exist for large-scale use of fuel cells. Thus, it would be beneficial to achieve high efficiency compressor/expander power recovery technology. Improving the efficiency of the compressor/expander by reducing the pressure requirement through passive pressurization within a fuel cell would increase power production of the background art fuel cells by approximately 20% simply through elimination of pumps and compressors.

Due to the paramagnetic nature of oxygen, magnetically modified cathodes may reduce the need for pressurization and alter oxygen kinetics. Potential shifts of about ±35 mV to about +100 mV represent about a 5% to 15% improvement in cell efficiency, and a comparable savings in weight and volume. As hydrated protons cross a conventional fuel cell, the cathode floods and the anode dehydrates. The resulting water transport may be throttled by composite separators of graded density and hydration.

In addition to the enhanced flux at a magnetically modified electrode, oxygen reduction kinetics in the fuel cells may be altered. The kinetics for oxygen reduction is shown as follows:

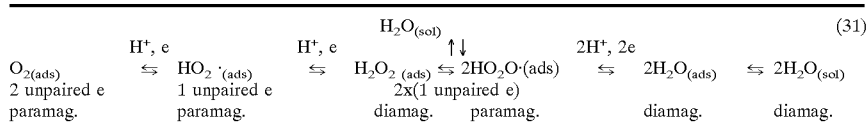

$$O_{2(ads)} \underset{}{\overset{H^+, e}{\rightleftarrows}} HO_2\cdot_{(ads)} \underset{}{\overset{H^+, e}{\rightleftarrows}} H_2O_{2\,(ads)} \rightleftarrows 2HO_2O\cdot(ads) \underset{}{\overset{2H^+, 2e}{\rightleftarrows}} 2H_2O_{(ads)} \rightleftarrows 2H_2O_{(sol)} \quad (31)$$

(with $H_2O_{(sol)}$ exchange shown above $H_2O_{2\,(ads)}$)

2 unpaired e / paramag. — 1 unpaired e / paramag. — 2x(1 unpaired e) diamag. / paramag. — diamag. — diamag.

A difficulty with the oxygen reduction kinetics arises largely because $H_2O_2$ desorbs as non-paramagnetic peroxide in solution, and does not dissociate on the catalyst surface to form paramagnetic 2OH. The presence of a magnetic field may stabilize the paramagnetic $HO_2\cdot$ and slows the formation of peroxide. Once adsorbed peroxide (i.e., $H_2O_{2(ads.)}$) is formed, the magnetic field shifts the equilibria to favor the formation of 2OH. and drives a larger percentage of the reacting molecules toward the formation of water, where the full potential of oxygen reduction can be realized in regard to $E°_{cathode}$ and $E°_{H_2O_2}$. For those reasons, oxygen is susceptible to the enhancements that have been discussed above for similar paramagnetic species.

It may also be desirable to make a fuel cell with minimal thermal signature, for applications in which such a design would be beneficial. Fuel cells operate at temperatures approaching 100° C. to improve kinetic efficiency, which is much lower than the temperatures of other refuelable power sources, such as internal combustion engines (about 400° C.), but higher than the human body (about 37° C.) or ambient temperature (about 20° C.). However, improvement in kinetic efficiency due to a magnetically modified cathode would lower fuel cell operating temperatures to near ambient temperature without substantially affecting power output. Also, magnetic effects are larger at lower temperatures. A fuel cell mounted on highly thermal conductive materials, such as materials used in the thermal shields of spacecraft, might maintain a temperature closer to body or ambient temperature. Although a reduced thermal signature and a reduced operating temperature may be desirable for a fuel cell, the optimal operating temperature for the fuel cell is based on performance enhancements, and the method of reducing the thermal signature may have to accommodate that temperature.

The salient advantages and features of an ambient pressure PEM fuel cell in operation according to the instant invention include:

(1) lower fuel cell system weight and size due to removal of the compressor pumps without sacrificing output power;

(2) production of fuel cells that are approximately ⅜ inches thick and as flexible as a plastic transparency;

(3) an approximately 20% increase in the efficiency of the fuel cell system through elimination of the pumps;

(4) an increase in voltage driven by a positive shift in the cathode potential or improved kinetics associated with shorter lifetimes of $H_2O_2$ adsorbed on the electrode surface with the reaction equilibria shifted toward formation of OH.;

(5) reduced likelihood of system failure due to removal of all mechanical parts;

(6) lower operating temperature based on reduction of the thermal signature, by improving the performance at lower operating temperatures via kinetic enhancement and the resulting increase in magnetic effects, thus making up for performance deficits associated with lower fuel cell operating temperature;

(7) scalability in size; and (8) an increase in mean time between failures (MTBF) of the power system by removing mechanical pumps.

The above advantages and benefits can be achieved while eliminating the need for compressor pumps. Even if the potential shift or kinetic enhancement is not fully realized, the fuel cell will operate more efficiently with the flux enhancement that is produced. At a minimum, the fuel cell will operate at the same performance level of current fuel cells without the added weight and the 15% power loss associated with running compressor pumps.

In a PEM fuel cell (or other apparatus requiring an electrode) it may be beneficial to tailor the electrode-magnetic composite interface for optimal electrical conductivity. For example, the direct coating of the composite magnetic beads with platinum or any other conductor, semiconductor, or superconductor may significantly increase electrical conductivity of the interface over a random mixing of magnetic beads with fixed quantities of carbon and platinum (or any other conductor, semiconductor, or superconductor (e.g. carbon) and catalyst (e.g. platinum), hereinafter referred to simply as electron conductor plus catalyst). Oxygen reduction at magnetically and electrically modified electrodes made with platinum-coated magnetic microbeads mixed with carbon has been demonstrated to increase current 15-fold.

Composite Ion Exchange Polymers

Composite ion exchange polymers (IEPs) can be formed by adsorption on high surface area, inert substrates. The present research focuses on how the interface between the IEP and microstructured substrate influences the flux of probe ions and molecules through the composite matrix. In general, the flux of probes through the ion exchange portion of the composite is higher than the flux through a simple film of the IEP. The flux enhancement grows as the ratio of internal surface area to volume of polymer increases.

A preferred embodiment of the present invention incorporates a composite formed with an IEP and small magnetic particles. With those composites, the flux (electrolysis current) of various redox probes was enhanced by approximately 400% to 3000%. That enhancement was a function of the magnetic moment of the redox probe, because the product and/or reactant molecule or ion has unpaired electrons and is thus paramagnetic. As oxygen is a paramagnetic species with two unpaired electrons, optimizing a magnetic composite for oxygen reduction makes it possible to sustain an oxygen reduction current approximately 1400% higher than a similar composite containing no magnetic material.

The fifteen-fold enhancement in oxygen current makes modification of a fuel cell attractive. A similar enhancement in oxygen reduction current in a fuel cell would eliminate the need to pressurize the cathode and employ pumps.

Carbon Particle/Catalyst Magnetic Fuel Cell Composites

Another preferred embodiment of the present invention incorporates carbon particles with a catalyst at the cathode interface and enhances the rate of oxygen reduction. For example, platinum is preferably used as a catalyst in the present preferred embodiment, although other usable catalysts exist and may be used, including palladium, ruthenium and rhodium, as well as other transition metals such as cobalt and nickel. Other species, such as metallic porphyrins, could also catalyze the reaction.

In the related art, poor kinetics for oxygen reduction at the cathode limits power generation by hydrogen-oxygen fuel cells. Usually, the oxygen feed is pressurized to shift the reduction of oxygen toward product formation. As discussed above, incorporating a magnetic material into the fuel cell cathode permits passive pressurization of oxygen, because oxygen is paramagnetic. In a refinement of the invention, platinized carbon particles, as well as magnetic particles or microbeads, may be incorporated into the cathode interface.

Studies of oxygen reduction have shown that the cyclic voltammetric current is enhanced by the presence of magnetic microbeads incorporated at the cathode interface. The current at the magnetically modified electrodes is about fifteen times greater than the current at electrodes modified with a non-magnetic IEP such as Nafion. Enhancements increase proportionally to the fraction of the magnetic beads. An oxygen enhancement is observed when carbon with a platinum catalyst is included with the magnetic beads and the Nafion.

According to a preferred embodiment of the present invention, a cathode interface for oxygen reduction may be optimized by incorporating a magnetic composite material, comprising magnetic particles or microbeads, an IEP (e.g. Nafion), and platinized carbon particles, into the cathode interface. That optimization may impact the performance of fuel cells. One mechanism for the oxygen reduction is partial reduction to peroxide ($H_2O$), which desorbes from the electrode surface before completing its reduction to water as follows:

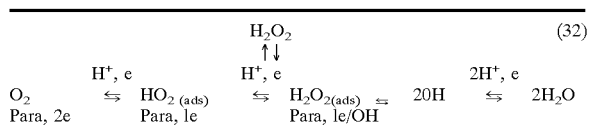

(32)

The peroxide is both adsorbed and in solution. The loss of peroxide to solution may be diminished through the paramagnetic properties of the species on either side of the $H_2O_2$ in the reaction scheme. If magnetic fields stabilize the $HO_2$. and drive the adsorbed peroxide to dissociate on the surface to form adsorbed paramagnetic 2 HO, then the lifetime of adsorbed $H_2O_2$ and the loss through desorption to the $H_2O_2$ (solution) will decrease. The net effect is an increase in the final step of the reaction scheme, i.e., reduction to water. Cyclic voltammetric results for oxygen reduction using an electrode having both magnetic microbeads and platinized carbon particles incorporated into the electrode interface are discussed above.

Proton Exchange Membrane (PEM) Fuel Cell Design

An ambient pressure PEM fuel cell opens up opportunities in packaging design. Currently, PEM fuel cells are encased within a rigid structure to contain the pressure applied to the cathode side of the fuel cell. Since an embodiment of the ambient pressure fuel cell of the present invention increases the flux of oxygen without external pressurization, that rigid outer encasement is no longer needed.

PEM fuel cells are inherently flexible. The PEM cell itself consists of an anode electrode and a cathode electrode separated by an ion exchanger such as Nafion. A fuel cell with a magnetically modified cathode, as discussed above, which draws air into the cathode from the atmosphere without compression, can be formed with an outside covering similar to that used for sealable storage bags, e.g., polyethylene, a similar polyalkene, or other hydrocarbon polymer. Similarly, the fuel cell can be confined to different geometries and volumes, or flattened again for a confined geometry. The nonpressurized cell may have thin plastic outer surfaces that are as flexible as an overhead transparency.

The PEM fuel cell can be thin and flexible, substantially less than the size of an approximately 8.5×11 inch sheet of paper. While consuming a very small volume of fuel, the PEM fuel cell can provide more than enough power to run laptop or notebook computers (approximately 30 watts), with or without color displays. The PEM fuel cell can operate various portable electronic devices, including voice and message communications, GPS devices, navigation systems and cameras. A PEM fuel cell with no mechanical pumps that is capable of excellent cathode performance may replace batteries in systems requiring small, light-weight, flexible, adaptive power sources.

Figure 19B:
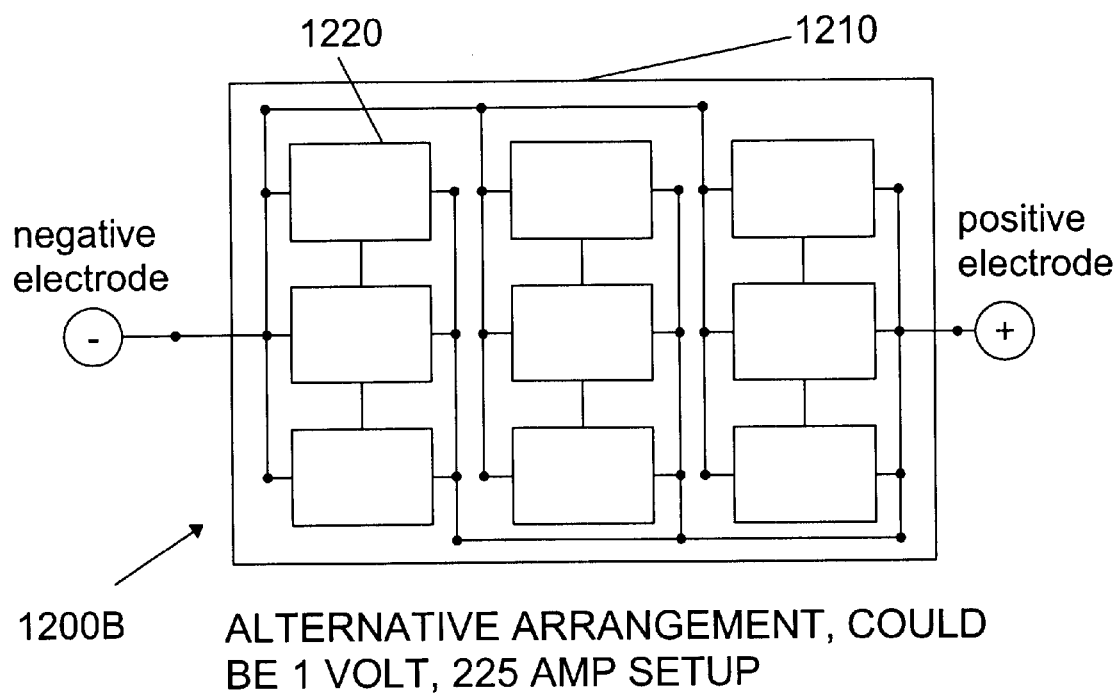

Another possible embodiment of PEM fuel cells involves forming an array, as shown in FIGS. 19A and 19B. FIG. 19A shows a single sheet 1210 of PEM fuel cells 1220. An advantage of that design is that a single sheet 1210 can contain several PEM fuel cells 1220. By configuring the PEM fuel cells 1220 in serial 1200A and parallel 1200B arrangements, the PEM fuel cell sheet 1210 can meet a wide variety of power demands. For example, a single PEM fuel cell sheet 1210 can substitute for a wide range of different batteries. If a single fuel cell sheet 1210 is divided into 9 small cells of 1 volt and 25 amps per cell, those cells could be connected in various ways. If connected in series, the 1200A system will produce 9 volts and 25 amps; if connected in parallel, the system 1200B will produce 1 volt and 225 amps, as shown in FIG. 19B. Finally, if the sheet is connected as a series connection of three sets of three cells in parallel, the system 1200B will produce 3 volts and 75 amps, as shown in FIG. 19A.

PEM Cell Research Results

The experiment conducted for the present invention determines whether incorporation of magnetic microparticles into a fuel cell improves fuel cell performance. The experiment involved preparing two Nafion fuel cells, both with hydrogen fuel and either oxygen or air as the oxidant. The two cells were prepared identically, except that one fuel cell had 4.72% polystyrene coated magnetic microparticles on the cathode (not present in the other fuel cell) which corresponds to 0.14 mg/cm$^2$ of magnetic particles per cm$^2$ of membrane. The fuel cell had a total surface area of 5 cm$^2$.

FIGS. 20 through 46 show current-voltage (I-V) curves used to study cell performance. In the present experiments, the PEM fuel cells were subjected to different loads, and the generated current and voltage were recorded and plotted. As the load increased, the current increased but the voltage decreased. The power output, which is a product of the current and voltage for given load conditions, increased up to values of 0.4V to 0.6V, and then decreased. Better fuel cell performance is signified by more area under the current-voltage curve. The experiment was duplicated at various combinations of temperatures and pressures. When pressure was varied, it is denoted by a number such as 10:10 or 20:20, which corresponds to the pressure in pounds per square inch (PSI) at the anode and the cathode (anode:cathode). Unless otherwise noted, all tests were run at 10:10, which corresponds to slightly below one atmosphere. Curves denoted "1st," "2nd," etc. refer to runs of the I-V curve where all runs were made at approximately the same time, and the conditions were not changed, except to repeat the runs. Those notations are shown on FIGS. 24 through 46.

Figure 20:
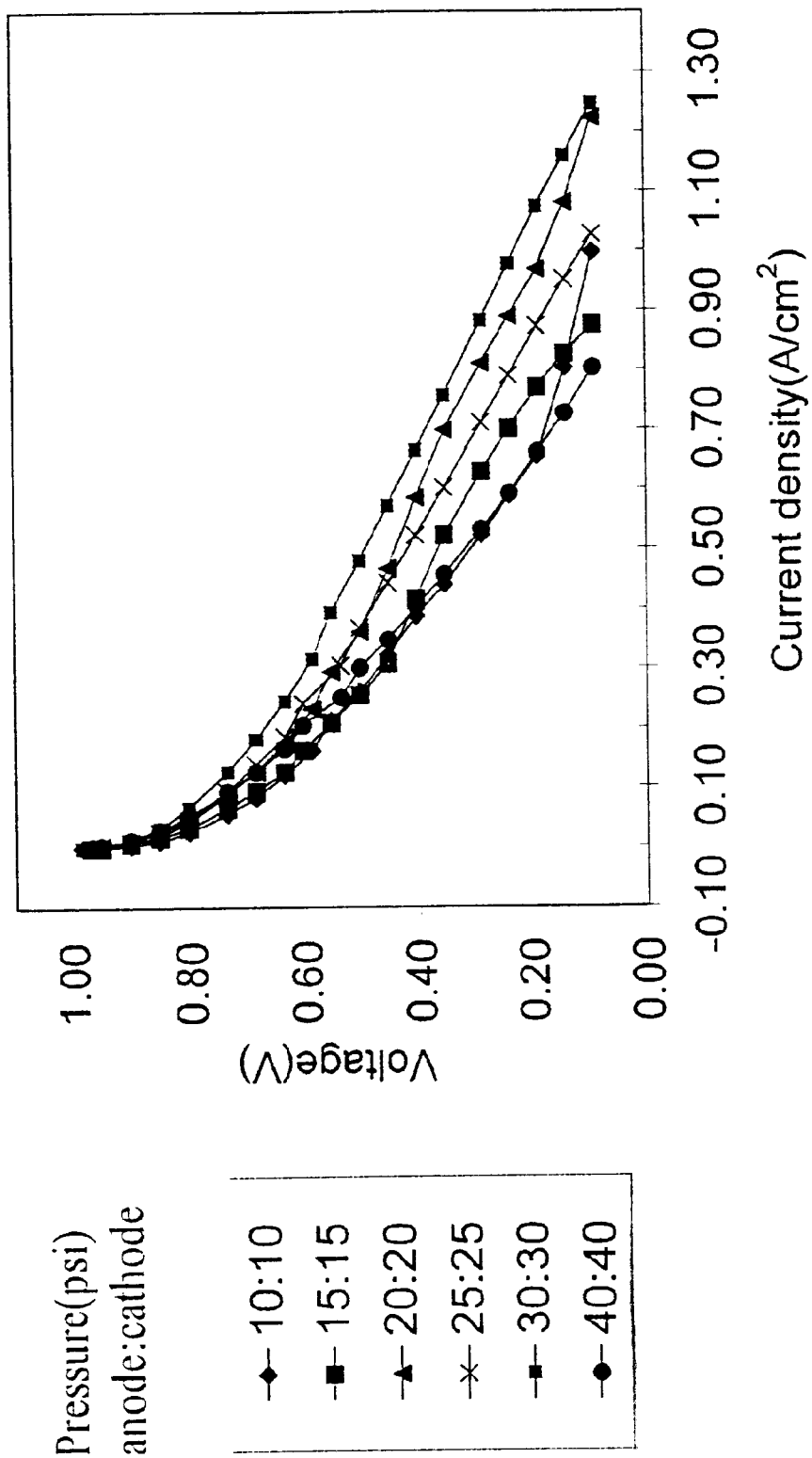
FIG. 20 is a plot of the pressure dependency of an initial output for a platinum-loaded electrode, with the platinum loading at 0.4 $mg/cm_2$.
Figure 21:
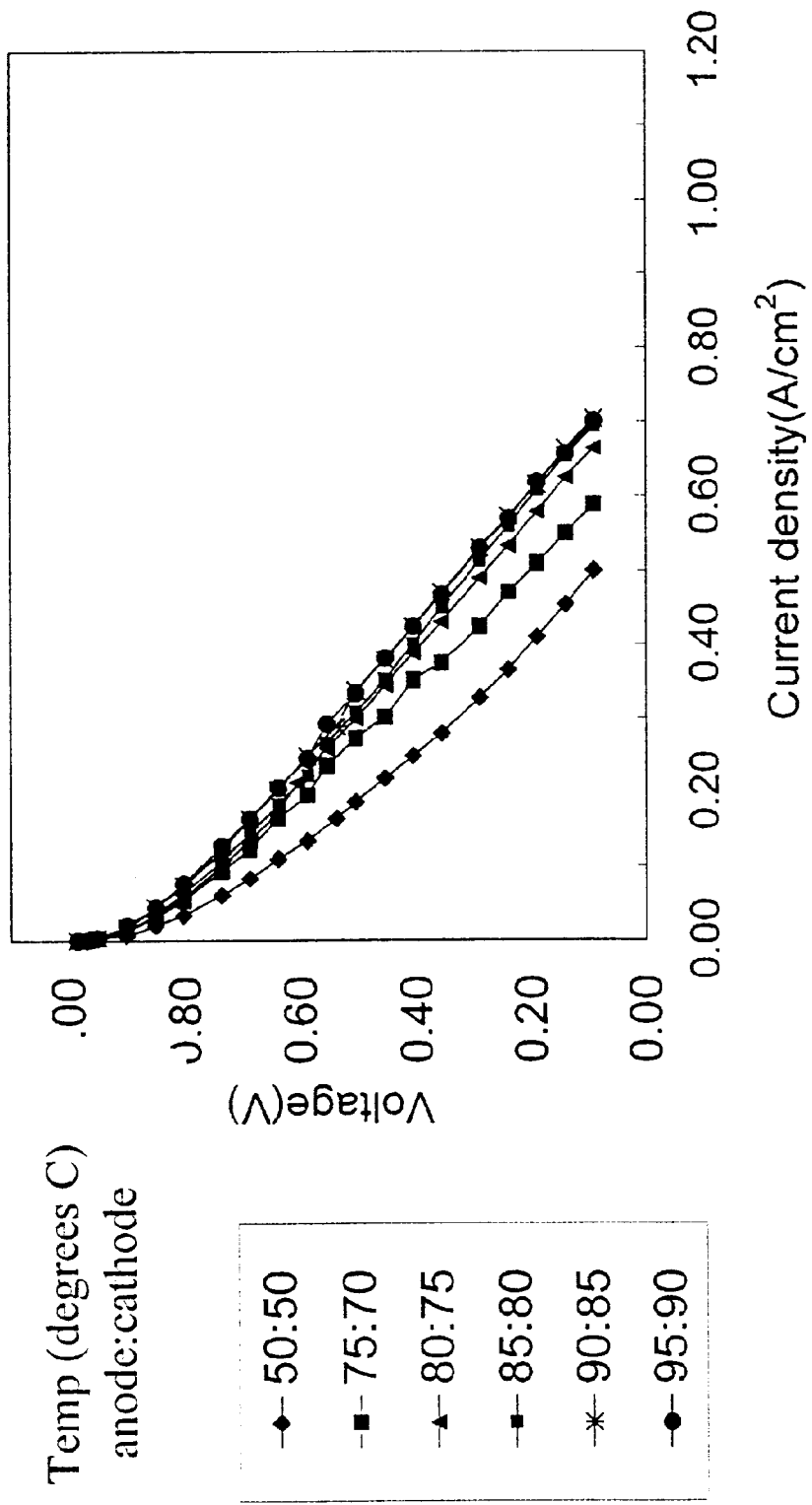
FIG. 21 is a plot of voltage versus current density showing the temperature dependency of the platinum loaded electrode one day after the start of operation at a constant anode pressure of 30 pounds per square inch, a constant cathode pressure of 50 pounds per square inch, and a constant cell temperature of 70° C.
Figure 22:
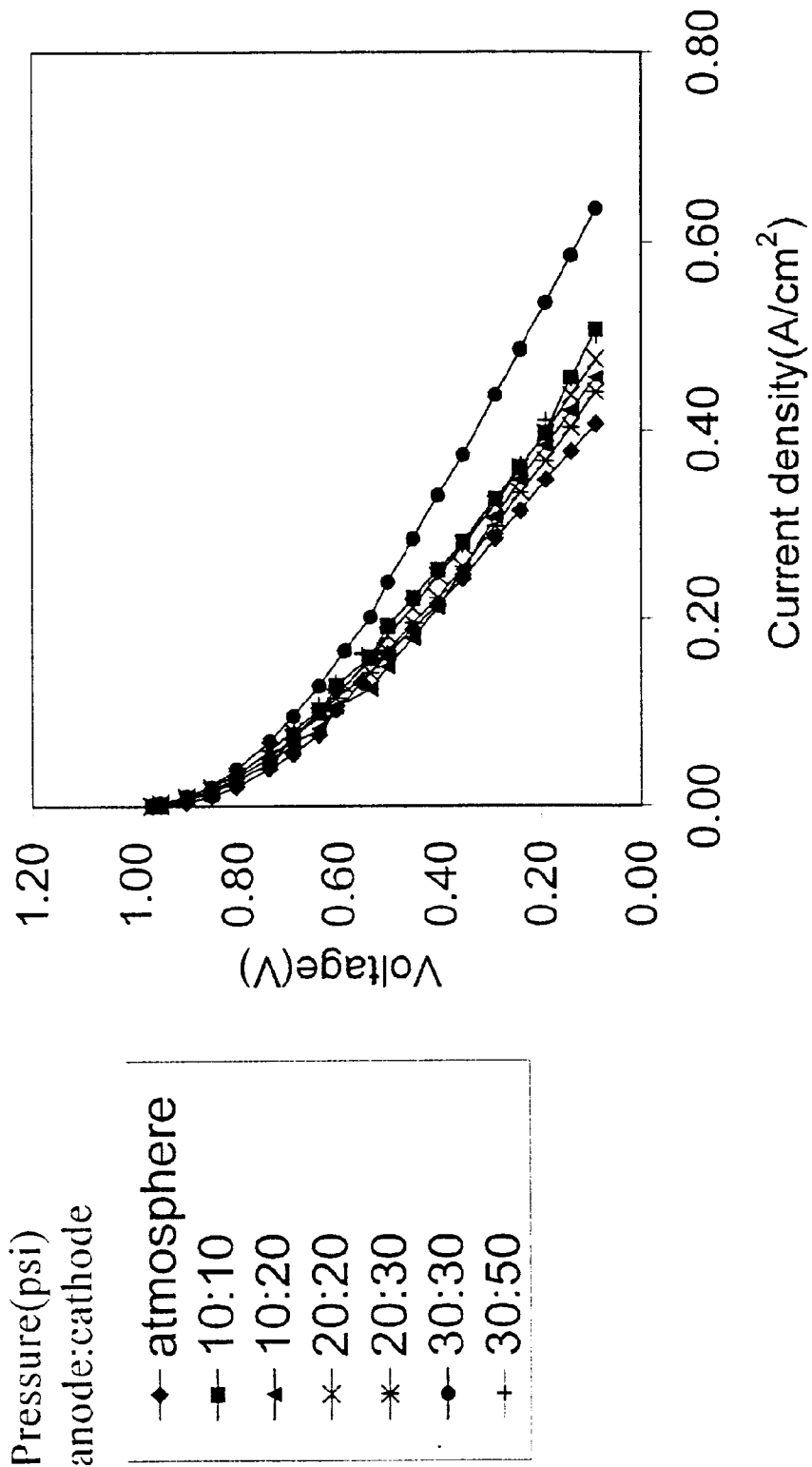
FIG. 22 is a plot of voltage versus current density showing the pressure dependency of the platinum loaded electrode two days after the start of operation at a constant temperature.

FIG. 20 shows the initial response for the nonmagnetic cell, and FIGS. 21 and 22 show the response one day and two days later, respectively, for that nonmagnetic cell. The response approaches that which is expected for a $H_2/O_2$ fuel cell run at 70° C. with 0.4 mg/cm$^2$ of platinum catalyst, and equal pressure of gases at the cathode and anode. The curves in FIG. 22 shows the response for various pressures of hydrogen and oxygen at the anode and cathode. As the pressure increases, the driving force for the reaction increases, and the power output (i.e., area under the curve) increases. The initial response of the nonmagnetic fuel cell was the best performance of the results shown in FIGS. 20–22.

Figure 23:
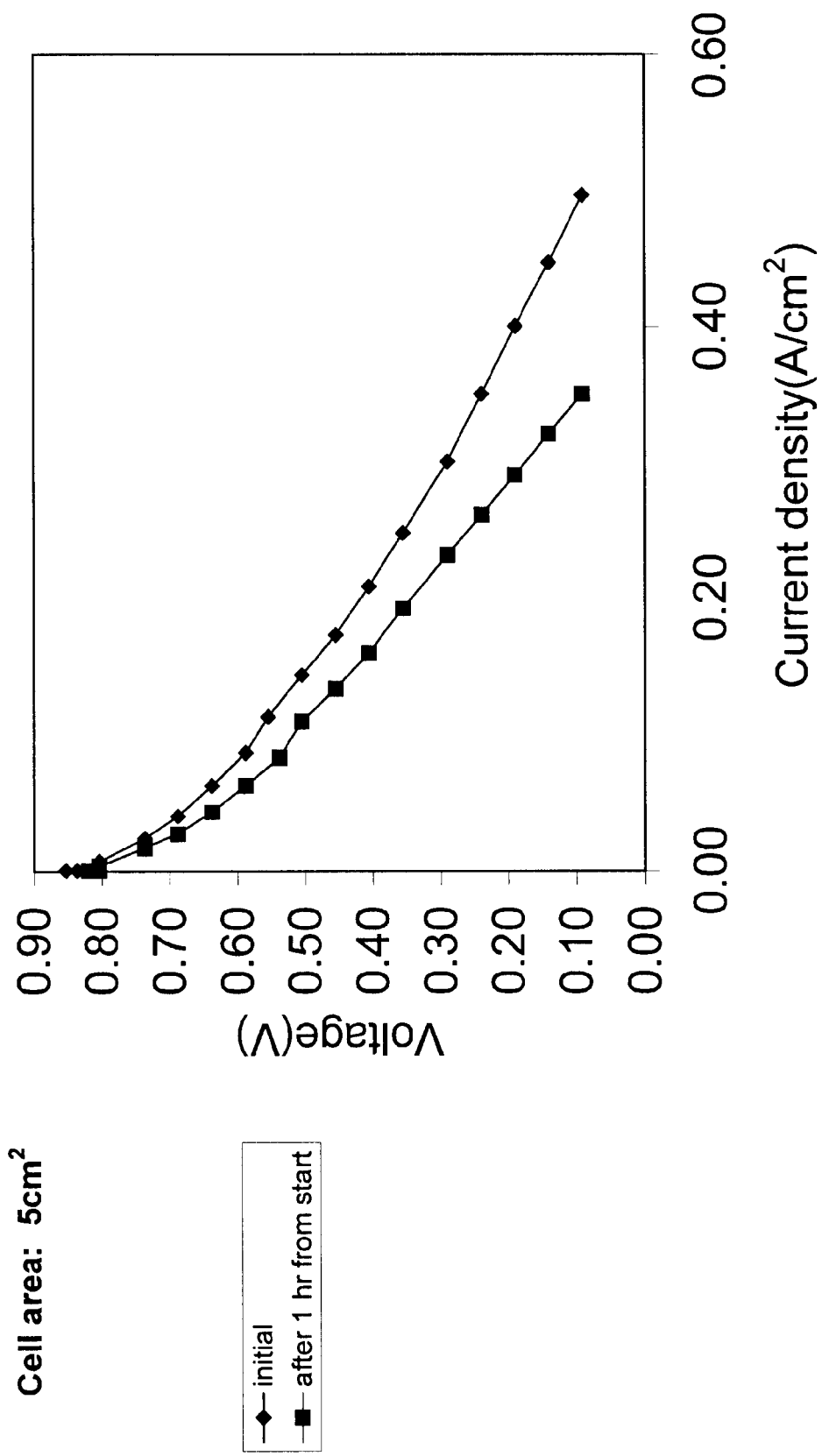
FIG. 23 is a plot of voltage versus current density for a platinum non-coated magnetic electrode having an anode and a cathode at a constant temperature of 50° C., and a cell temperature of 70° C.
Figure 24:
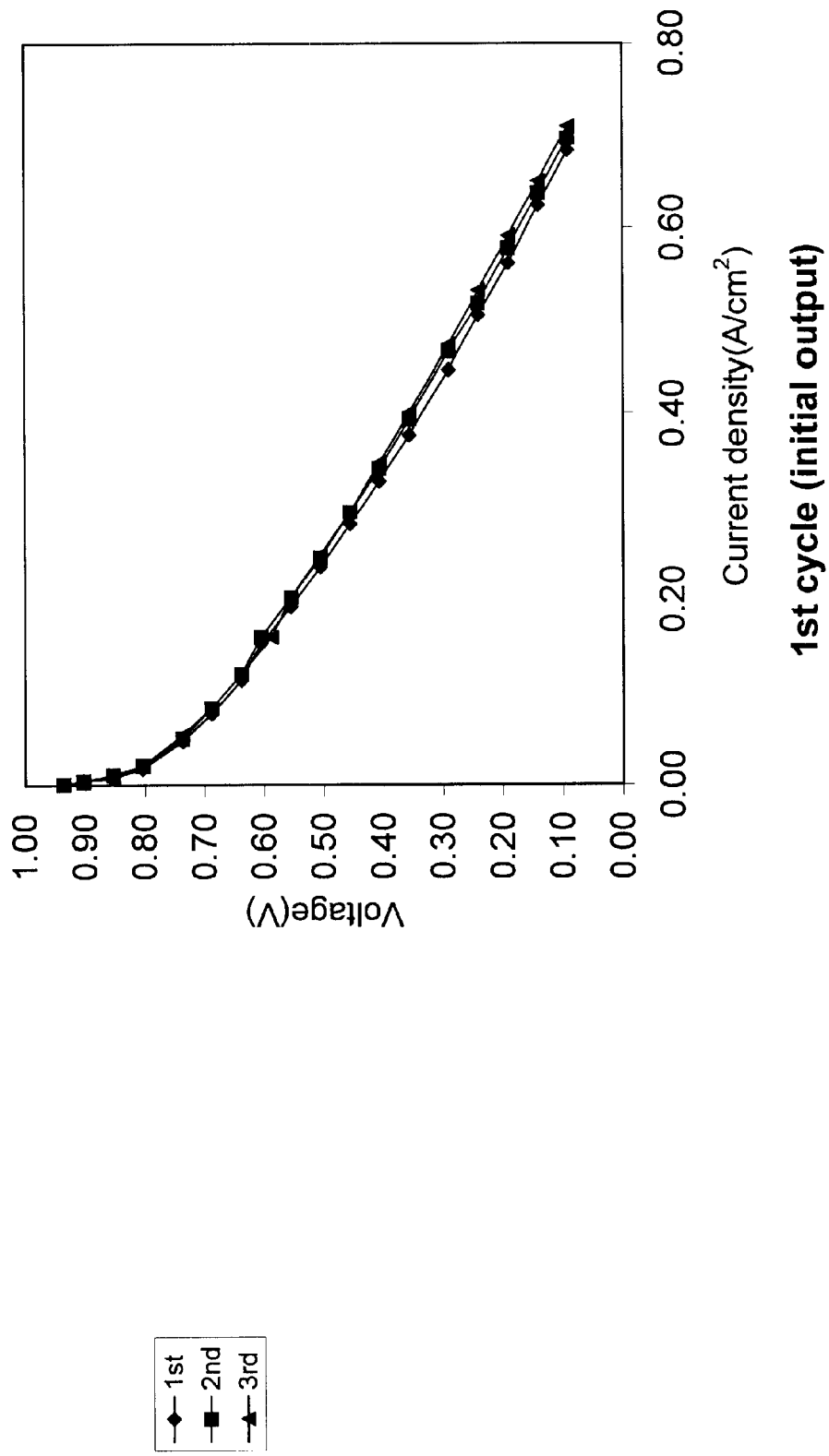
FIG. 24 is a plot of voltage versus current density for platinum and polystyrene-coated magnetic electrode at initial output.
Figure 25:
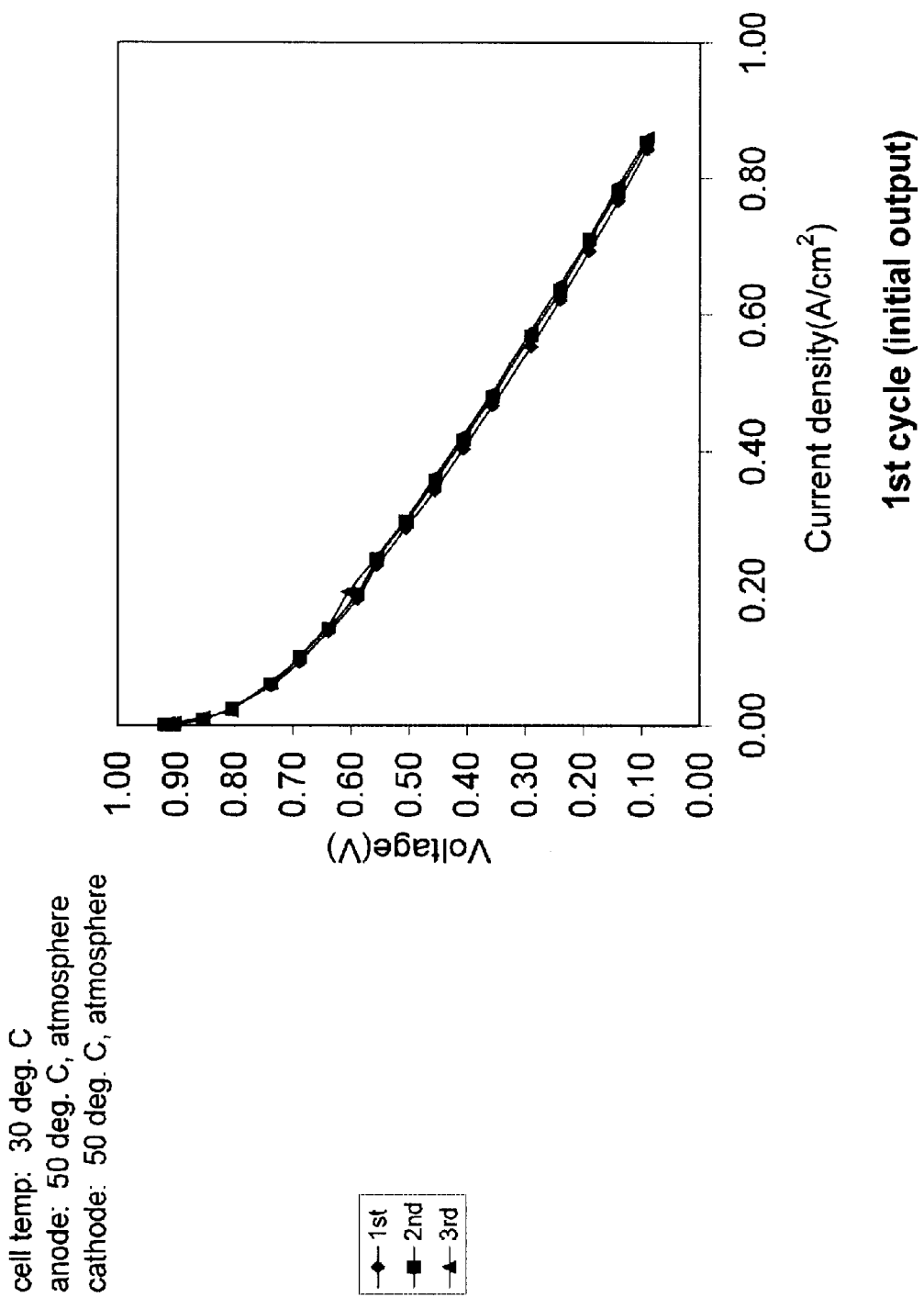
FIG. 25 is a plot of voltage versus current density for the initial output of a platinum and polystyrene-coated magnetic electrode at a cell temperature of 30° C. at the start of fuel cell output.
Figure 26:
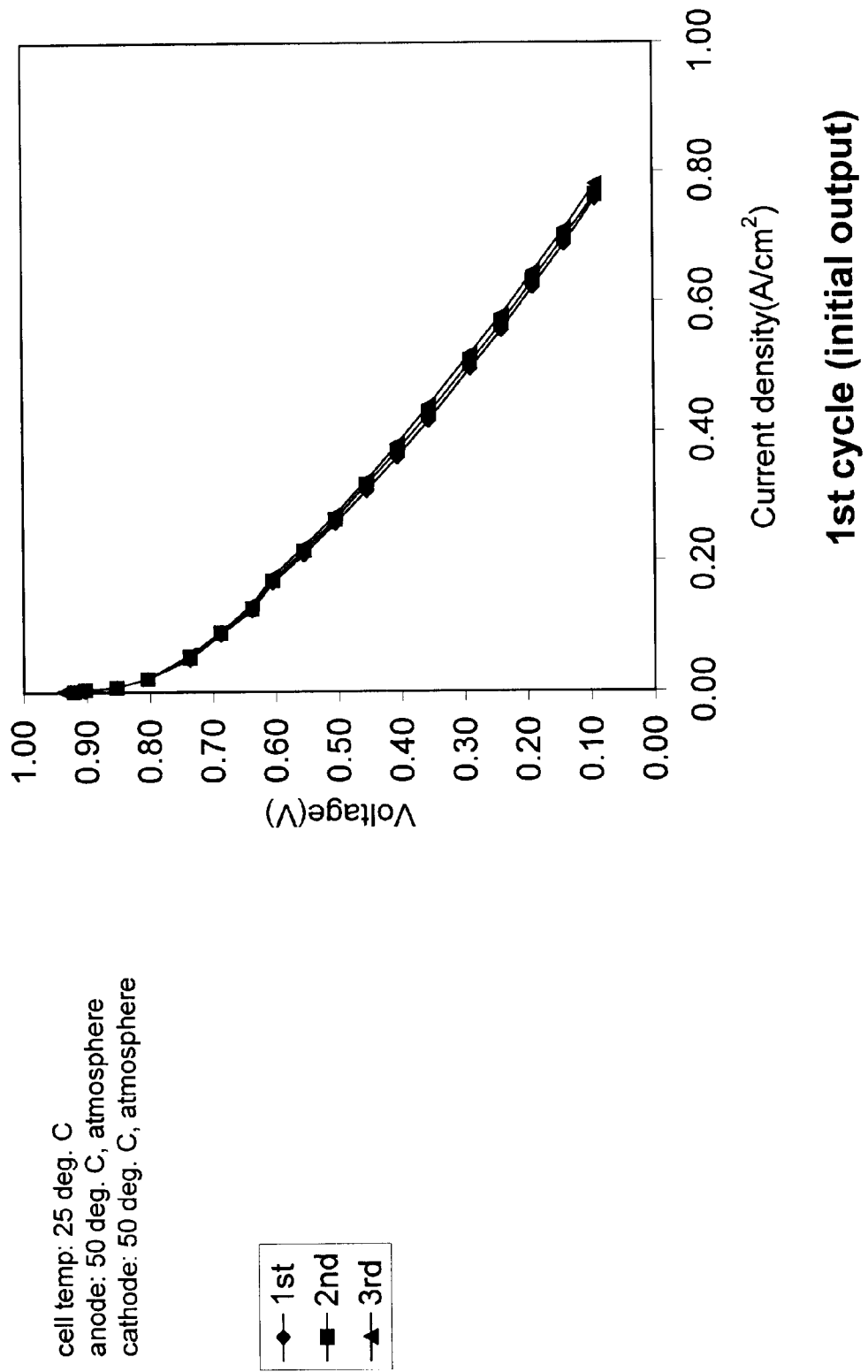
FIG. 26 is a plot of voltage versus current density for a platinum and polystyrene-coated magnetic electrode with a cell temperature of 25° C. and a cathode and anode temperature of 50° C., at a pressure of 1 atmosphere.
Figure 27:
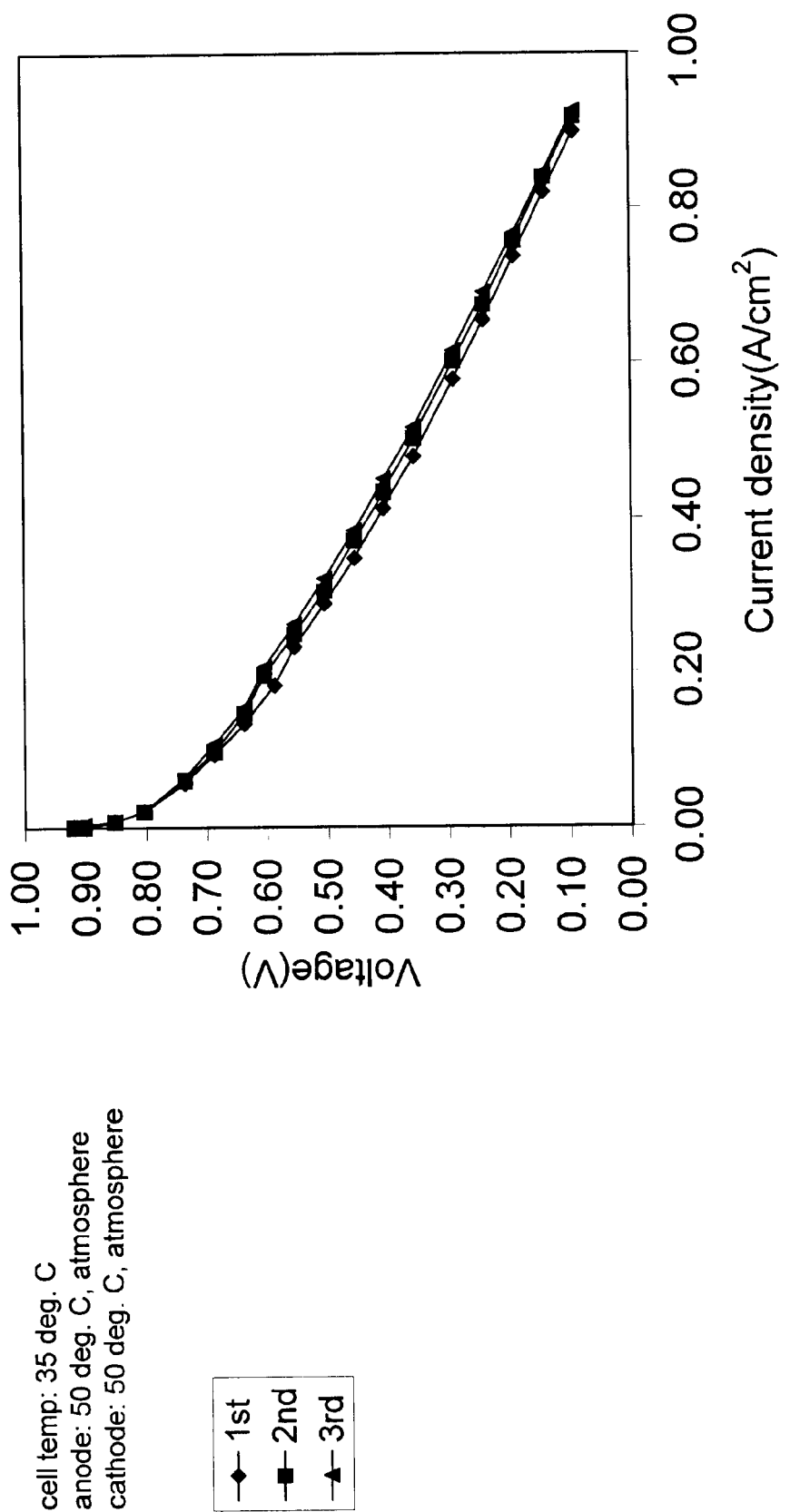
FIG. 27 is a plot of voltage versus current density for a platinum and polystyrene-coated magnetic electrode with a cell temperature of 35° C. and anode and cathode temperatures of 50° C., at a pressure of 1 atmosphere.
Figure 28:
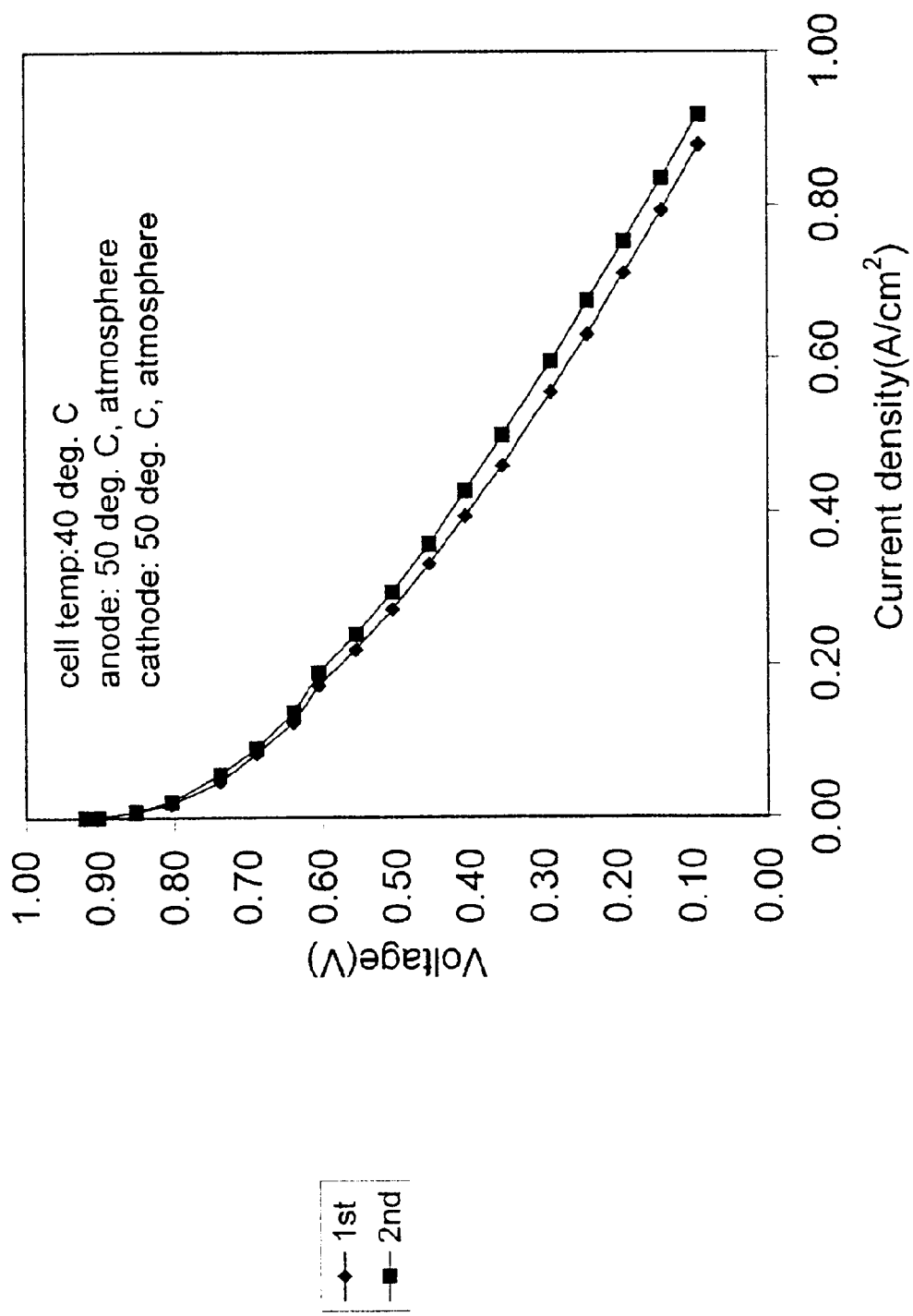
FIG. 28 is a plot of voltage versus current density for a platinum and polystyrene-coated magnetic electrode with a cell temperature of 40° C. and anode and cathode temperatures of 50° C., at a pressure of 1 atmosphere.
Figure 29:
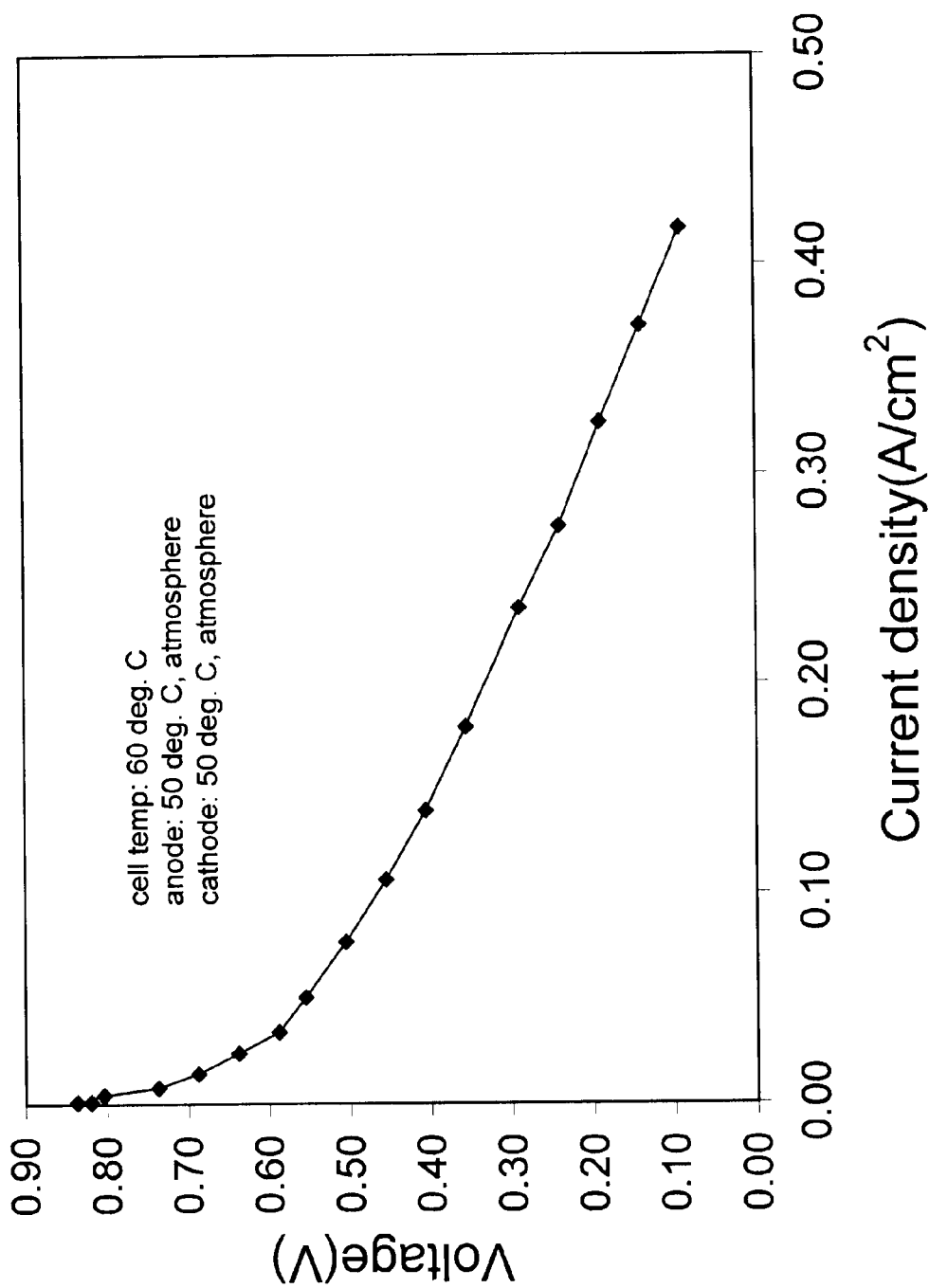
FIG. 29 is a plot of voltage versus current density for a platinum and polystyrene-coated magnetic electrode with a cell temperature of 60° C. and anode and cathode temperatures of 50° C., at a pressure of 1 atmosphere.
Figure 30:
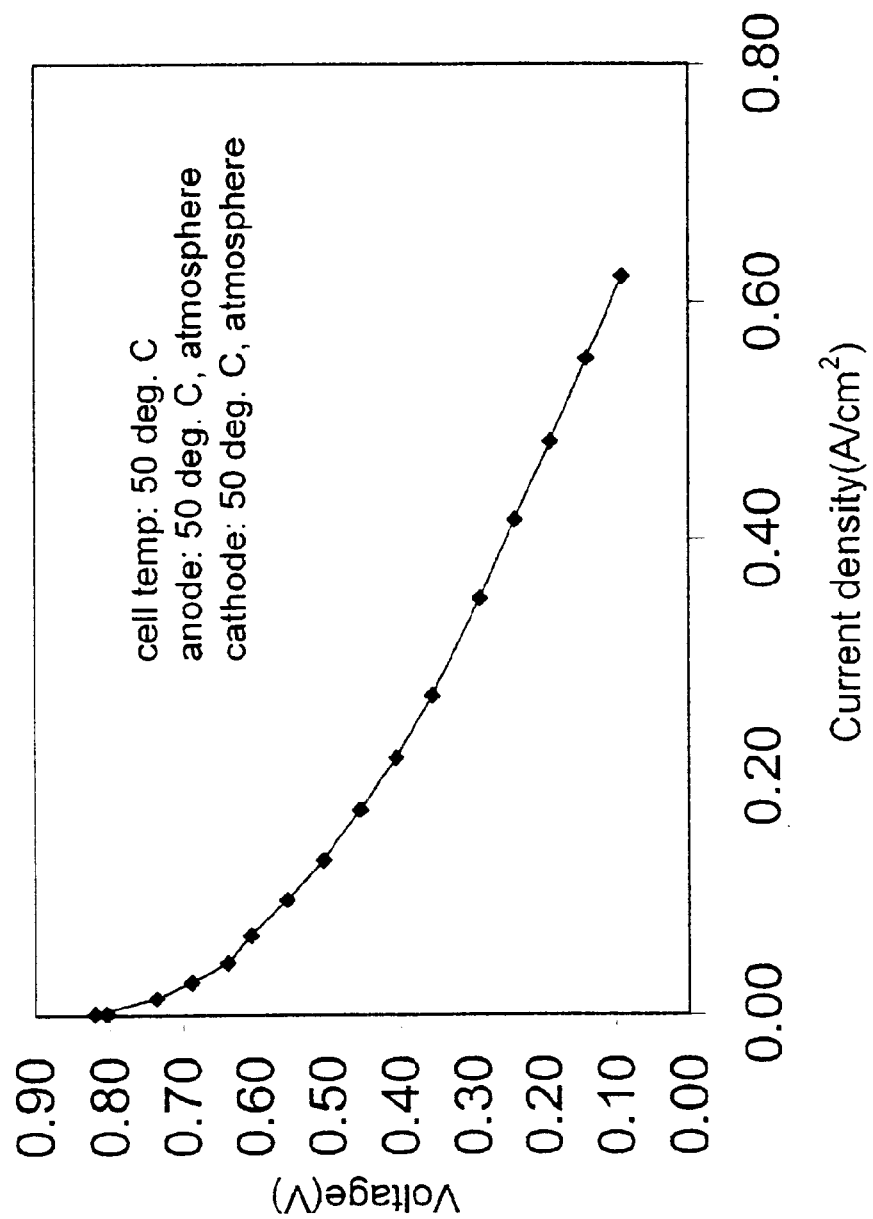
FIG. 30 is a plot of voltage versus current density for a platinum and polystyrene-coated magnetic electrode with a cell temperature of 50° C. and anode and cathode temperatures of 50° C., at a pressure of 1 atmosphere.
Figure 31:
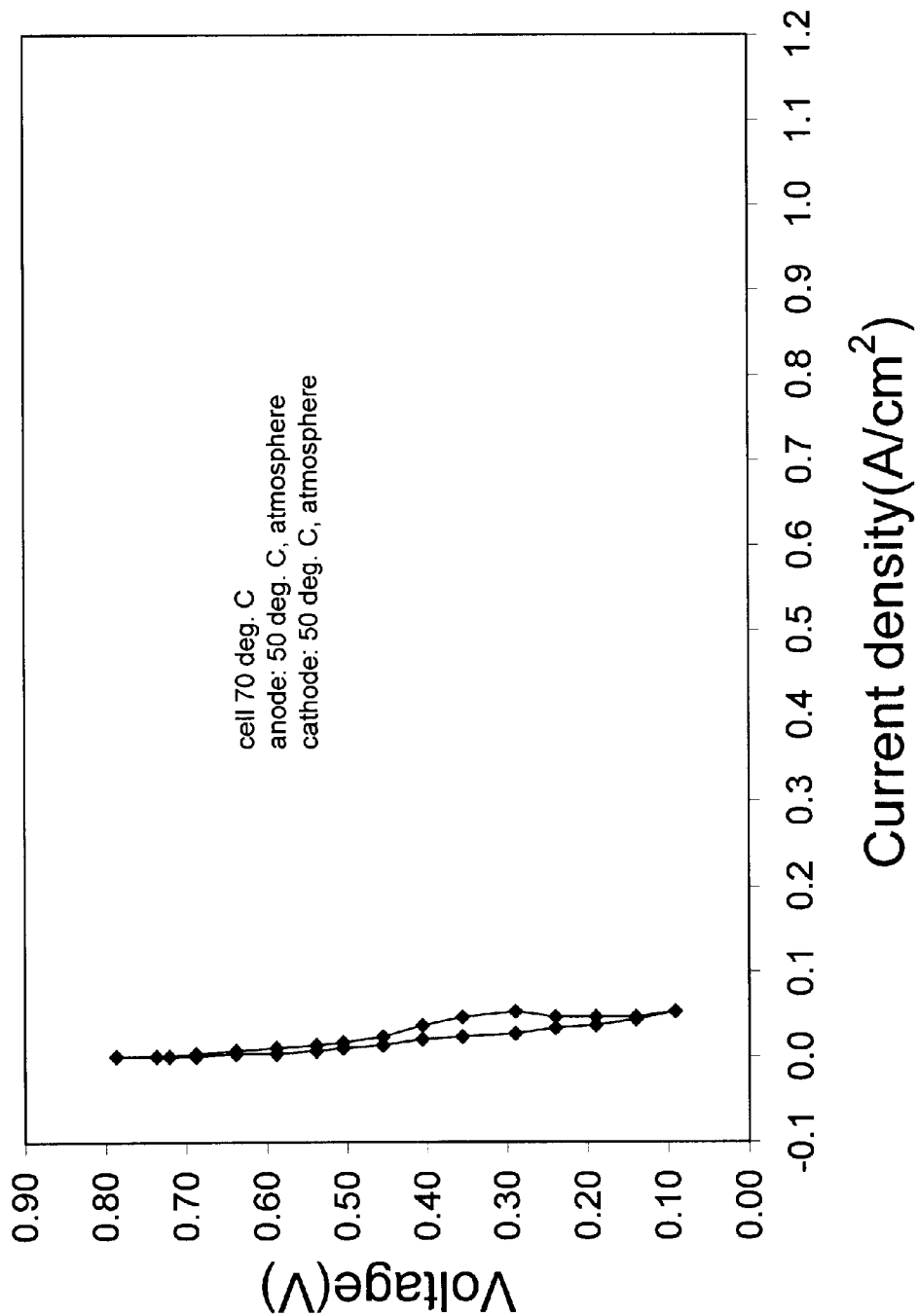
FIG. 31 is a plot of voltage versus current density for a platinum and polystyrene-coated magnetic electrode with a cell temperature of 70° C. and anode and cathode temperatures of 50° C., at a pressure of 1 atmosphere.
Figure 32:
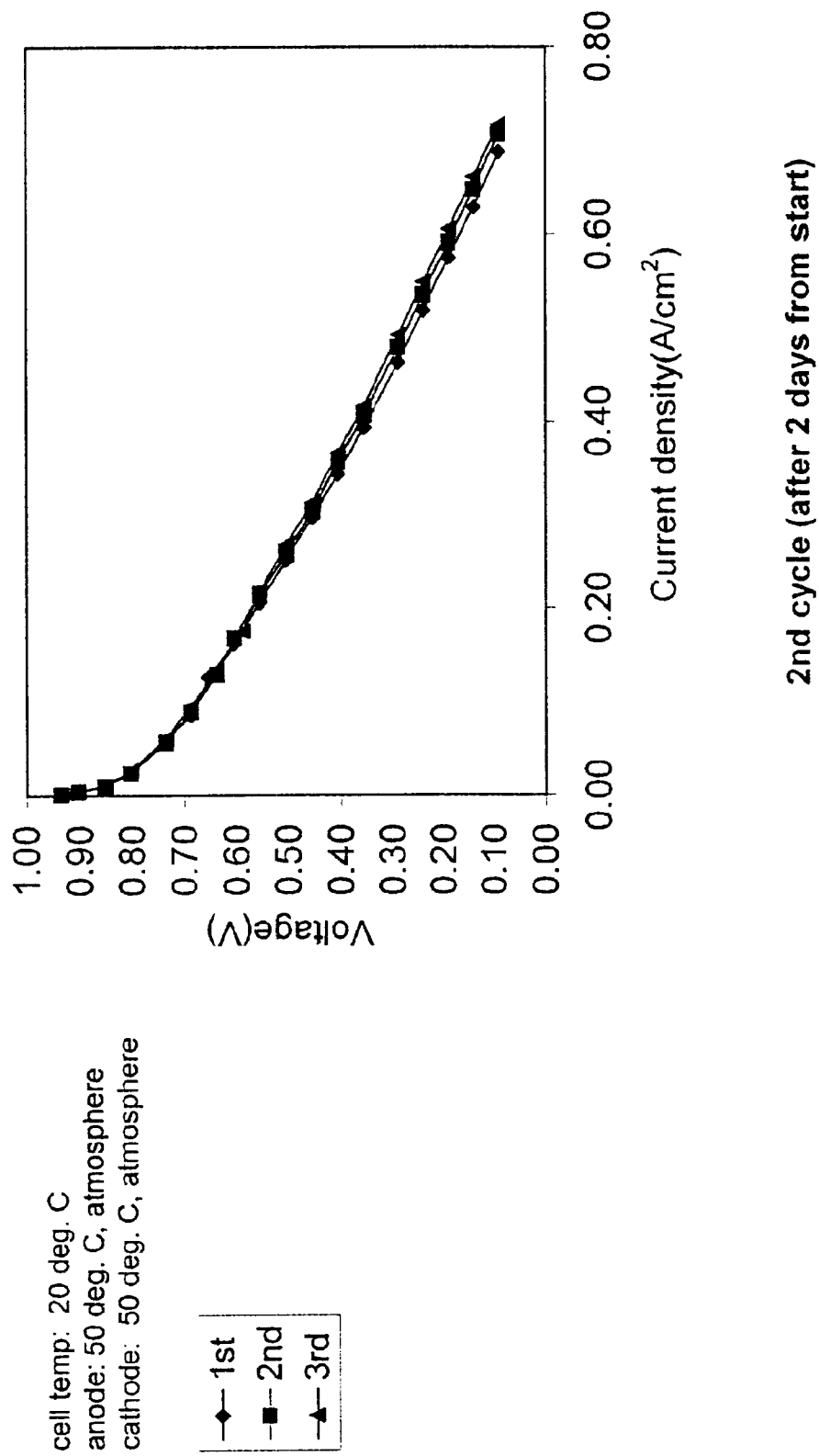
FIG. 32 is a plot of voltage versus current density for the platinum and polystyrene coated magnetic electrode two days after the start of fuel cell operation, for a cell temperature of 20° C. and anode and cathode temperatures of 50° C., at a pressure of 1 atmosphere.
Figure 33:
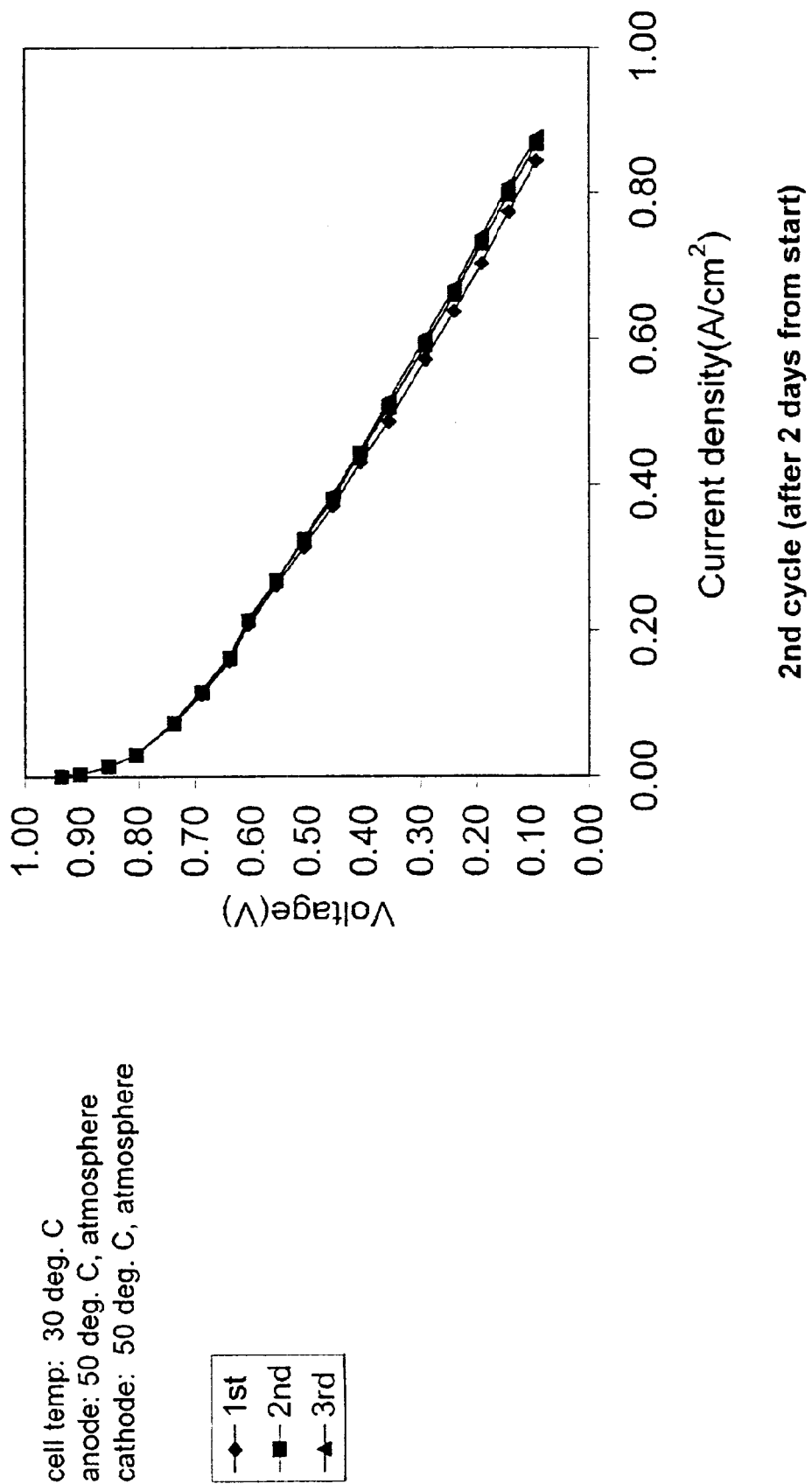
FIG. 33 is a plot of voltage versus current density for the platinum and polystyrene coated magnetic electrode two days after the start of fuel cell operation, for a cell temperature of 30° C. and anode and cathode temperatures of 50° C., at a pressure of 1 atmosphere.
Figure 34:
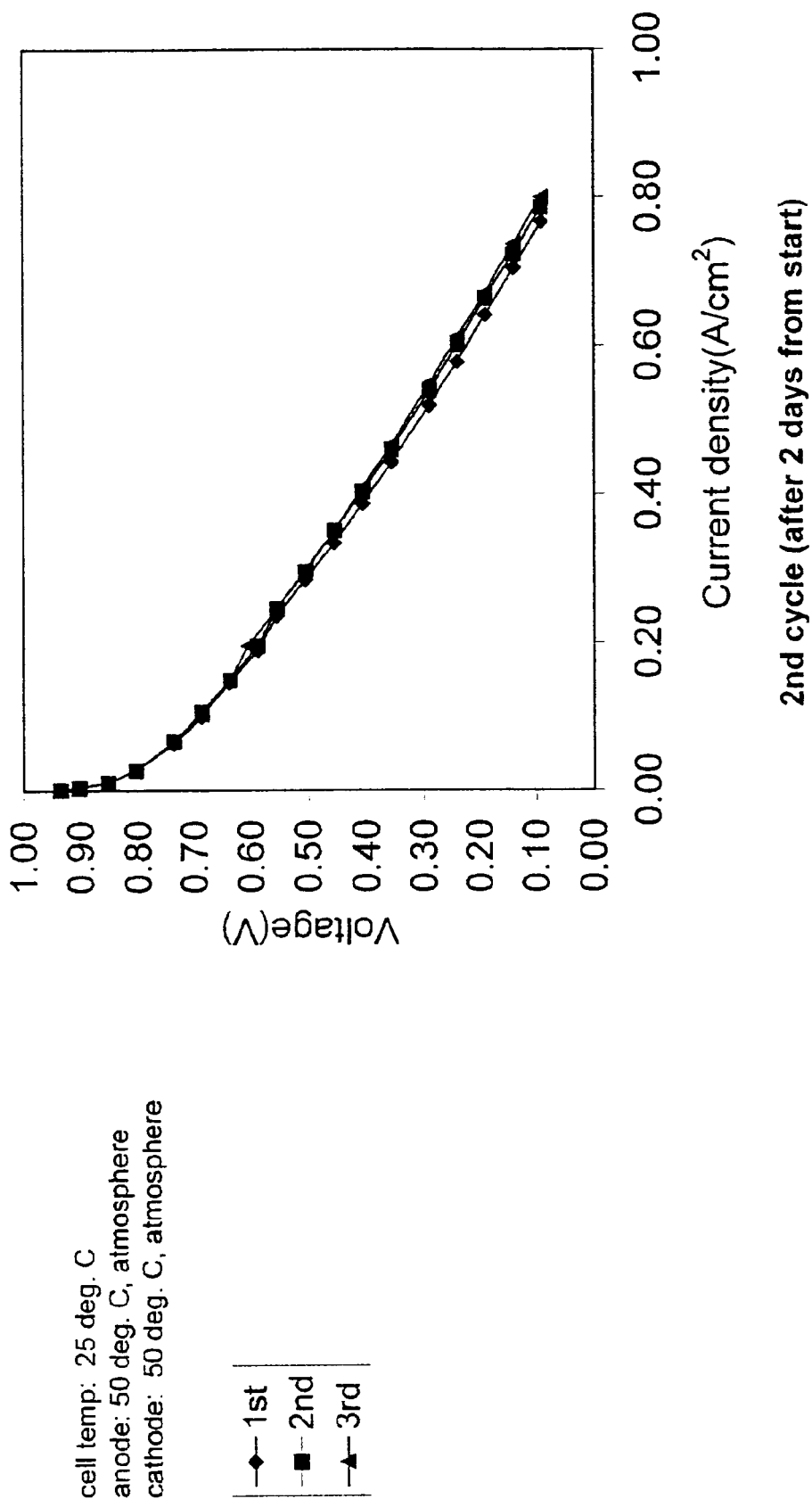
FIG. 34 is a plot of voltage versus current density for the platinum and polystyrene coated magnetic electrode two days after the start of fuel cell operation, for a cell temperature of 25° C. and anode and cathode temperatures of 50° C., at a pressure of 1 atmosphere.
Figure 35:
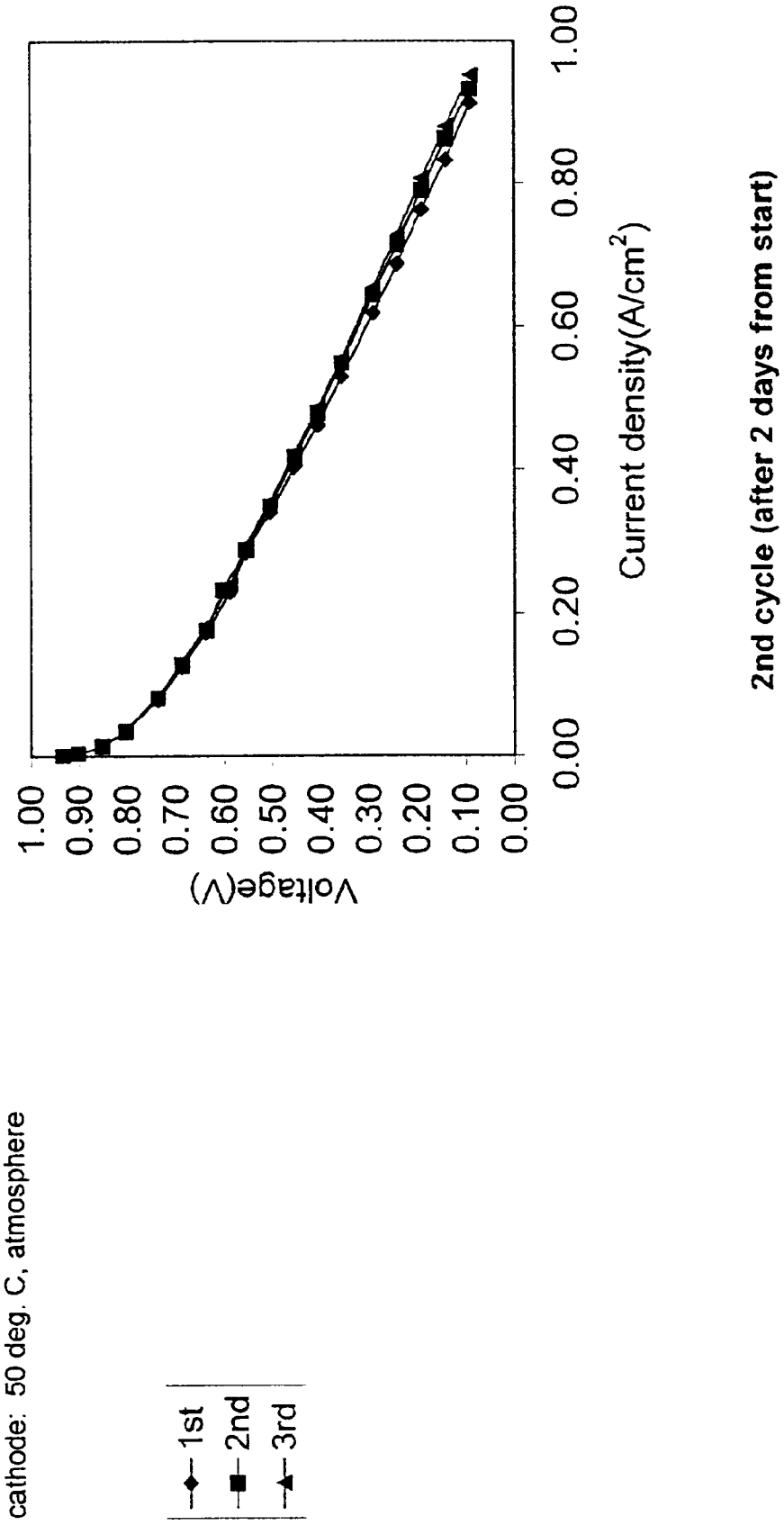
FIG. 35 is a plot of voltage versus current density for the platinum and polystyrene coated magnetic electrode two days after the start of fuel cell operation, for a cell temperature of 35° C. and anode and cathode temperatures of 50° C., at a pressure of 1 atmosphere.
Figure 36:
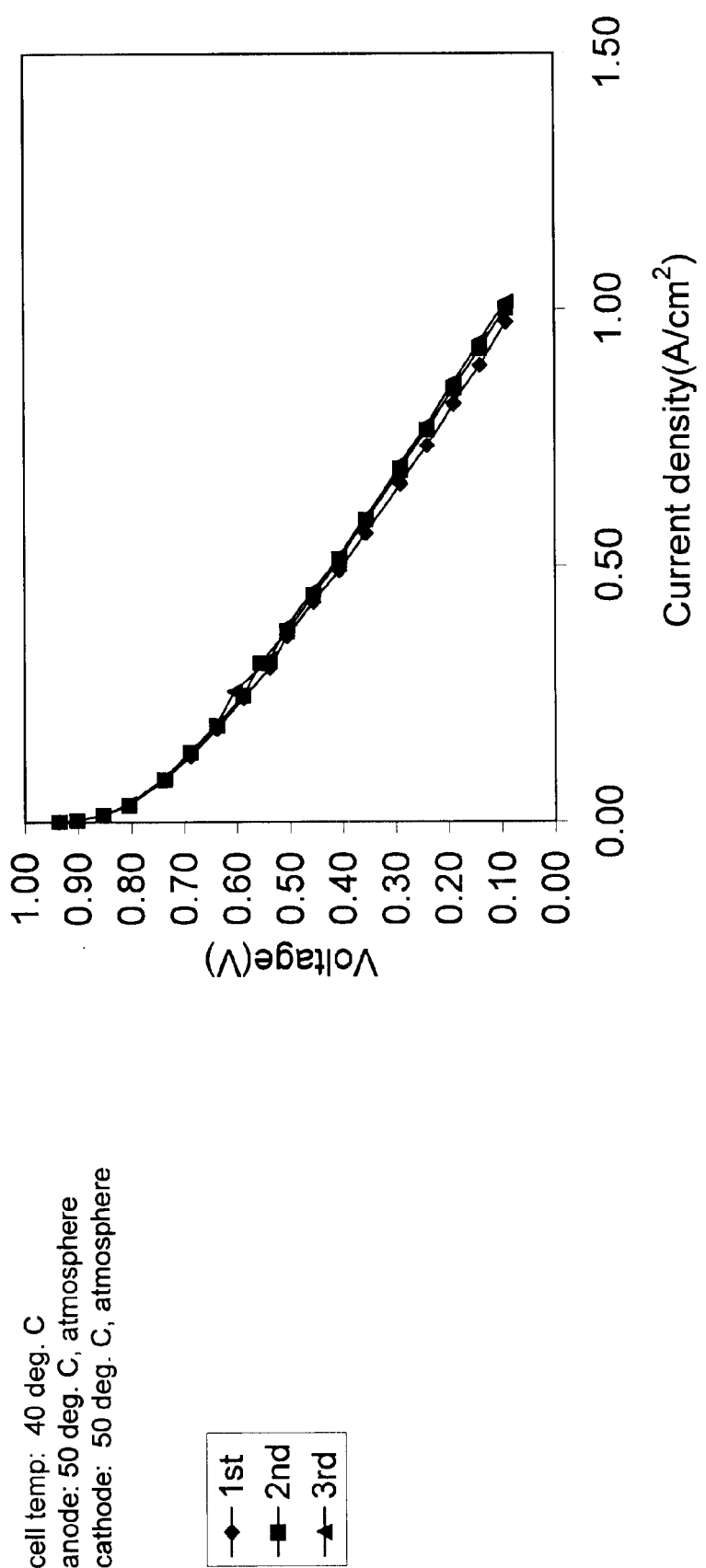
FIG. 36 is a plot of voltage versus current density for the platinum and polystyrene coated magnetic electrode two days after the start of fuel cell operation, for a cell temperature of 40° C. and anode and cathode temperatures of 50° C., at a pressure of 1 atmosphere.
Figure 37:
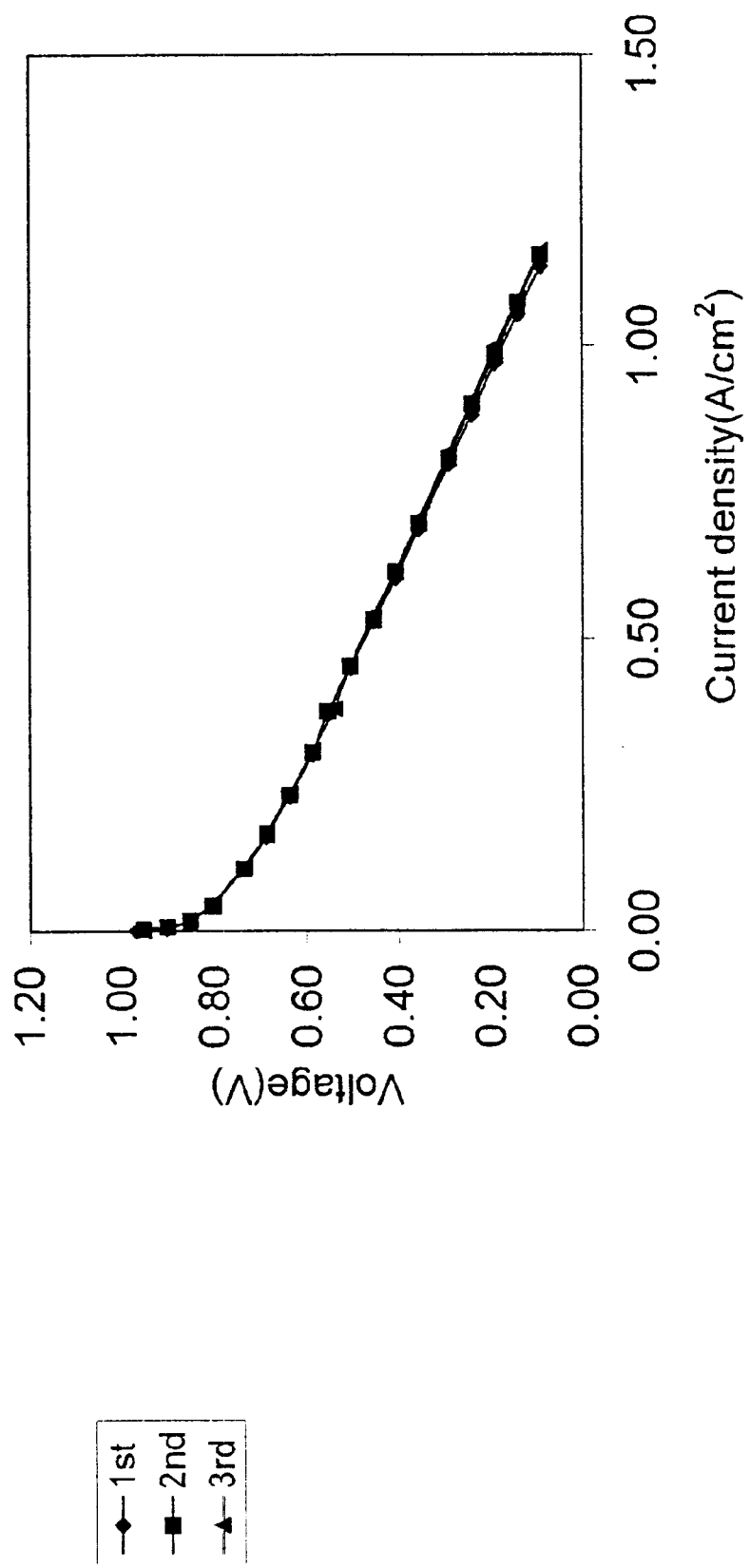
FIG. 37 is a plot of voltage versus current density voltage for the platinum and polystyrene coated magnetic electrode two days after the start of fuel cell operation, for a cell temperature of 50° C. and anode and cathode temperatures of 50° C., and a pressure of 1 atmosphere.
Figure 38:
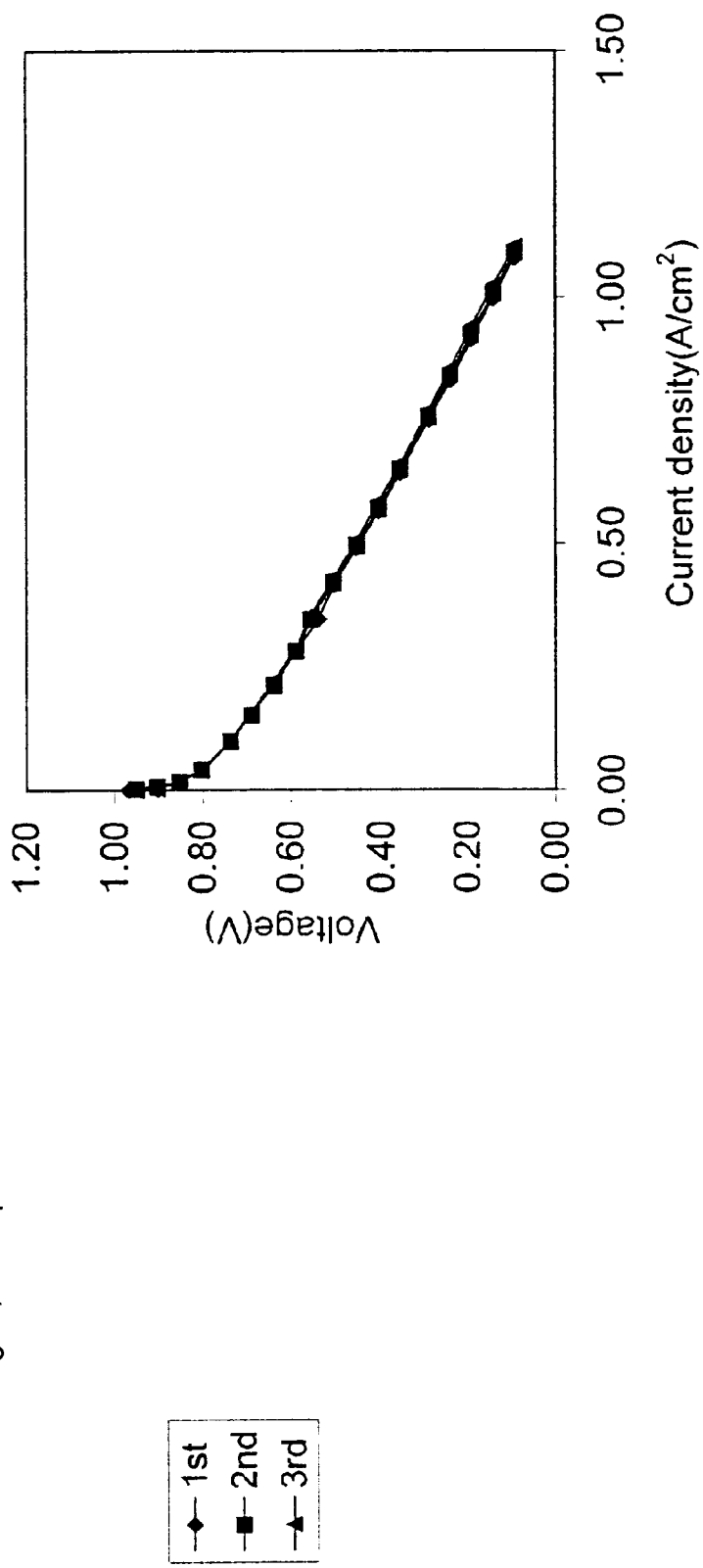
FIG. 38 is a plot of voltage versus current density for the platinum and polystyrene coated magnetic electrode two days after the start of fuel cell operation, for a cell temperature of 45° C. and anode and cathode temperatures of 50° C., at a pressure of 1 atmosphere.

FIG. 23 shows results for a cell modified with uncoated iron oxide particles initially and after one hour of operation. The cell temperature is 70° C., and the iron oxide loading is 0.2 mg/cm$^2$. The initial cell performance was poor and degraded rapidly. The uncoated iron oxide may not be stable in the fuel cell environment, possibly due to the fabrication of the membrane electrode assemblies (MEA's) or dissolution of the iron oxide due to the corrosive chemistry of an operational fuel cell. More stable modified electrodes can be constructed using Nafion and uncoated iron oxide. While uncoated iron oxide is more cost-effective than coated iron oxide, the cost differential is small, given the low loading of the magnetic beads.

FIGS. 24 through 42 show the experimental results for magnetically modified fuel cells based on polystyrene-coated iron oxide microparticles. Experimental conditions for the magnetic and nonmagnetic fuel cell experiment were very similar. The MEA is made by pressing at a temperature of about 120° C. and a pressure of about 1500 psi for about two minutes. The low melting point of polystyrene necessitated those mild conditions. The content of polystyrene-coated iron oxide particles in the composites was about 0.14 mg/cm$^2$, or approximately 4.72%, which is a low loading compared to the modified electrode experiments which used approximately 15% iron oxide. The total fuel cell area was 5 cm$^2$, so the improved performance seen with the magnetically modified fuel cell occurs for a weight of 0.7 mg, a negligible change in the composition of the fuel cell with respect to weight and volume. The results for the magnetically modified fuel cells were taken at hydrogen-to-oxygen pressures of 10:10 and at various temperatures.

Figure 39:
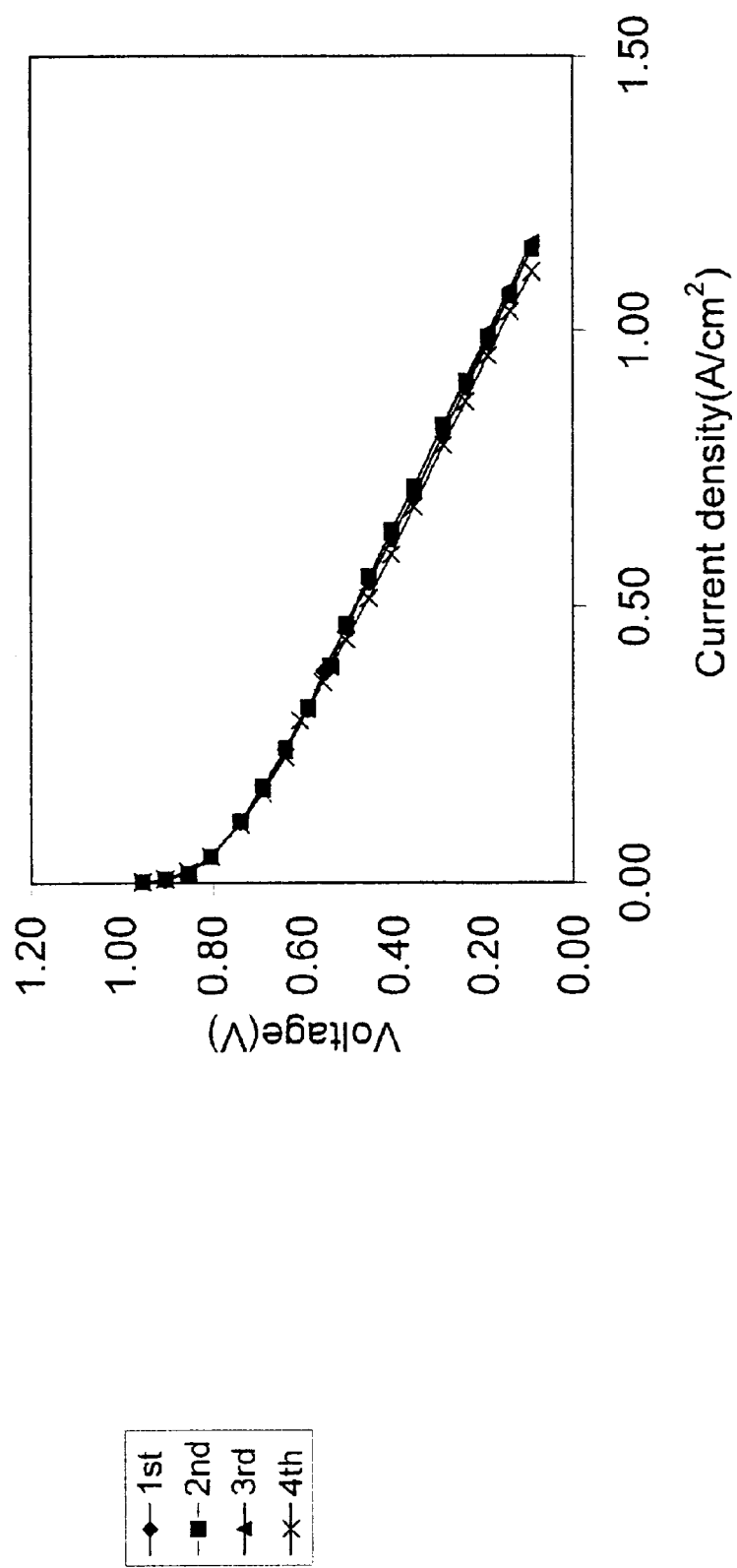
FIG. 39 is a plot of voltage versus current density for the platinum and polystyrene coated magnetic electrode two days after the start of fuel cell operation, for a cell temperature 55° C. and anode and cathode temperatures of 50° C., at a pressure of 1 atmosphere.
Figure 40:
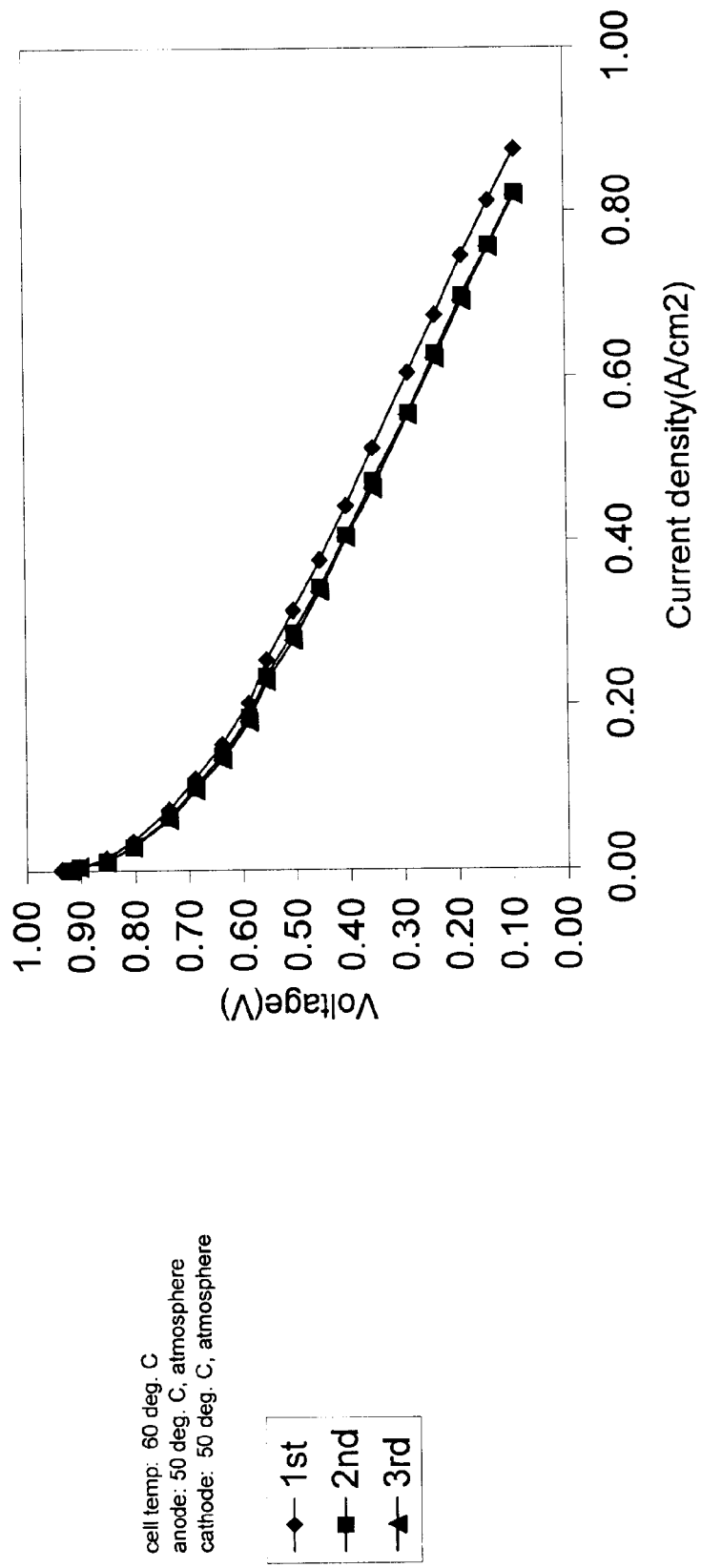
FIG. 40 is a plot of voltage versus current density for the platinum and polystyrene coated magnetic electrode two days after the start of fuel cell operation, for a cell temperature of 60° C. and anode and cathode temperatures of 50° C., at a pressure of 1 atmosphere.
Figure 41:
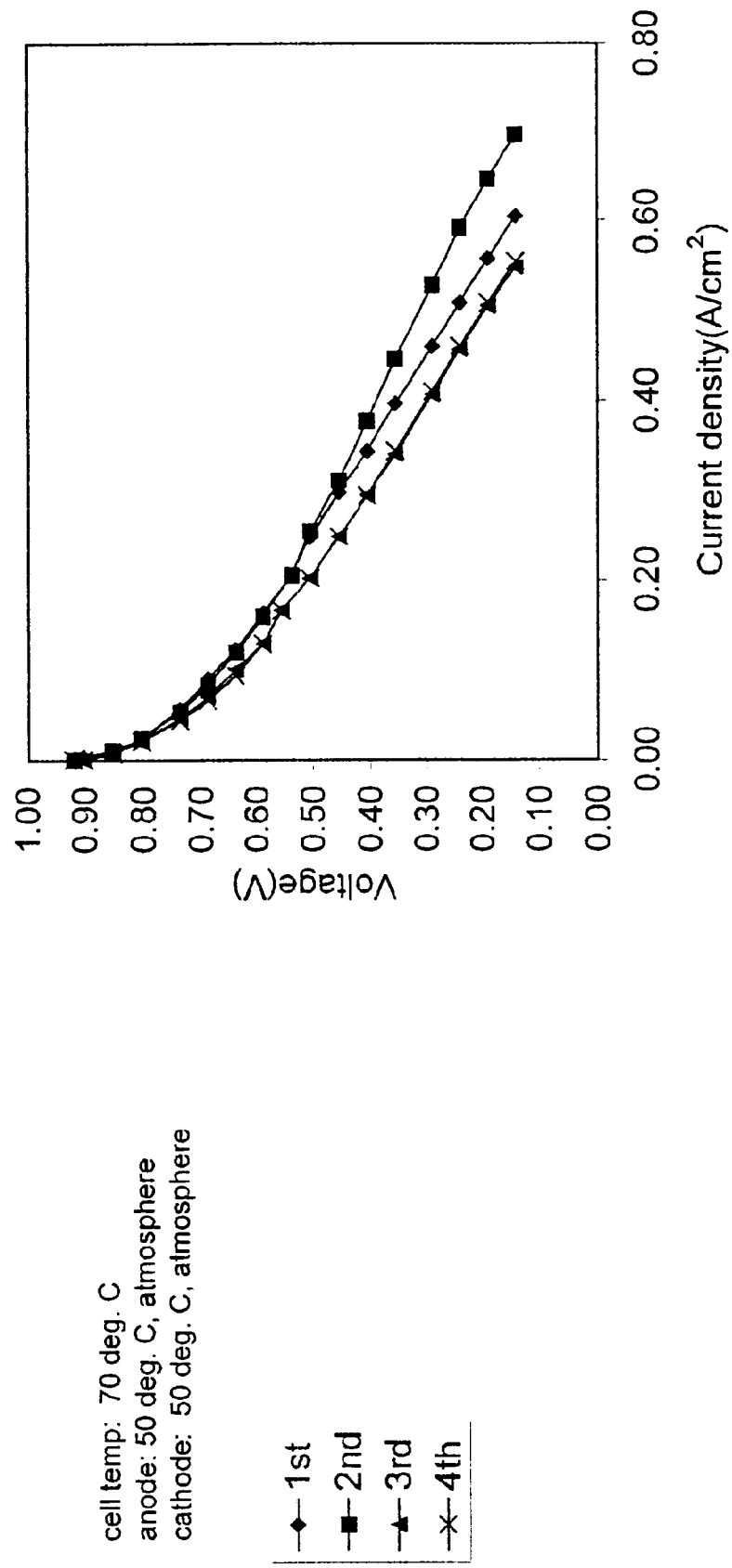
FIG. 41 is a plot of voltage versus current density for the platinum and polystyrene coated magnetic electrode two days after the start of fuel cell operation, for a cell temperature of 70° C. and anode and cathode temperatures of 50° C., at a pressure of 1 atmosphere.
Figure 42:
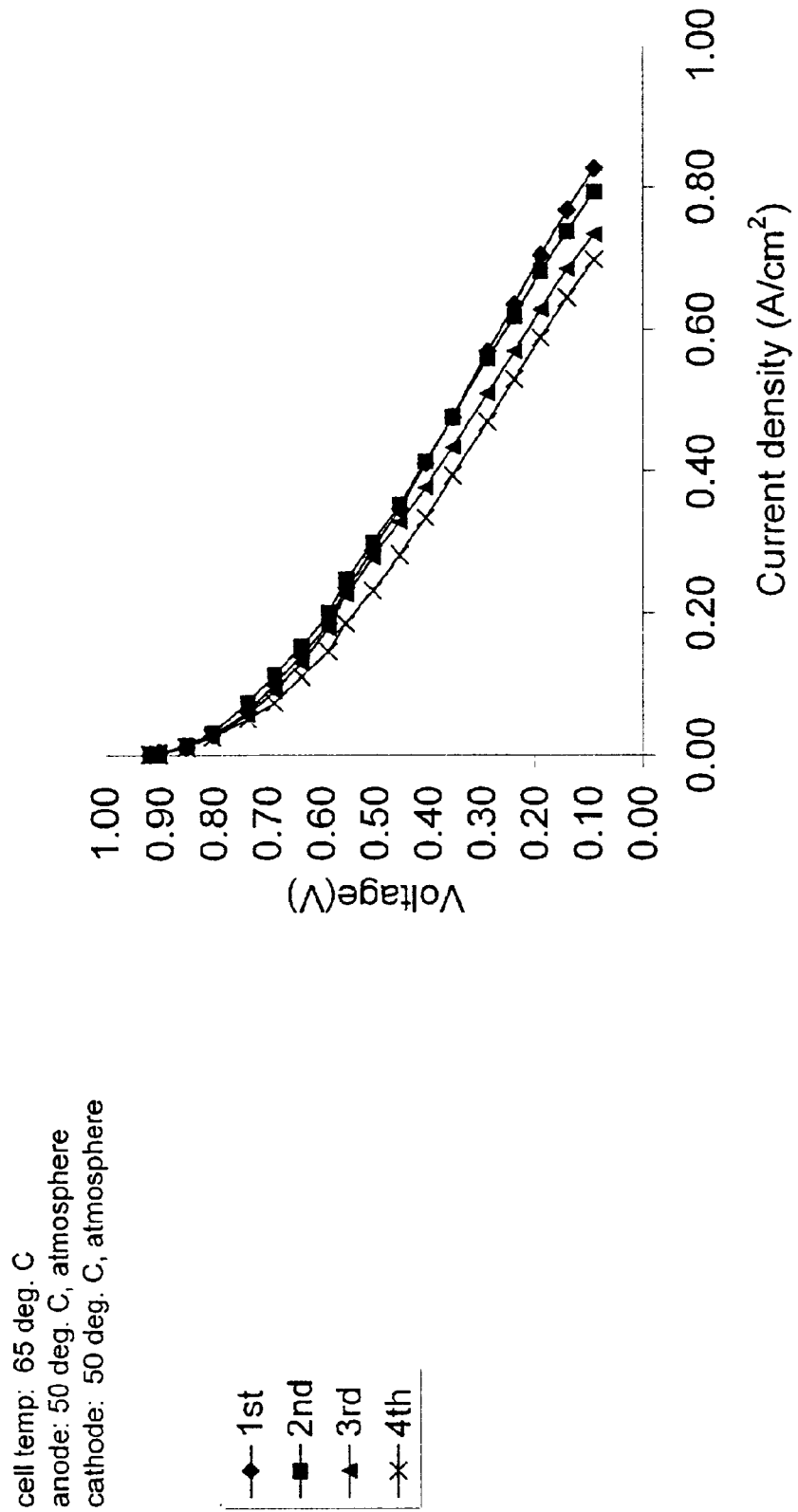
FIG. 42 is a plot of voltage versus current density for the platinum and polystyrene coated magnetic electrode two days after the start of fuel cell operation, for a cell temperature of 65° C. and anode and cathode temperatures of 50° C., at a pressure of 1 atmosphere.

The initial performance of the magnetically modified fuel cells was sub-optimal, as shown in FIGS. 24 through 31, while optimal performance occurred after two days, as shown in FIGS. 32 through 42. As the cell temperature increased, the power output of the cell increased, up to cell a temperature of about 55° C., as shown in FIGS. 32 through 39. The best performance for this cell was observed at 55° C., as shown in FIG. 39. Once the cell temperature exceeded 60° C., cell performance degraded at cell temperatures of 65° and 75° C., as shown in FIGS. 40 through 42.

FIG. 43 shows an estimate of the fuel cell performance with respect to temperature. The current density in amps/cm$^2$ is shown at 0.4V, and the data are taken from the current-voltage curves for each cell temperature, or from the temperature dependence of the magnetic field effects on chemical systems. The tabulated values of current density are roughly proportional to the power at 0.4V. The data shows that the current density increases significantly up to 55° C. and then falls sharply. The cell temperature effect is reversible, i.e., after exceeding 55° C. and returning to a lower operating temperature of about 35° C., cell performance returns to its original value. The temperature effect may also be related to the properties of the material used.

FIG. 44 summarizes the results of the present experiments. To estimate the power calculations of the voltage at 0.4 amps/cm$^2$, the amperage at 0.4 V, and the power P were made as a product of current and voltage. The far right-hand column reports the power output for different configurations relative to the peak power output recorded for the nonmagnetic fuel cell.

As suggested in the background art, the best performance for the nonmagnetic fuel cells occurred at the initial output at a cell temperature of about 70° C., and produced a power of about 0.14 W/cm$^2$, or 100% of the reference value. At 20° C., the nonmagnetic fuel cell did not run well, which is typical of conventional polymer electrolyte fuel cells.

The power output was recorded for a nonmagnetic fuel cell at 20:20 pressure and 30:30 pressure at the cathode and electrode, respectively. At 20:20 pressure, the fuel cell generated about 54% more power than 10:10 pressure. At 30:30 pressure, the fuel cell generated about 75% more power than at 10:10 pressure.

The initial power output for the fuel cells formed with uncoated iron oxide was approximately 0.08 W/cm$^2$, or about 57% of the power output by the reference nonmagnetic fuel cell. That magnetic system degraded very rapidly over time.

The best performance for the magnetically modified fuel cells containing polystyrene coated iron oxide beads occurred at a cell temperature of about 55° C. after running the cell for two days. The power output is approximately 0.24 W/cm$^2$, or about 75% more power output than the reference nonmagnetic fuel cell value at a cell temperature of about 70° C. Thus, magnetic modification at a low level of 4.72% magnetic beads allowed the fuel cell to run about 15° C. cooler and generated about twice as much power, without the additional pressurization used with the nonmagnetic fuel cell. To generate the same power output as the magnetic fuel cell at about 55° C., the nonmagnetic fuel cell requires three times as much pressure at 70° C., or about 30 p.s.i.

The magnetically modified fuel cell runs at 20° C., while the nonmagnetic fuel cell will not run at that temperature. The power output at 20° C. (room temperature) is 0.14 W/cm$^2$, which equals the power output for the nonmagnetic fuel cell at 70° C. As a benchmark, the magnetic fuel cell generates about 30% more power than the best performance for the reference nonmagnetic system at "body" temperature, i.e., about 37° C. Finally, the magnetic fuel cell has stable power output, and ran for about one week with little degradation and no failure.

Figure 45:
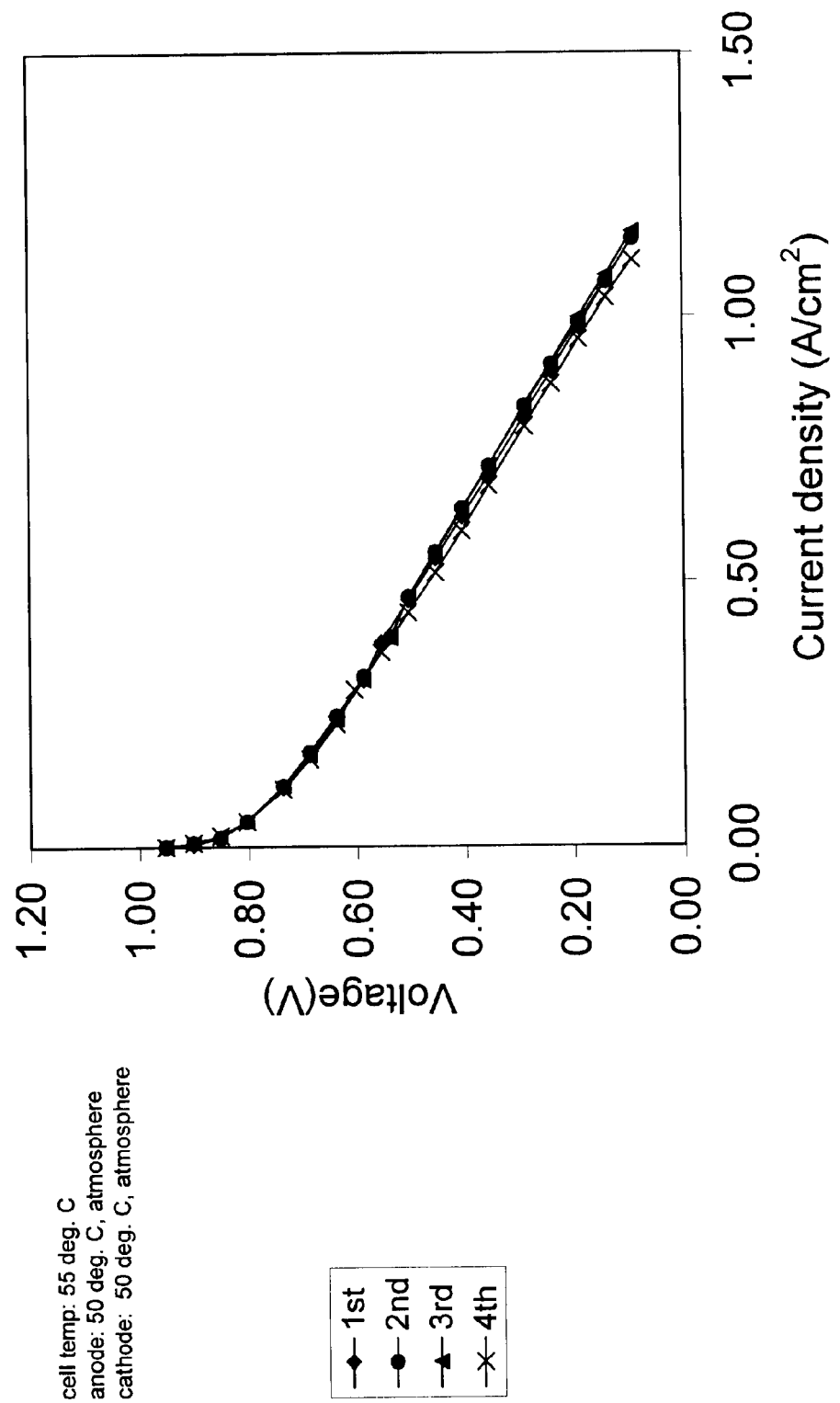
FIG. 45 is a plot of voltage versus current density for the maximum output of the platinum and polystyrene-coated magnetic electrode, at a cell temperature of 55° C., anode and cathode temperatures 50° C., and at a pressure of 1 atmosphere.
Figure 46:
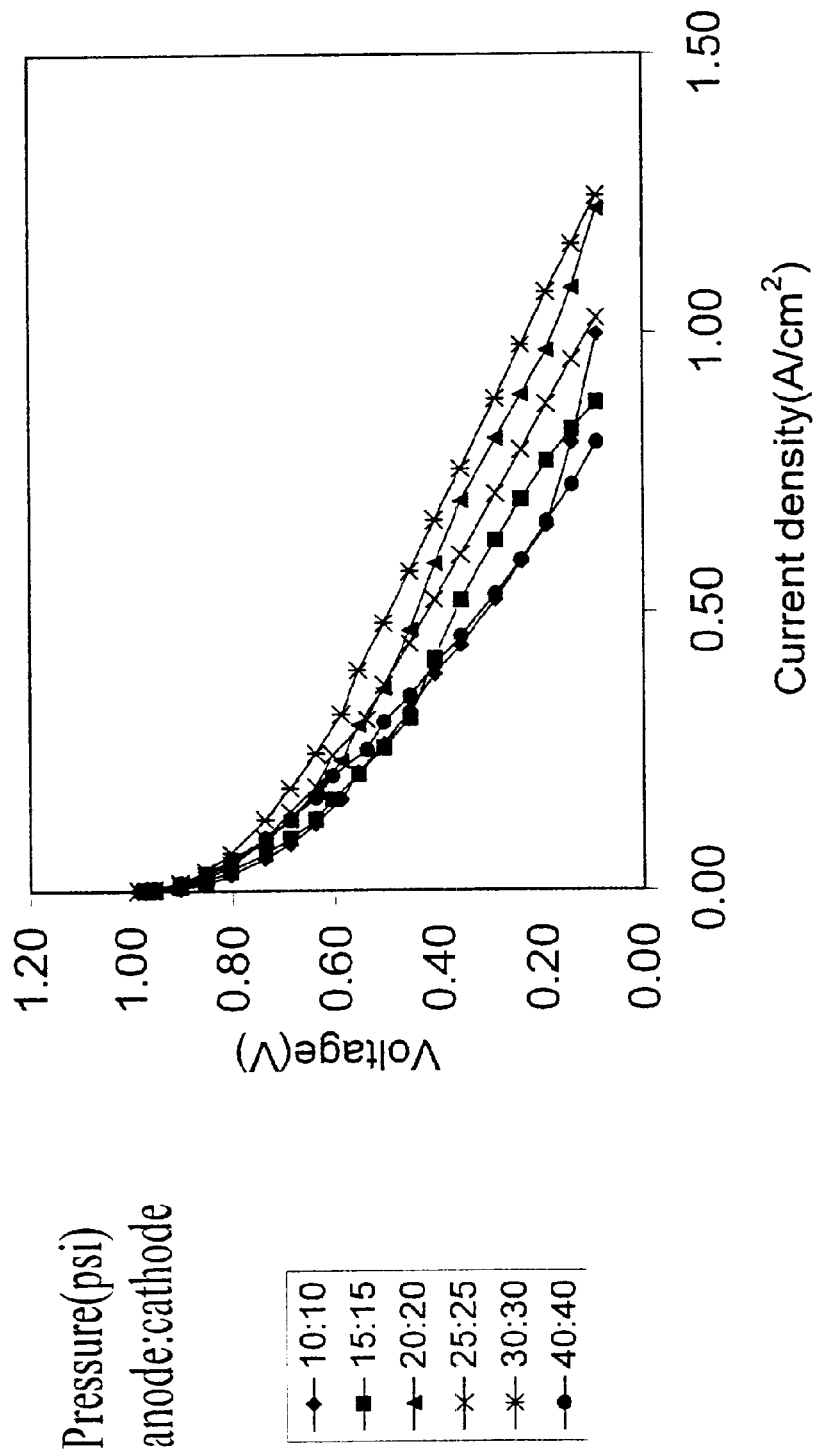
FIG. 46 is a plot of voltage versus current density for an initial output of the platinum electrode at a cell temperature of 70° C.

FIGS. 45 and 46 show the best performance for the magnetic and nonmagnetic fuel cells. The experimental conditions are similar when the nonmagnetic fuel cell is at a pressure ratio of 10:10. The performance results are similar when the nonmagnetic fuel cell is at a pressure ratio of 30:30.

Oxygen Concentrators

Another possible application of magnetically modified electrodes or cathodes involving flux enhancement of oxygen relates to the problem of concentrating oxygen from atmospheric air. An embodiment of the present invention involves separating oxygen from nitrogen. That problem may be solved using the magnetically modified electrode or cathode technique, or other separation techniques. The separation of oxygen from air currently requires cryogenic or high pressure diffusion systems, which are costly. In a magnetic membrane system where the membrane is placed between ambient air (about 20% oxygen) and an inner vat, and the oxygen is immediately swept from the inner vat, a concentration gradient of oxygen is established across the membrane. Consequently, oxygen is preferentially drawn into the inner volume from the ambient air.

Separating Metals

Separations can be achieved by various methods, based on factors such as charge, mobilities and complex formation with chelating agents. Although traditional methods for separating metals and metal ions focus on selective plating or chromatography, those methods have not shown success with heavy transition metals. Plating methods do not provide effective separation because the reduction potentials of the heavy transition metals are within 200 millivolts of each other.

For heavier transition metals, charge-based chromatographic separations do not work, because the heavy transition metals have similar charge and reduction potentials, and will therefore have similar charges after reduction. As a result, a kinetic process for separation is necessary where the similar redox potentials prevent selective reduction or oxidation of a selected species.

Since the similar size of ions among some of the heavy transition metals results in similar mobilities, species cannot be well-separated by mobility. Nonchromatographic separation methods involving chelation are also difficult. For example, because the f shell electrons are shielded by the s- and p-electrons of the next principal shell, the binding constants of the ions of either series with various chelating agents are very similar, and the resulting species are not well-separated by chelation. Therefore, another separation technique for those series, such as magnetic separation with electron transfer, is required.

Magnetic Separations of Metals

Consider a solution of two metals $M^n$ and $N^n$ with the same charge n, and similar reduction potentials, where both metals are in a first phase $\alpha$ in a separator with magnets and a porous electrode, such that a second phase $\beta$ on a remote side can collect product. If $M^n$ has a higher magnetic susceptibility than $N^n$, it will be electrolyzed more effectively at the electrode, and its concentration can be selectively enhanced in the second phase $\beta$. Alternatively, electrons can be fed at the separator-second phase $\beta$ interface by solution mediation, with a redox mediator in the second phase $\beta$, or photo or thermal processes at the interface, or a combination thereof.

If the separation yields a mixture of lighter and heavier transition metals from the main part of the periodic table, a change in oxidation state, achieved by either adding an oxidant or reductant, or by electrolysis at an electrode, will change the charges (and number of electrons in the d- (for main transition metals) and f-shells (for heavier transition metals)) on the metal ions or their complexes, and the number of unpaired electrons in the heavier and main transition metals. Because the main transition metals have only 10 d-shell electrons while the heavier transition metals have 14 f-shell electrons, those ions, metals and complexes possessing at least a few electrons in either the d- or f-shells are likely to have different numbers of unpaired electrons when electrons are added or removed. That effect allows the main transition metals to be separated from the heavier transition metals.

Separation Process

Magnetic effects on homogeneous electron transfer depend on high concentrations of the reactant species to occur with facility. However, homogeneous electron transfer can occur with a low concentration of reactant where the electron is carried by such a fast moving mediator that a high concentration of reactant is not required. For magnetically enhanced heterogeneous electron transfers, a high concentration of reactants is not required to observe enhanced rates. Further, one can discriminate between heterogeneous and homogeneous electron transfer by dropping the concentration of the reactants, thus reducing or eliminating the homogeneous electron transfer process.

Figure 47:
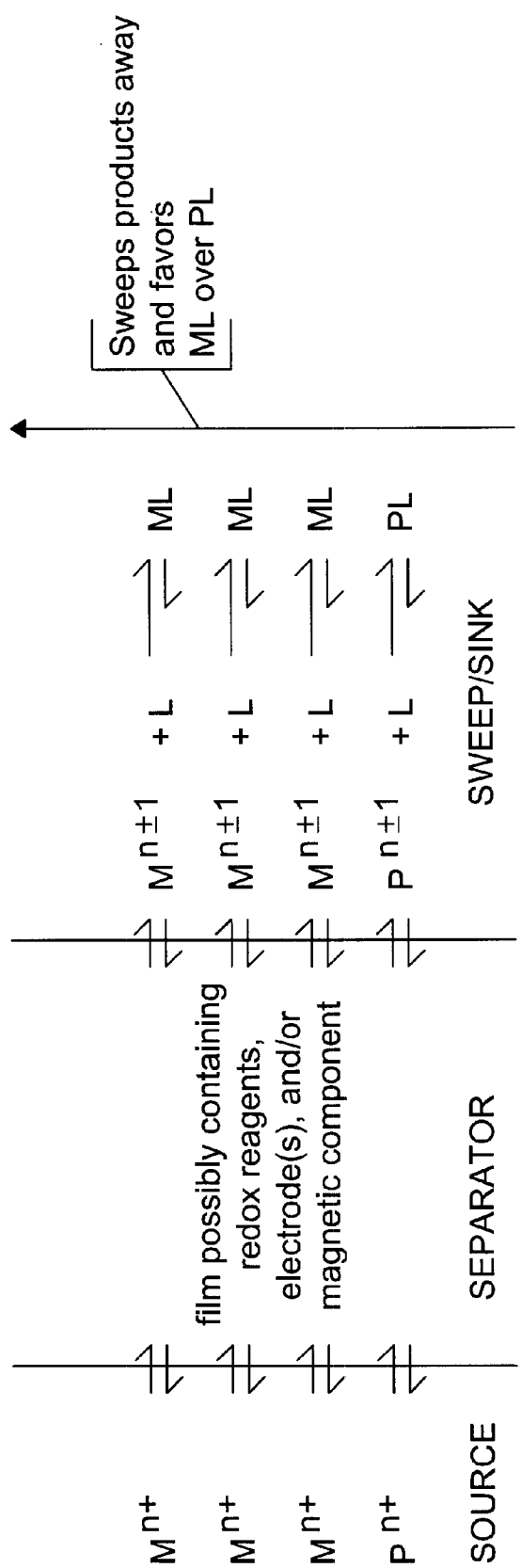
FIG. 47 is a schematic illustrating a separation process using a separator film containing redox reagent or an electrode as a sweep/sink system.

The separation of various species with similar standard potentials and chelation chemistry is accomplished by favoring the electrolysis of one species over another to change its charge state and selectively bind that species with an appropriate ligand, as shown in FIG. 47.

For example, consider two similar metal ions having the same charge, $M^{n+}$ and $P^{n+}$, both present in a phase. $M^{n+}$ and $P^{n+}$ can be electrolyzed at the same standard potential (E°) to form products $M^{n\pm1}$ and $P^{n\pm1}$. The "$\pm$" depends on whether the reaction is an oxidation (+) or a reduction (−). More than one electron may be transferred, such that $\pm 2$, $\pm 3$ ..., etc. may result. Most metal ions will bind to ligands L, and the strength of the binding constant, K, varies with the charge. Thus, a ligand L might bond with one of the product metal ions $M^{n\pm1}$, $P^{n\pm1}$ $M^{n\pm1}$ more strongly than the reactant metal ions $M^{n+}$, $P^{n+}$, as follows:

 (33)

 (34)

where y and w are coefficients representing the number of molecules of the ligand L in each reaction.

Partial bindings of $ML_{y-1}$, $ML_1$, $ML_2$ ... may also occur. The charge on those species varies with the number of ligands and the charge on $L^{\pm z}$. The binding constants $K_n$ and $K_{n\pm1}$ depend on metal:ligand charge and the size of the metal for a given oxidation state.

For $M^{n+}$ and $P^{n+}$, the binding constant $K_n$ is very similar. Accordingly, for $M^{n\pm1}$ and $P^{n\pm1}$, $K_{n\pm1}$ is similar. However, ligand can be designed such that the binding constants $K_n$ and $K_{n\pm1}$ are different by many orders of magnitude.

The ligand L is placed in the product side of the separation cell, and collects the electrolysis product of one species preferentially over the other, and the magnetic fields also favor the electrolysis of one metal over the other.

Where the separator is permeable to $M^n$, $P^n$, $M^{n\pm1}$, and $P^{n\pm1}$ such that redox reagents are fed in to electrolyze $M^{n+}$ and $P^{n+}$, a magnetic surface is required, and that magnetic surface may include a redox reagent on magnetic beads that are recycled and electrolyzed.

Where the separator is a magnetic, carbon black, catalyst composite such that an external power source drives electrolysis of $M^{n+}$ and $P^{n+}$, only an IEP with carbon black or carbon black and platinum catalyst may be necessary. A metal mesh or porous matrix coated with an IEP and magnets is used, such that potential applied to the layer drives electrolysis.

A sweep/sink shown in FIG. 47 provides that ligands may be present on magnetic particles, or in a separator/electrode domain with preferential concentration of the ligated species in the sweep/sink. Species in the source may have ligands that are wholly or partially lost on electrolysis and they may partition metal into sweep/sink. Additionally, charge can be used to favor partitioning. For example, electrolysis of $M^{n+}$ followed by ligation forms a negatively-charged species which is then partitioned into a sweep/sink of an ion exchange polymer.

Since undesired facile homogeneous electron transfer may be possible between $M^{n\pm1}$ and $P^{n+}$, it may be necessary to favor heterogeneous electron transfer alone by maintaining a low reactant concentration in the separator/electrode phase.

A preferred embodiment of the present invention also includes a method for achieving separations. Species are separated because they have different degrees of interaction with some external agent or force, such as magnetic composites and magnetic fields. If one interaction enhances, but does not achieve complete separation, the process can be repeated to improve separation efficiency, for example, by setting up a sequence of separation vats and magnetic composite separators. If separation has been partially successful after several iterations but several species are still mixed, another separation process can be performed on the refined mixture. For example, a chelation process can bind either the light or heavy transition metals, e.g., to selectively precipitate one set or the other. On the other hand, a plating process may be used, or a change in oxidation states followed by another separation step, based on magnetic or other properties.

For the present invention, the principles described herein may be applied in conjunction with the use of magnetic composites to separate heavy transition metals from other metal ions, and to separate heavy transition metals into small groups. The behavior and formation of magnetic composites has been outlined above.

Based on the previously demonstrated behavior of the above-referenced composites with the lighter transition metal complexes, the heavy transition metal ions or complexes, formed by chelation with organic or inorganic ligands, can be separated. Electrons, ions, metals, or metal complexes (charged and uncharged) can be separated, although ions and organometallic complexes predominate.

Figure 48:
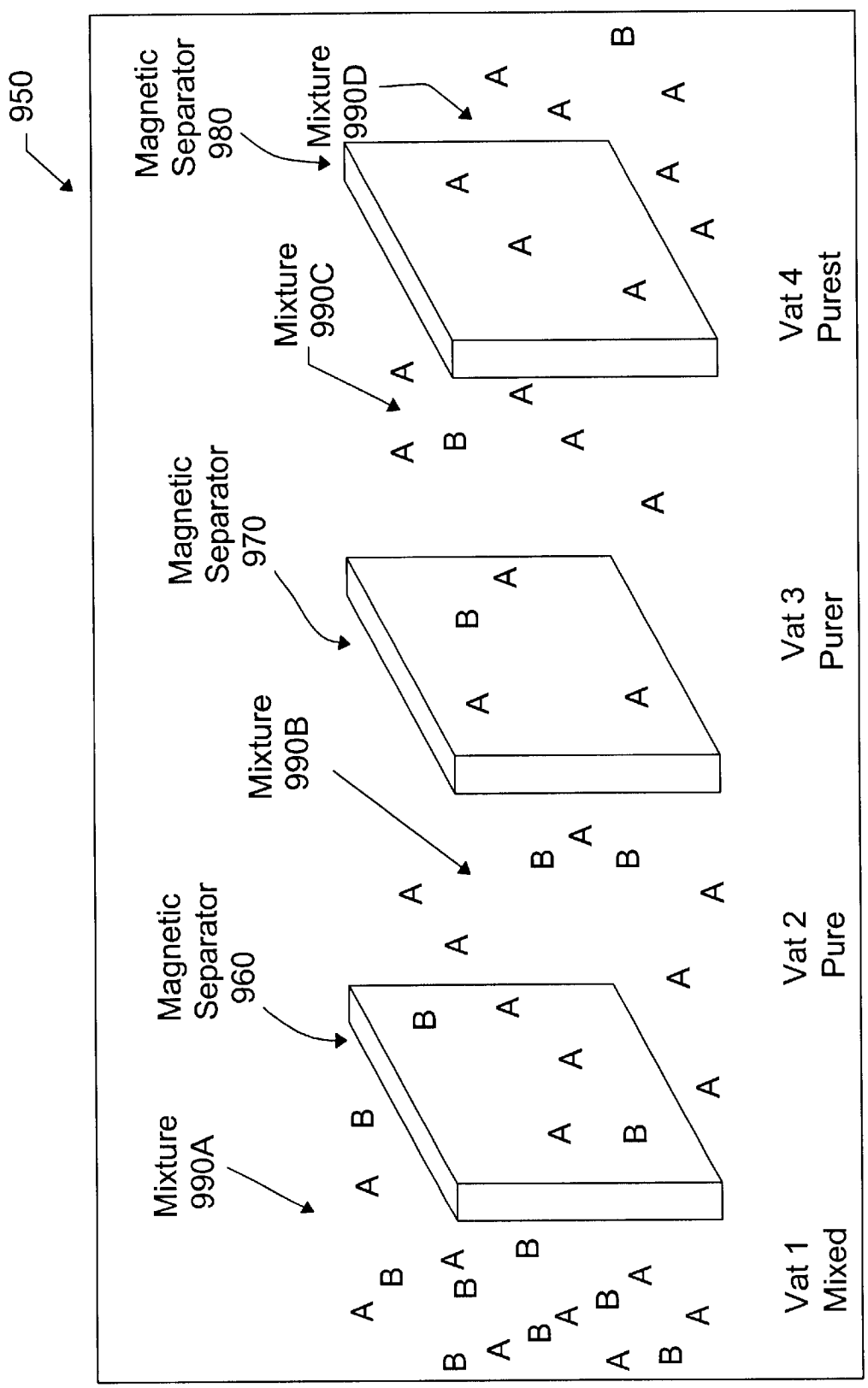
FIG. 48 shows a series of vats separated by magnetic separators used to separate mixtures to increase constituent purity, according to the present invention.

Single and multistep separations are possible electrochemically. A multistep process uses several chambers or vats set up in sequence, as illustrated in FIG. 48, so that the most mobile species are concentrated in the last vat 4. Here, the magnetic separator 960, 970, 980 can be a magnetically modified porous electrode that allows a flow through the electrode. In one embodiment of the present invention, shown in FIG. 48, the separator allows species A to pass through the separator with twice the efficiency of species B. After three separation steps, the concentration of species A is enhanced 8:1 ($[2/1]^3:1$) compared to species B, where species A and B were initially at equal concentrations. The efficiencies of the magnetic separators depends on the magnetic properties of the species being separated. The initial relative concentrations of the species in the initial mixture, like species A and B, also plays a role in determining efficiency.

Ligands can be added before or after the magnetic separation. Ligands added before separation may change selectivity through a separation membrane, probably for reasons other than magnetic properties. For example, if binding favors lighter transition metal species that can be bound to form negatively charged lighter transition metal complexes, those complexes would be excluded from the composites if a positively charged ion exchange polymer, or an equivalent positively charged material, were used to bind the composite.

FIG. 48 illustrates the magnetic separation of heavy transition metals. A system 950 contains a series of vats 1, 2, 3, 4, although any number of vats is possible. The vats 1, 2, 3, 4 are separated by magnetic separators 960, 970, 980, with a magnetic separator 960 between vat 1 and vat 2, a magnetic separator 970 between vat 2 and vat 3, and a magnetic separator 980 between vat 3 and vat 4. The magnetic separators 960, 970, 980 may be of the same or different types. Any one of the magnetic separators 960, 970, 980 may be a membrane, a porous electrode, or a magnetically modified electrode. A combination of a porous electrode or a magnetically modified electrode with other types of magnetic separators may also be possible.

Species A and B are initially in a mixture 990A in vat 1, in equal or unequal concentrations. Species A is separated from species B using the selectivity of the combination of the vats 1–4 and the magnetic separators 960, 970, 980. The properties of magnetic separators 960, 970, 980 permit species A to preferentially and selectively pass through. Over time or by virtue of selectivity, the concentration of species A increases in vat 4 as the separation proceeds from vat 1, having mixture 990A therein, to vat 2, having mixture 990B therein, to vat 3, having mixture 990C therein, and finally to vat 4, having mixture 990D therein. The mixtures 990A, 990B, 990C, and 990D of species A and B become purer in species A as the separation proceeds from vat 1 to vat 4, with vat 4 having the purest mixture 990D of species A and B.

Mixture 990D in vat 4 may contain species A alone (possibly with impurities), and the converse may occur in mixture 990A in vat 1, as species B is left behind by species A. Species B in mixture 990A in vat 1 may be formed by preferential transport of species B from any and all of vats 2–4 toward vat 1. For example, both mixture 990A in vat 1 and mixture 990D in vat 4 may include species A and B initially in some initial concentration. Due to the properties of magnetic separators 960, 970, and 980 over time, the concentration of species A increases in mixture 990D in vat 4, while the concentration of species B increases in mixture 990A in vat 1.

Figure 49:
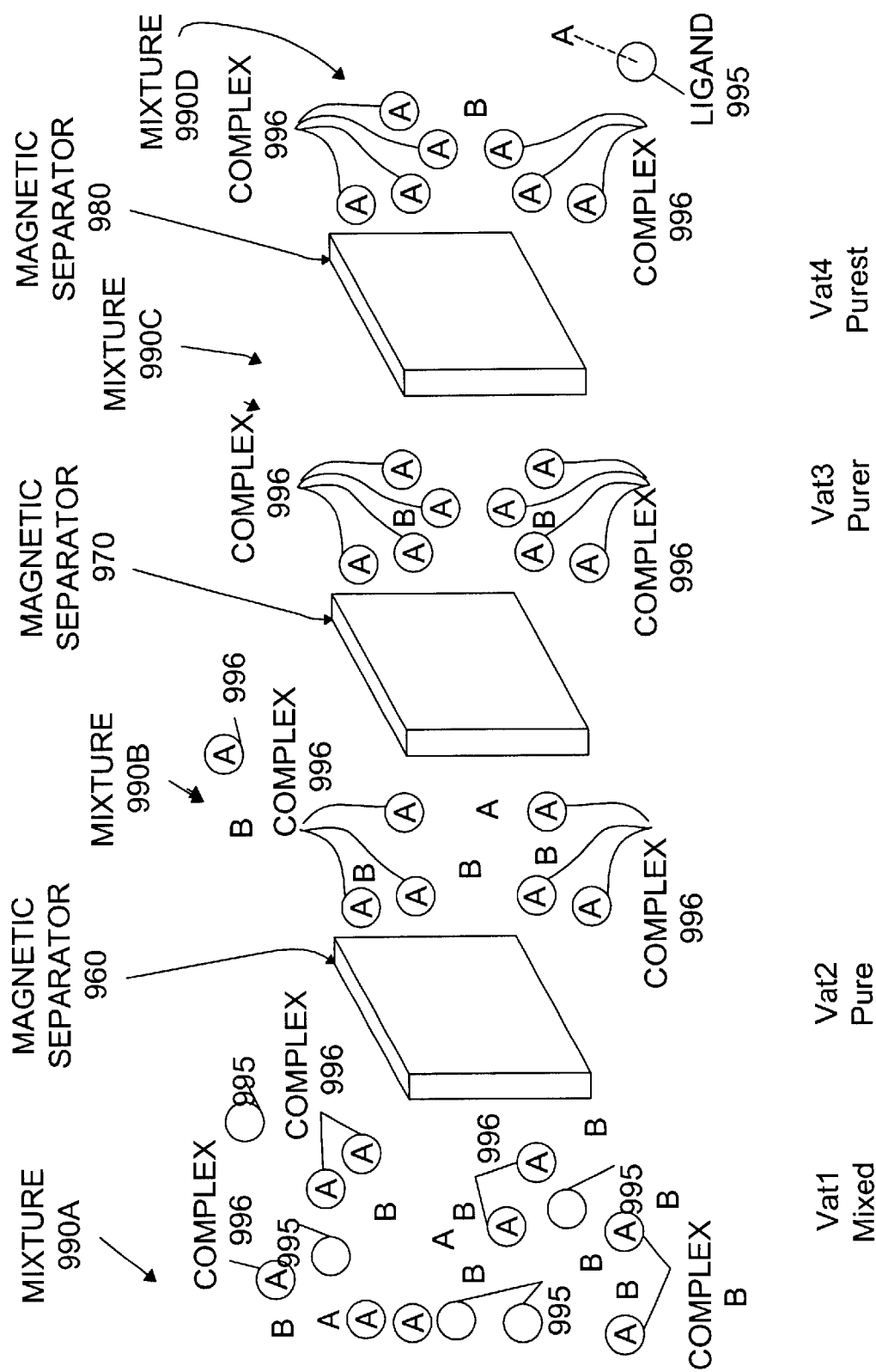
FIG. 49 shows a series of vats separated by magnetic separators used to separate mixtures to increase constituent purity similar to FIG. 48, but which uses a ligand to form complexes that aid in the separation, according to the present invention.
Figure 50:
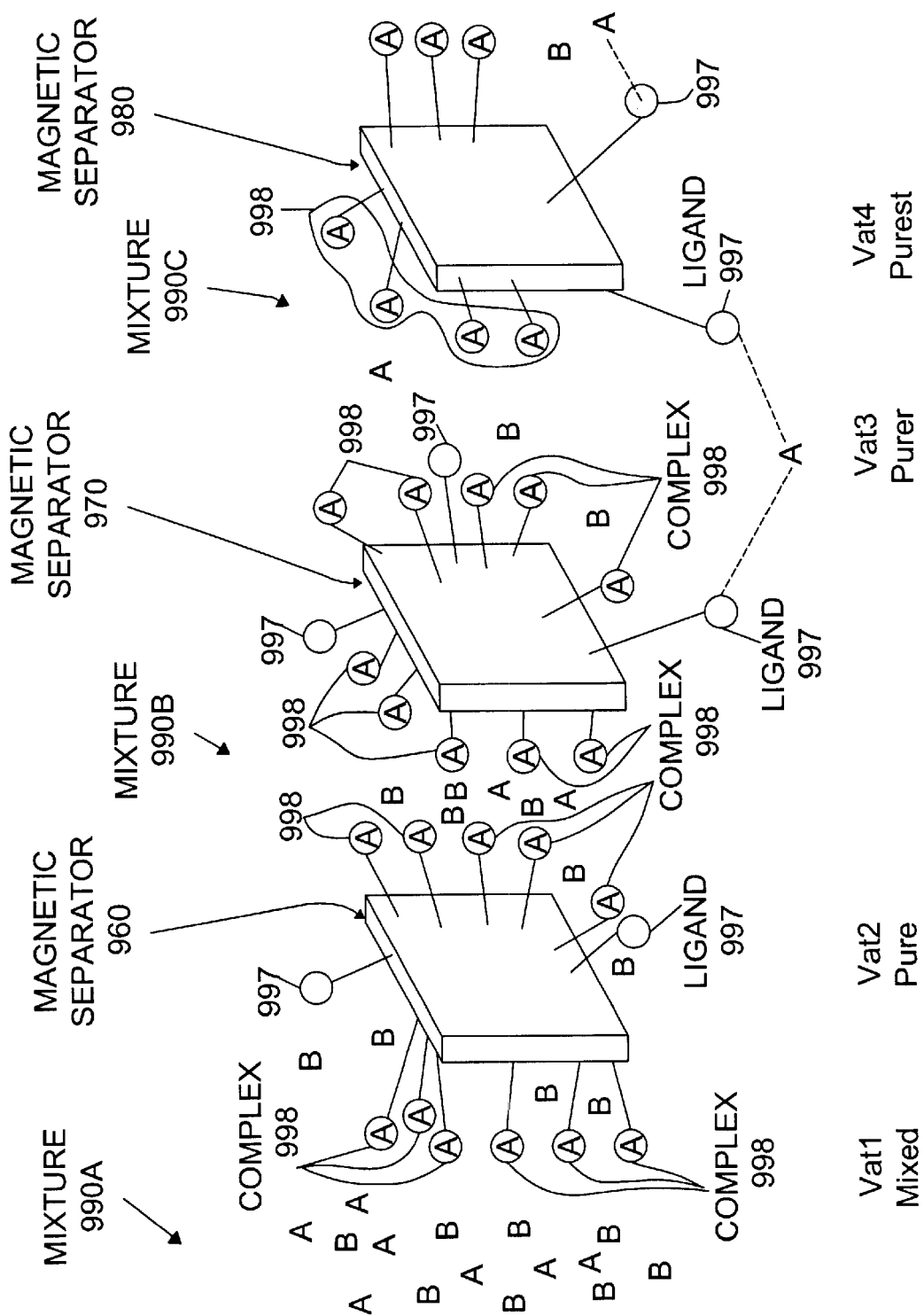
FIG. 50 shows a series of vats separated by magnetic separators used to separate mixtures to increase constituent purity, similar to FIG. 48, but which uses a ligand associated with the magnetic separators to form complexes that aid in the separation, according to the present invention.
Figure 51:
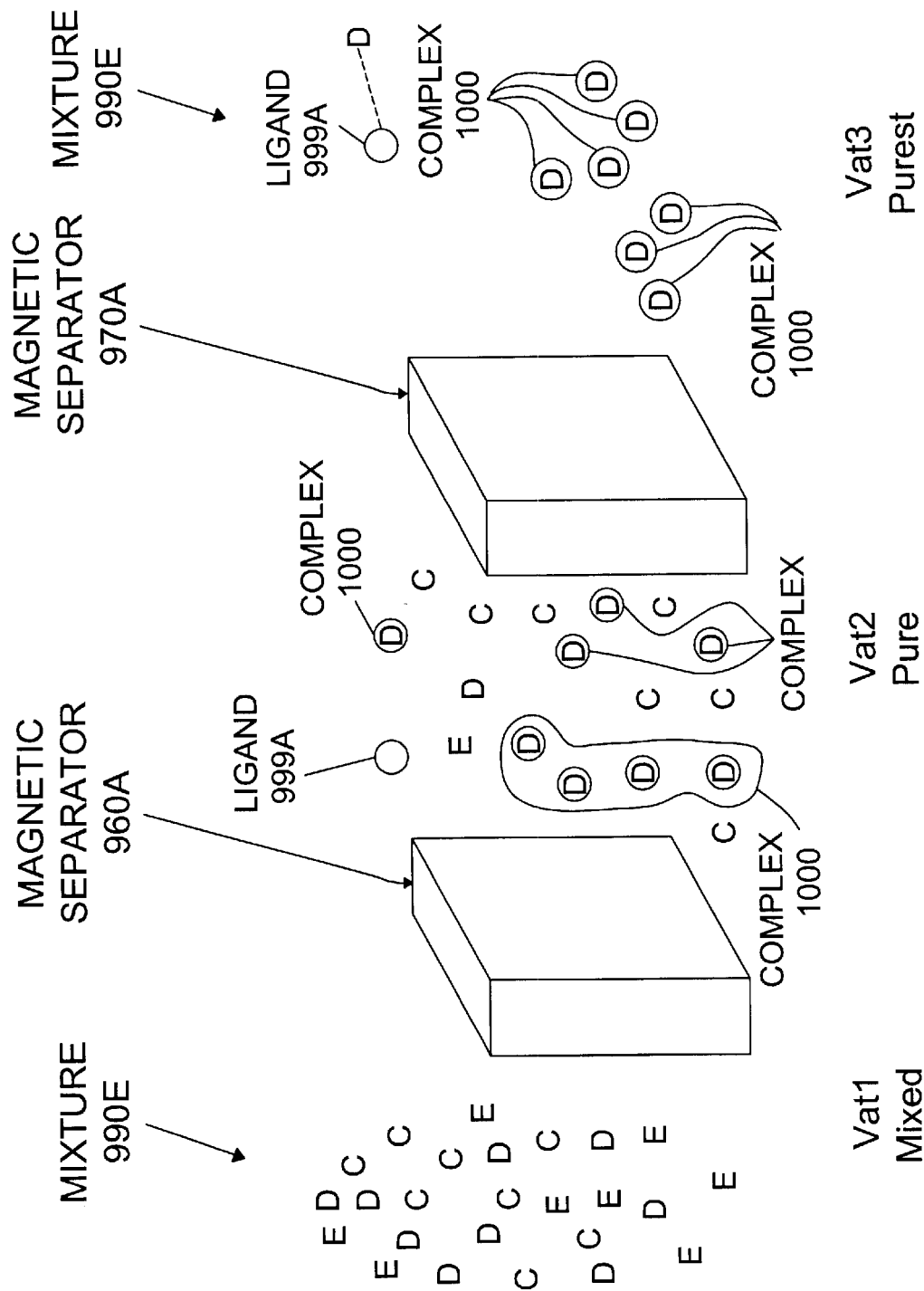
FIG. 51 shows a series of vats separated by magnetic separators used to separate mixtures that combines separation similar to FIG. 48 with separation using a ligand to form complexes that aid in the separation, according to the present invention.

FIGS. 49, 50 and 51 illustrate possible uses of ligands to aid in the selectivity of a separation. Ligands 995 form complexes with and prevent species B from being transported from vat 1 having mixture 990A to vat 4 having mixture 990D, while allowing the transport of species A.

FIG. 50 shows an alternative embodiment of the present invention. Ligands 997 are associated with the magnetic separators 960, 970, 980 to form complexes 998 with either of species A or B such that only one of those species or particles is transported from vat 1 to vat 4. FIG. 50 illustrates complexes 998 formed with species A to allow transport of species A through the magnetic separators 960, 970, 980. Any of the magnetic separators 960, 970, 980 may instead have associated ligands 997 form complexes 998 with species B to prevent the passage of species B and allow the passage of species A.

FIG. 51 shows another embodiment of the present invention, wherein lighter transition metals C and heavy transition metals D are separated from a mixture 990E in a vat 1 that includes other species E. This separation through a magnetic separator 960A that leaves mixture 990F in vat 2. After the first separation, heavy transition metals D are separated from lighter transition metals C with ligands 999A forming complexes 1000 with either lighter transition metals C or heavy transition metals D. FIG. 51 shows complexes 1000 with heavy transition metals D, which pass through magnetic separator 970A more easily than the lighter transition metals D. This separation leaves mixture 990G in vat 3. In FIG. 51, magnetic separators 960A and 970A are shown separating vat 1 from vat 2, and vat 2 from vat 3, respectively.

Modified Ion Exchangers

The surface of the magnetic microbeads include ion exchange groups that can allow ready chemical modification, e.g., coating with a magnetically oriented liquid crystal for a local flux switch. Embodiments of such modified structures can be used to build microstructured devices and machines.

Membrane Sensors

Membrane sensors for the paramagnetic gases $O_2$, $NO_2$, and NO, recently identified as a neurotransmitter, can be based on magnetic composites where enhanced flux would reduce response times and amplify signals. Sensors for other analytes, where oxygen is an interferant, can distinguish between species by using dual sensors, where the sensors are identical, except that one sensor incorporates a magnetic field. Examples include optical, gravimetric, or electrochemical sensors, including amperometric and voltammetric. In those sensors, the measured signal is proportional to the total concentration of all species present and responsive to the sensor. A magnetic component in the sensor enhances its sensitivity to paramagnetic species. Through a linear combination of the signal from two sensors, similar in all respects except that one contains a magnetic component, and known sensitivity of the magnetic sensor to paramagnetic species (determined by calibration), one can determine the concentration of the paramagnetic species. If the sensors are only sensitive to one paramagnetic and one diamagnetic species, one can determine the concentration of both species.

Flux Switches

As nanostructured and microstructured materials and machines develop into a technology centered on dynamics in micro-environments, flux switches will be needed. Externally applied magnetic fields can actuate flux switches using electrodes coated with composites made of paramagnetic polymers and iron oxide, iron particles or other non-permanent magnetic material. However, internal magnetic fields can also actuate flux switches, using electrodes coated with composites made of electro-active polymers or liquid crystals where one redox form is diamagnetic and the other is paramagnetic. Organo-Fe or other superparamagnetic or ferrofluid materials, or permanent magnetic or aligned surface magnetic field material, can be used. Also, an external magnet can orient paramagnetic polymers and liquid crystals in a composite containing paramagnetic magnetic beads. Enhanced orientation may be possible with magnetic beads containing superparamagnetic or ferrofluid materials.

Flux switches may be used for delivering drugs, biomaterials or medical dosing into a living organism, where an external or internal magnetic field may transit a flux switch to enable said delivery. Flux switches may also be used in imaging applications.

Batteries

Batteries with increased current densities and power, as well as decreased charge and discharge times, can be made with magnetic bead composites. Flux enhancement, transport enhancement, electron kinetic effects, or capitalizing on a potential shift can drive those enhancements. The required mass of microbeads would minimally affect specific power.

Dendrites are conducting deposits that accumulate between the two electrodes in the battery during cycling, eventually shorting out the cell. Suppression of dendrite formation, which is the main failure mechanism for rechargeable batteries, may be important in plating dense films of heavy transition metals. Tests show that an externally applied magnetic field can suppress dendrite formation.

Therefore, an improved battery may include magnetically modified or coated electrodes. The magnetic coatings may be located on the electrodes, or elsewhere in the battery structure. As discussed above, a magnetic field can be established directly at the electrode surface by modifying the electrode surface with a composite of ion exchanger and magnetic particles, thus eliminating the need for a large external electromagnet to provide the necessary magnetic field, although in certain circumstances an externally applied magnetic field may be desirable or useful. Modifying the electrode produces a negligible increase in cell weight of less than about one percent. Also, the flux of ions and molecules through those composites is enhanced substantially, compared to the flux through the separator alone.

Using magnetic composites in rechargeable battery systems can result in three potential and significant improvements in battery performance. First, cycle life is enhanced due to suppression of dendrite formation by the magnetic field at the electrode surface. Second, recharge time is decreased and recharge rate increased by about ten-fold due to the flux enhancements. Third, transient power output will increase by up to about ten-fold, and the discharge of power will be more rapid due to the flux enhancements.

Additionally, the charging time decreases and the transient power increases to the extent that the motion of ions and molecules in the battery cell limits performance. An enhancement of at least ten-fold in ion and molecule motion has already been demonstrated in the magnetic composites.

In a protracted use situation, the battery cycle life is important. Cycle life can be enhanced by establishing a magnetic field at the electrode surface, resulting in a few-fold improvement in cycle life. The technological advantages include a negligible increase in size and weight of less than about one percent of approximately 5–6 lbs, the simplicity of modification, compatibility with existing battery technology, and an insignificant cost of materials to change current battery technology, about a few cents per battery.

The electrode modification can be used in a wide variety of battery types, including zinc and copper batteries, where an externally applied magnetic field has demonstrated suppression of zinc and copper deposit dendrite formation. First, an electrode must be modified with a magnetic composite. Then, dendrite formation suppression is tested with the electrode in solution. Such tests provide a ready method for examining the feasibility of magnetic composites in a wide variety of battery systems.

The magnetic composites are then tested in a two electrode battery system. The fraction of necessary magnetic particles is optimized, and the depth of the separator containing the magnetic particles is determined. An evaluation of cycle life, charging time, discharging time, power transients, weight change, size change, and cost is then conducted for comparison with a system containing no magnetic particles. Once a battery cell is constructed using magnetically modified electrodes that show improvements in cycle life, charging time, and power transients, the long term stability of the cell can be evaluated.

The process described above can create a low-weight battery that is more efficient and longer lasting than conventional batteries with unmodified electrodes. Those advantages, coupled with a greatly increased power output, may allow the operation of an apparatus requiring battery power for extended periods of time. Also, more equipment may be operated with the battery of the present embodiment at one time than with a conventional battery.

Other Applications

In addition to the above-described embodiments of the present invention, several other potential applications exist. Examples include electrodeless plating, solution phase redox reactions, and reactions at boundaries such as micelles and biological organelles.

The present invention can be applied to photo-driven reactions, which convert the energy of a photon into an available electron. In semiconductors, photons excite an electron to a higher energy state in the conduction band, where they dissipate system energy by passing the electron to a solution redox species. Semiconductors are used in photocells, solar cells and electrochemical synthesis systems. Electrons can also be generated photothermally and thermally.

Other examples of electrochemical applications include: (1) solution self exchange reactions, where a mediator is bound to a magnetic bead and dropped into a solution containing substrate; and (2) aluminum refining, where magnetic fields are currently used in macroscopic and uniform format. Photochemical applications include solar cells and various electrochemical cells, where photons generate useful products.

Biological applications for the present invention include pharmaceutical and biomedical uses. For example, oxygen uptake by hemoglobin may be increased by the presence of a magnetic field, and replacement reactions involving metals other than iron may be quenched in the presence of a magnetic field.

Since carbon monoxide is diamagnetic and oxygen is paramagnetic, the rate of carbon monoxide uptake in hemoglobin may be decreased in the presence of a magnetic field. Alternatively, carbon monoxide may be replaced by oxygen in the presence of a magnetic field. Applications associated with genetic engineering may include allowing fluorescence labeled-DNA to give information about its nearest neighbors in an applied magnetic field through intensity changes due to spin diffusion through the DNA.

An isolated metal center in an organic matrix can have a local field about that metal of 1 Tesla. Without special polarization effects, the field decays over about 1 Å. In proteins and enzymes, natural processes spend significant amounts of energy to (1) position a metal center in proteins and enzymes and (2) allow polarization effects, where the field can decay over several Å's. Conventional models describe reaction rates which are enzyme-or protein-specific.

The present research suggests that the magnetic field about the metal center has a significant impact on the electron transfer rates. Possible applications for the present invention include drugs with enhanced reactivity, enzymes modified by replacing the metal center, increasing the local field about an enzyme with an external magnet or introducing magnetic particles, using hemoglobin with magnetic particles with a pump for respiratory facilitation, and detoxification systems centered on synthetic or modified enzymes to clean up toxins.

Several other health-related applications may also be associated with the present invention, such as allowing for the development of a more scientific form of magnet therapy. Drug delivery can be made faster, more efficient and more precise, e.g., to the specific area of the body where the drug needs to work, by applying an external magnetic field to that area. That application would be useful in pain therapy, surgical applications, and cancer treatment. Further, it may be possible to make a magnetic switch for a drug that: (1) magnetically determines the differences between which specific cells need the drug; (2) increases the rate of neurotransmitter reaction by applying magnetic fields; (3) increases the rate of alcohol dehydrogenase reaction in drunk patients in the presence of an external magnetic field; or (4) increases or decreases the rate of cancer cell growth, photosynthesis, nerve excitation, blood coagulation, sense of smell or thyroid function.

Magnetic fields can effect electro-insertion of DNA or DNA fragments and electroporation. A microelectrode sensor array may also be inserted/positioned through the hair follicle pores in the skin. External magnetic fields or magnetic electrodes will increase detection limits and sensitivity to trace electroactive biomolecules in the blood stream.

In the electronics field, flux in molecular wires can be increased in the presence of a magnetic field, because molecular wires behave as quantum mechanical electron transfer steps that depend on a magnetic fields. Also, flux can be increased by making molecular wires where spin diffusion is prevalent in which case an external magnetic field may be unnecessary. Further, molecular wires may be used as molecular switches in the presence of a tailored magnetic field or tailored paramagnetic/diamagnetic matrix.

For semiconductors, the present invention may increase the superexchange rate in semiconductors in the presence of magnetic fields and increase conduction between bands (i.e., p and n) in a semiconductor. With electrodes, magnetic fields may affect electrode passivation so that cheaper, less expensive electrode options such as silver, copper, iron, and nickel may become effective choices.

The rusting of iron may be decreased in the presence of a magnetic field by mere intersystem crossover by about 5%. An iron mixture with Sn, Pb, Rn, or any diamagnetic heavy transition metal would further decrease rusting, because the favorable cross-relaxation pathway would no longer be favorable. Magnetic composites also shift potentials, and it may be possible to decrease corrosion by shifting potential in the direction of passivation.

The present invention may also be used to: (1) add magnets to a photocatalyst layer to increase the efficiency of catalyst, and thereby increase the efficiency of splitting; (2) place magnetic beads in PTFE of a Clark Electrode to increase detection limits of oxygen by the Clark Electrode; (3) use a magnetic electrode or magnetic beads in an enzyme membrane to increase sensitivity and detection limits of enzyme-selective electrode; or (4) make a lower detection limit, higher selectivity electrochemical HPLC detector due to modification by a magnetic field.

Magnetic fields can increase electrolysis yields and allow for magnetic separations within an electrolysis cell. Magnets could easily be placed in porous electrodes, or used to produce packed-bed electrodes, because magnets can be small (i.e., pore size) and coated with conducting metal to serve as the conducting particle in packed-bed electrode.

As discussed above, the present invention may be applied to fuel cells, and several fuels may be used. A uric acid fuel cell may be feasible, as magnetic field effects may decrease passivation or change intermediates to prevent passivation. Further, glucose, sucrose, fructose, cellulose, and ascorbic acid have been analyzed for fuel cell applications; but, because their current density and resulting kinetics are poor, magnetic fields may be used to improve their kinetics.

Additional effects of the present invention upon fuel cells include: (1) decreased carbon monoxide passivation at noble metals, which may be achieved by adding paramagnetic heavy transition metal impurities to the noble metal catalyst as polarization sources for Pt—CO bond-breaking in the presence of an external magnetic field, or by using large enough heavy transition metals to create have a reasonable magnetic fields; and (2) increased power output to a fuel cell by applying magnetic microparticles to the hydrogen side of a hydrogen/oxygen fuel cell to increase kinetics of hydrogen oxidation.

Further, several other applications exist for the present invention. For example, $SO_2$/catalyst reactions in power plant scrubbers can become more efficient and less temperature-dependent by adding an external magnetic field, because they undergo electron transfer reactions, and the catalysts are paramagnetic metal complexes with high g-values. Also, carbon monoxide scrubbing in gas masks with $I_2O_5$ can be made more efficient in the presence of magnetic fields.

Product distribution can be changed in electro-organic synthesis or other electron transfer reactions by applying a magnetic field and/or a "magnetic catalyst/matrix", such as Monsanto's acrylonitrile dimerization process with free radical intermediates and anthraquinone synthesis. Polymer composite modified electrodes in the presence of a varying magnetic field may allow one to determine EPR g factors (and/or $\Delta g$'s) electrochemically, by plotting the flux versus the square root of the magnetic field, for cyclic voltammetry. Also, composites of conductive polymers and magnetic microspheres may greatly increase conductivity and electron transfer at the surfaces. Further, if magnetic fields effect catalyst passivation, then magnetic fields in a catalytic converter could increase kinetics and thereby increase gas mileage and reduce pollution.

For SECM and ECL, magnetic electrodes and fields could give better detection limits, and intensity may give information about electrode and solvent.

The present invention could allow for better electrochemical selectivity by applying a field to magnetically enhance only one analyte in matrix, but greatly increase the sensitivity and detection limits of the magnetically enhanced analyte. For chlo-alkali reactions, magnetic fields can improve the purity and efficiency of reactions by enhancing the desired reactions at a metal complex catalyst and hindering the undesired reactions by applying a magnetic field and a heavy transition metal magnetic matrix.

Magnetic fields could also increase the rate and efficiency of water electrolysis and electroflocculation. Magnetic fields may allow high temperature reactions to occur at a low temperature, because magnetic effects are quite large at low temperatures. The fields may also decrease the need to de-gas a system, because oxygen loses its quenching power in the presence of magnetic fields and heavy transition metal magnetic matrices.

Since film speed depends on the electron transfer kinetics of photography reactions, the kinetics can be enhanced in the presence of magnetic fields, and faster film speeds can thus be obtained. That improvement can be useful for providing better resolution in medical imaging.

Numerous and additional modifications, improvements, and variations of the present invention are possible in light of the above teachings. It is therefore to be understood that the invention may be practiced otherwise than as specifically disclosed, and that the scope of the invention is defined by the appended claims rather than by the embodiments presented above.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A magnetic fuel cell with enhanced function due to effecting at least one otherwise quantum mechanically spin forbidden or kinetically disfavored chemical reaction, comprising:
   an electrode system, comprising
     a cathode having a cathode surface,
     an anode having an anode surface,
     a microstructured magnetic composite material disposed on at least one of said anode surface and said cathode surface, and
     a separator disposed between the anode and the cathode,
   wherein
   when
     an oxidant is reduced at the cathode, and
     a fuel is oxidized at the anode,
   then
     a first electrical current flows between the cathode and the anode, wherein the first electrical current has a magnitude which is greater than a second electrical current produced by a conventional nonmagnetic fuel cell.

2. The magnetic fuel cell with enhanced function due to effecting at least one otherwise quantum mechanically spin forbidden or kinetically disfavored chemical reaction according to claim 1, wherein the microstructured magnetic composite material further comprises:
   a first material having a first magnetism; and
   a second material having a second magnetism,
   wherein the microstructured magnetic composite material further comprises:
     an arrangement of said first and second materials; and
     a plurality of boundaries between said first and second materials, wherein each boundary
       is adapted to provide a plurality of paths through the microstructured magnetic composite material, and
       has at least one said magnetic field within at least one of said plurality of paths.

3. The magnetic fuel cell with enhanced function due to effecting at least one otherwise quantum mechanically spin forbidden or kinetically disfavored chemical reaction according to claim 2, wherein the microstructured magnetic composite material comprises magnetic microparticles as the first material, and platinized carbon particles as the second material.

4. The magnetic fuel cell with enhanced function due to effecting at least one otherwise quantum mechanically spin forbidden or kinetically disfavored chemical reaction according to claim 1, further comprising:
first and second chemicals; and
an interfacial boundary located at each anode surface and each cathode surface,
wherein
each molecule of the first chemical has at least one electron having a plurality of quantum mechanically allowed spin states,
each molecule of the second chemical has a nucleus susceptible to electron-nuclear spin polarization, and
when
said magnetic field source is actuated to produce said magnetic field, and
molecules of said first and second chemicals are located at or close to said interfacial boundary and within said magnetic field,
then
at least one electron of a molecule of the first chemical is polarized to another spin state, and
said at least one spin polarized electron induces spin polarization of the nucleus of a molecule of the second chemical to effect transfer of at least one electron from one of said molecules of said first and second chemicals to the other molecule to effect said otherwise quantum mechanically spin forbidden or kinetically disfavored chemical reaction between molecules of said first and second chemicals.

5. The magnetic fuel cell for effecting an otherwise quantum mechanically spin forbidden or kinetically disfavored chemical reaction according to claim 4, wherein first and second chemicals independently comprise reaction intermediates, ions, or adsorbates.

6. The magnetic fuel cell with enhanced function due to effecting at least one otherwise quantum mechanically spin forbidden or kinetically disfavored chemical reaction according to claim 1, wherein
the separator is a proton exchange membrane (PEM) to create a PEM fuel cell;
the oxidant is selected from the group consisting of air, oxygen, and a peroxide; and
the fuel is selected from the group consisting of hydrogen, methanol, ethanol, isopropanol, n-propanol, acetic acid, and acetic anhydride.

7. The magnetic PEM fuel cell with enhanced function due to effecting at least one otherwise quantum mechanically spin forbidden or kinetically disfavored chemical reaction according to claim 6, wherein
when the magnetic PEM cell operates at about 55° C., a first power output results that is at least about 75% greater than a second power output that results when a conventional nonmagnetic PEM fuel cell operates at about 70° C.

8. The magnetic PEM fuel cell with enhanced function due to effecting at least one otherwise quantum mechanically spin forbidden or kinetically disfavored chemical reaction according to claim 6, wherein
when the magnetic PEM fuel cell operates at about 20° C., a third power output results that is close in magnitude to a second power output that results when a conventional nonmagnetic PEM fuel cell operates at about 70° C.

9. The magnetic PEM fuel cell with enhanced function due to effecting at least one otherwise quantum mechanically spin forbidden or kinetically disfavored chemical reaction according to claim 6, wherein the magnetic PEM fuel cell is capable of operating at a pressure of oxygen at the cathode, and a pressure of hydrogen at the anode, wherein said pressure of oxygen and said pressure of hydrogen are independently less than or equal to about atmospheric pressure.

10. The magnetic PEM fuel cell with enhanced function due to effecting at least one otherwise quantum mechanically spin forbidden or kinetically disfavored chemical reaction according to claim 6, wherein air is used as the oxidant at the cathode.

11. The magnetic PEM fuel cell wit enhanced function due to effecting at least one otherwise mechanically spin forbidden or kinetically disfavored chemical reaction according to claim 6, wherein
a plurality of magnetic PEM fuel cells is configured in parallel to enhance electrical current output,
in series to enhance voltage output, or
both in parallel and in series to enhance both current output and voltage output.

12. The magnetic PEM fuel cell with enhanced function due to effecting at least one otherwise mechanically spin forbidden or kinetically disfavored chemical reaction according to claim 11, wherein the plurality of magnetic PEM fuel cells is built as a set of patch cells on a single proton exchange membrane.

13. A magnetic fuel cell with enhanced function due to effecting at least one otherwise quantum mechanically spin forbidden or kinetically disfavored chemical reaction, comprising:
an electrode system, comprising
a cathode, having a cathode surface,
an anode, having an anode surface, and
a separator disposed between the anode and the cathode;
a first material having a first magnetism;
a second material having a second magnetism;
a magnetic field source adapted to produce a magnetic field in at least a portion of said electrode system; and
a microstructured magnetic composite material, comprising
an arrangement of said first and second materials, and
a plurality of boundaries between said first and second materials, wherein each boundary
is adapted to provide a plurality of paths through the microstructured magnetic composite material, and
has at least one said magnetic field within at least one of said plurality of paths;
the microstructured magnetic composite material is disposed on at least one of the surface of the anode or the surface of the cathode to create an electrode surface coating; and
when an oxidant is reduced at the cathode, and a fuel is oxidized at the anode, a first electrical current flows between the cathode and the anode, wherein
the first electrical current has a magnitude which is greater than a second electrical current produced by a conventional nonmagnetic fuel cell.

14. The magnetic fuel cell with enhanced function due to effecting at least one otherwise quantum mechanically spin forbidden or kinetically disfavored chemical reaction according to claim 13; wherein the magnetic field source is selected from the group consisting of:
an external magnet,
an internal magnet,
a microstructured magnetic composite material, both an external magnet and a microstructured magnetic composite material, and both an internal magnet and a microstructured magnetic composite material.

15. The magnetic fuel cell with enhanced function due to effecting at least one otherwise quantum mechanically spin forbidden or kinetically disfavored chemical reaction according to claim 14, further comprising:

first and second chemicals; and an interfacial boundary located at each anode surface and each cathode surface, wherein each molecule of the first chemical has at least one electron having a plurality of quantum mechanically allowed spin states, each molecule of the second chemical has a nucleus susceptible to electron-nuclear spin polarization, and when said magnetic field source is actuated to produce said magnetic field, and molecules of said first and second chemicals are located at or close to said interfacial boundary and within said magnetic field, then at least one electron of a molecule of the first chemical is polarized to another spin state, and said at least one spin polarized electron induces spin polarization of the nucleus of a molecule of the second chemical to effect transfer of at least one electron from one of said molecules of said first and second chemicals to the other molecule to effect said otherwise quantum mechanically spin forbidden or kinetically disfavored chemical reaction between molecules of said first and second chemicals.

16. The magnetic fuel cell for effecting an otherwise quantum mechanically spin forbidden or kinetically disfavored chemical reaction according to claim 15, wherein the first and second chemicals independently comprise reaction intermediates, ions, or adsorbates.

17. A magnetic fuel cell with enhanced function due to effecting at least one otherwise quantum mechanically spin forbidden or kinetically disfavored chemical reaction according to claim 13, further comprising:

first and second chemicals, wherein each molecule of the first chemical has at least one electron having a plurality of quantum mechanically allowed spin states, each molecule of the second chemical has a nucleus susceptible to electron-nuclear spin polarization, at least one electron of a molecule of the first chemical is polarized to another spin state, and said at least one spin polarized electron induces spin polarization of the nucleus of a molecule of the second chemical to effect transfer of at least one electron from one of said molecules of said first and second chemicals to the other molecule to effect said or otherwise quantum mechanically spin forbidden or kinetically disfavored chemical reaction between molecules of said first and second chemicals.

18. The magnetic fuel cell with enhanced function due to effecting at least one otherwise quantum mechanically spin forbidden or kinetically disfavored chemical reaction according to claim 13, wherein the separator is a proton exchange membrane (PEM) to create a PEM fuel cell;

the oxidant is selected from the group consisting of air, oxygen, and a peroxide; and the fuel is selected from the group consisting of hydrogen, methanol, ethanol, isopropanol, n-propanol, acetic acid, and acetic anhydride.

19. The magnetic PEM fuel cell with enhanced function due to effecting at least one otherwise quantum mechanically spin forbidden or kinetically disfavored chemical reaction according to claim 18, wherein when the magnetic PEM cell operates at about 55° C., a first power output results that is at least about 75% greater than a second power output that results when a conventional nonmagnetic PEM fuel cell operates at about 70° C.

20. The magnetic PEM fuel cell with enhanced function due to effecting at least one otherwise quantum mechanically spin forbidden or kinetically disfavored chemical reaction according to claim 18, wherein when the magnetic PEM fuel cell operates at about 20° C., a third power output results that is close in magnitude to a second power output that results when a conventional nonmagnetic PEM fuel cell operates at about 70° C.

21. The magnetic PEM fuel cell with enhanced function due to effecting at least one otherwise quantum mechanically spin forbidden or kinetically disfavored chemical reaction according to claim 18, wherein the magnetic PEM fuel cell is capable of operating at a pressure of oxygen at the cathode, and a pressure of hydrogen at the anode, wherein said pressure of oxygen and said pressure of hydrogen are independently less than or equal to about atmospheric pressure.

22. The magnetic PEM fuel cell with enhanced function due to effecting at least one otherwise quantum mechanically spin forbidden or kinetically disfavored chemical reaction according to claim 18, wherein air is used as the oxidant at the cathode.

23. The magnetic PEM fuel cell with enhanced function due to effecting at least one otherwise quantum mechanically spin forbidden or kinetically disfavored chemical reaction according to claim 18, wherein a plurality of magnetic PEM fuel cells is configured in parallel to enhance electrical current output,
in series to enhance voltage output, or
both in parallel and in series to enhance both current output and voltage output.

24. The magnetic PEM fuel cell with enhanced function due to effecting at least one otherwise quantum mechanically spin forbidden or kinetically disfavored chemical reaction according to claim 23, wherein the plurality of magnetic PEM fuel cells is built as a set of patch cells on a single proton exchange membrane.

25. The magnetic PEM fuel cell with enhanced function due to effecting at least one otherwise quantum mechanically spin forbidden or kinetically disfavored chemical reaction according to claim 13, wherein the microstructured magnetic composite material comprises magnetic microparticles as the first material, and platinized carbon particles as the second material.

* * * * *